US007822968B2

(12) United States Patent
Vorbach et al.

(10) Patent No.: US 7,822,968 B2
(45) Date of Patent: *Oct. 26, 2010

(54) CIRCUIT HAVING A MULTIDIMENSIONAL STRUCTURE OF CONFIGURABLE CELLS THAT INCLUDE MULTI-BIT-WIDE INPUTS AND OUTPUTS

(76) Inventors: Martin Vorbach, Gotthardstrasse 117a, D-80689 München (DE); Robert Münch, Uhlandstrasse 30, D-76135 Karlsruhe (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/368,709

(22) Filed: Feb. 10, 2009

(65) Prior Publication Data

US 2009/0146690 A1 Jun. 11, 2009

Related U.S. Application Data

(63) Continuation of application No. 10/791,501, filed on Mar. 1, 2004, now Pat. No. 7,565,525, which is a continuation of application No. 10/329,132, filed on Dec. 24, 2002, now Pat. No. 6,958,710, which is a continuation of application No. PCT/DE97/02949, filed on Dec. 9, 1997, which is a continuation-in-part of application No. 08/946,810, filed on Oct. 8, 1997, now Pat. No. 6,425,068.

(30) Foreign Application Priority Data

Dec. 9, 1996 (DE) ................................ 196 51 075

(51) Int. Cl.
*G06F 9/00* (2006.01)

(52) U.S. Cl. ................................ 713/100; 713/1; 713/2; 712/15

(58) Field of Classification Search ................. 713/100, 713/1, 2; 712/15
See application file for complete search history.

(56) References Cited

U.S. PATENT DOCUMENTS 2,067,477 A 1/1937 Cooper (Continued)

FOREIGN PATENT DOCUMENTS

DE 42 21 278 1/1994

(Continued)

OTHER PUBLICATIONS

U.S. Appl. No. 60/109,417, filed Nov. 18, 1998, Jefferson et al.

(Continued)

*Primary Examiner*—Nitin C Patel
(74) *Attorney, Agent, or Firm*—Kenyon & Kenyon LLP

(57) ABSTRACT

A cascadable arithmetic and logic unit (ALU) which is configurable in function and interconnection. No decoding of commands is needed during execution of the algorithm. The ALU can be reconfigured at run time without any effect on surrounding ALUs, processing units or data streams. The volume of configuration data is very small, which has positive effects on the space required and the configuration speed. Broadcasting is supported through the internal bus systems in order to distribute large volumes of data rapidly and efficiently. The ALU is equipped with a power-saving mode to shut down power consumption completely. There is also a clock rate divider which makes it possible to operate the ALU at a slower clock rate. Special mechanisms are available for feedback on the internal states to the external controllers.

138 Claims, 23 Drawing Sheets

U.S. PATENT DOCUMENTS

| | | |
|---|---|---|
| 3,242,998 A | 3/1966 | Gubbins |
| 3,681,578 A | 8/1972 | Stevens |
| 3,757,608 A | 9/1973 | Willner |
| 3,855,577 A | 12/1974 | Vandierendonck |
| 4,233,667 A | 11/1980 | Devine et al. |
| 4,414,547 A | 11/1983 | Knapp et al. |
| 4,498,134 A | 2/1985 | Hansen et al. |
| 4,498,172 A | 2/1985 | Bhavsar |
| 4,566,102 A | 1/1986 | Hefner |
| 4,571,736 A | 2/1986 | Agrawal et al. |
| 4,590,583 A | 5/1986 | Miller |
| 4,591,979 A | 5/1986 | Iwashita |
| 4,623,997 A | 11/1986 | Tulpule |
| 4,663,706 A | 5/1987 | Allen et al. |
| 4,667,190 A | 5/1987 | Fant et al. |
| 4,682,284 A | 7/1987 | Schrofer |
| 4,686,386 A | 8/1987 | Tadao |
| 4,706,216 A | 11/1987 | Carter |
| 4,720,778 A | 1/1988 | Hall et al. |
| 4,720,780 A | 1/1988 | Dolecek |
| 4,739,474 A | 4/1988 | Holsztynski |
| 4,761,755 A | 8/1988 | Ardini et al. |
| 4,791,603 A | 12/1988 | Henry |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Miranker et al. |
| 4,870,302 A | 9/1989 | Freeman |
| 4,882,687 A | 11/1989 | Gordon |
| 4,884,231 A | 11/1989 | Mor et al. |
| 4,891,810 A | 1/1990 | de Corlieu et al. |
| 4,901,268 A | 2/1990 | Judd |
| 4,910,665 A | 3/1990 | Mattheyses et al. |
| 4,918,440 A | 4/1990 | Furtek et al. |
| 4,959,781 A | 9/1990 | Rubenstein et al. |
| 4,967,340 A | 10/1990 | Dawes |
| 4,972,314 A | 11/1990 | Getzinger et al. |
| 4,992,933 A | 2/1991 | Taylor |
| 5,010,401 A | 4/1991 | Murakami et al. |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,034,914 A | 7/1991 | Osterlund |
| 5,036,473 A | 7/1991 | Butts et al. |
| 5,041,924 A | 8/1991 | Blackborow et al. |
| 5,043,978 A | 8/1991 | Nagler et al. |
| 5,047,924 A | 9/1991 | Matsubara et al. |
| 5,055,997 A | 10/1991 | Sluijter et al. |
| 5,065,308 A | 11/1991 | Evans |
| 5,072,178 A | 12/1991 | Matsumoto |
| 5,081,375 A | 1/1992 | Pickett et al. |
| 5,099,447 A | 3/1992 | Myszewski |
| 5,103,311 A | 4/1992 | Sluijter et al. |
| 5,109,503 A | 4/1992 | Cruickshank et al. |
| 5,113,498 A | 5/1992 | Evan et al. |
| 5,115,510 A | 5/1992 | Okamoto et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Jackson et al. |
| 5,203,005 A | 4/1993 | Horst |
| 5,204,935 A | 4/1993 | Mihara et al. |
| 5,208,491 A | 5/1993 | Ebeling et al. |
| 5,212,716 A | 5/1993 | Ferraiolo et al. |
| 5,212,777 A | 5/1993 | Gove et al. |
| 5,218,302 A | 6/1993 | Loewe et al. |
| 5,226,122 A | 7/1993 | Thayer et al. |
| RE34,363 E | 8/1993 | Freeman |
| 5,233,539 A | 8/1993 | Agrawal et al. |
| 5,237,686 A | 8/1993 | Asano et al. |
| 5,243,238 A | 9/1993 | Kean |
| 5,247,689 A | 9/1993 | Ewert |
| RE34,444 E | 11/1993 | Kaplinsky |
| 5,274,593 A | 12/1993 | Proebsting |
| 5,276,836 A | 1/1994 | Fukumaru et al. |
| 5,287,472 A | 2/1994 | Horst |
| 5,287,511 A | 2/1994 | Robinson et al. |
| 5,287,532 A | 2/1994 | Hunt |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,311,079 A | 5/1994 | Ditlow et al. |
| 5,327,125 A | 7/1994 | Iwase et al. |
| 5,336,950 A | 8/1994 | Popli et al. |
| 5,343,406 A | 8/1994 | Freeman et al. |
| 5,347,639 A | 9/1994 | Rechtschaffen et al. |
| 5,349,193 A | 9/1994 | Mott et al. |
| 5,353,432 A | 10/1994 | Richek et al. |
| 5,355,508 A | 10/1994 | Kan |
| 5,361,373 A | 11/1994 | Gilson |
| 5,365,125 A | 11/1994 | Goetting et al. |
| 5,379,444 A | 1/1995 | Mumme |
| 5,386,154 A | 1/1995 | Goetting et al. |
| 5,386,518 A | 1/1995 | Reagle et al. |
| 5,392,437 A | 2/1995 | Matter et al. |
| 5,408,643 A | 4/1995 | Katayose |
| 5,410,723 A | 4/1995 | Schmidt et al. |
| 5,412,795 A | 5/1995 | Larson |
| 5,418,952 A | 5/1995 | Morley et al. |
| 5,418,953 A | 5/1995 | Hunt et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,450,022 A | 9/1995 | New |
| 5,455,525 A | 10/1995 | Ho et al. |
| 5,457,644 A | 10/1995 | McCollum |
| 5,465,375 A | 11/1995 | Thepaut et al. |
| 5,469,003 A | 11/1995 | Kean |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,477,525 A | 12/1995 | Okabe |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,504,439 A | 4/1996 | Tavana |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,525,971 A | 6/1996 | Flynn |
| 5,530,873 A | 6/1996 | Takano |
| 5,530,946 A | 6/1996 | Bouvier et al. |
| 5,532,693 A | 7/1996 | Winters et al. |

| | | | | | |
|---|---|---|---|---|---|
| 5,532,957 A | 7/1996 | Malhi | 5,754,820 A | 5/1998 | Yamagami |
| 5,535,406 A | 7/1996 | Kolchinsky | 5,754,827 A | 5/1998 | Barbier et al. |
| 5,537,057 A | 7/1996 | Leong et al. | 5,754,871 A | 5/1998 | Wilkinson et al. |
| 5,537,580 A | 7/1996 | Giomi et al. | 5,760,602 A | 6/1998 | Tan |
| 5,537,601 A | 7/1996 | Kimura et al. | 5,761,484 A | 6/1998 | Agarwal et al. |
| 5,541,530 A | 7/1996 | Cliff et al. | 5,773,994 A | 6/1998 | Jones |
| 5,544,336 A | 8/1996 | Kato et al. | 5,778,439 A | 7/1998 | Trimberger et al. |
| 5,548,773 A | 8/1996 | Kemeny et al. | 5,781,756 A | 7/1998 | Hung |
| 5,550,782 A | 8/1996 | Cliff et al. | 5,784,636 A | 7/1998 | Rupp |
| 5,555,434 A | 9/1996 | Carlstedt | 5,794,059 A | 8/1998 | Barker et al. |
| 5,559,450 A | 9/1996 | Ngai et al. | 5,794,062 A | 8/1998 | Baxter |
| 5,561,738 A | 10/1996 | Kinerk et al. | 5,801,547 A | 9/1998 | Kean |
| 5,570,040 A | 10/1996 | Lytle et al. | 5,801,715 A | 9/1998 | Norman |
| 5,572,710 A | 11/1996 | Asano et al. | 5,801,958 A | 9/1998 | Dangelo et al. |
| 5,574,930 A | 11/1996 | Halverson, Jr. et al. | 5,802,290 A | 9/1998 | Casselman |
| 5,581,731 A | 12/1996 | King et al. | 5,804,986 A | 9/1998 | Jones |
| 5,583,450 A | 12/1996 | Trimberger et al. | 5,815,004 A | 9/1998 | Trimberger et al. |
| 5,586,044 A | 12/1996 | Agrawal et al. | 5,815,715 A | 9/1998 | Kayhan |
| 5,587,921 A | 12/1996 | Agrawal et al. | 5,815,726 A | 9/1998 | Cliff |
| 5,588,152 A | 12/1996 | Dapp et al. | 5,821,774 A | 10/1998 | Veytsman et al. |
| 5,590,345 A | 12/1996 | Barker et al. | 5,828,229 A | 10/1998 | Cliff et al. |
| 5,590,348 A | 12/1996 | Phillips et al. | 5,828,858 A | 10/1998 | Athanas et al. |
| 5,596,742 A | 1/1997 | Agarwal et al. | 5,831,448 A | 11/1998 | Kean |
| 5,600,265 A | 2/1997 | El Gamal et al. | 5,838,165 A | 11/1998 | Chatter |
| 5,600,597 A | 2/1997 | Kean et al. | 5,841,973 A | 11/1998 | Cooke et al. |
| 5,600,845 A | 2/1997 | Gilson | 5,844,422 A | 12/1998 | Trimberger et al. |
| 5,606,698 A | 2/1997 | Powell | 5,844,888 A | 12/1998 | Markkula, Jr. et al. |
| 5,608,342 A | 3/1997 | Trimberger | 5,848,238 A | 12/1998 | Shimomura et al. |
| 5,611,049 A | 3/1997 | Pitts | 5,854,918 A | 12/1998 | Baxter |
| 5,617,547 A | 4/1997 | Feeney et al. | 5,857,097 A | 1/1999 | Henzinger et al. |
| 5,617,577 A | 4/1997 | Barker et al. | 5,857,109 A | 1/1999 | Taylor |
| 5,619,720 A | 4/1997 | Garde et al. | 5,859,544 A | 1/1999 | Norman |
| 5,625,806 A | 4/1997 | Kromer | 5,860,119 A | 1/1999 | Dockser |
| 5,625,836 A | 4/1997 | Barker et al. | 5,862,403 A | 1/1999 | Kanai et al. |
| 5,627,992 A | 5/1997 | Baror | 5,865,239 A | 2/1999 | Carr |
| 5,634,131 A | 5/1997 | Matter et al. | 5,867,691 A | 2/1999 | Shiraishi |
| 5,635,851 A | 6/1997 | Tavana | 5,867,723 A | 2/1999 | Peters et al. |
| 5,642,058 A | 6/1997 | Trimberger et al. | 5,870,620 A | 2/1999 | Kadosumi et al. |
| 5,646,544 A | 7/1997 | Iadanza | 5,884,075 A | 3/1999 | Hester et al. |
| 5,646,545 A | 7/1997 | Trimberger et al. | 5,887,162 A | 3/1999 | Williams et al. |
| 5,649,176 A | 7/1997 | Selvidge et al. | 5,887,165 A | 3/1999 | Martel et al. |
| 5,649,179 A | 7/1997 | Steenstra et al. | 5,889,533 A | 3/1999 | Lee |
| 5,652,529 A | 7/1997 | Gould et al. | 5,889,982 A | 3/1999 | Rodgers et al. |
| 5,652,894 A | 7/1997 | Hu et al. | 5,892,370 A | 4/1999 | Eaton et al. |
| 5,655,069 A | 8/1997 | Ogawara et al. | 5,892,961 A | 4/1999 | Trimberger |
| 5,655,124 A | 8/1997 | Lin | 5,892,962 A | 4/1999 | Cloutier |
| 5,656,950 A | 8/1997 | Duong et al. | 5,894,565 A | 4/1999 | Furtek et al. |
| 5,657,330 A | 8/1997 | Matsumoto | 5,901,279 A | 5/1999 | Davis, III |
| 5,659,785 A | 8/1997 | Pechanek et al. | 5,915,123 A | 6/1999 | Mirsky et al. |
| 5,659,797 A | 8/1997 | Zandveld et al. | 5,924,119 A | 7/1999 | Sindhu et al. |
| 5,675,262 A | 10/1997 | Doung et al. | 5,926,638 A | 7/1999 | Inoue |
| 5,675,743 A | 10/1997 | Mavity | 5,927,423 A | 7/1999 | Wada et al. |
| 5,680,583 A | 10/1997 | Kuijsten | 5,933,023 A | 8/1999 | Young |
| 5,682,491 A | 10/1997 | Pechanek et al. | 5,933,642 A | 8/1999 | Greenbaum et al. |
| 5,687,325 A | 11/1997 | Chang | 5,936,424 A | 8/1999 | Young et al. |
| 5,694,602 A | 12/1997 | Smith | 5,943,242 A | 8/1999 | Vorbach et al. |
| 5,696,791 A | 12/1997 | Yeung | 5,956,518 A | 9/1999 | DeHon et al. |
| 5,696,976 A | 12/1997 | Nizar et al. | 5,960,193 A | 9/1999 | Guttag et al. |
| 5,701,091 A | 12/1997 | Kean | 5,960,200 A | 9/1999 | Eager et al. |
| 5,705,938 A | 1/1998 | Kean | 5,966,143 A | 10/1999 | Breternitz, Jr. |
| 5,713,037 A | 1/1998 | Wilkinson et al. | 5,966,534 A | 10/1999 | Cooke et al. |
| 5,717,943 A | 2/1998 | Barker et al. | 5,970,254 A | 10/1999 | Cooke et al. |
| 5,732,209 A | 3/1998 | Vigil et al. | 5,978,260 A | 11/1999 | Trimberger et al. |
| 5,734,869 A | 3/1998 | Chen | 5,978,583 A | 11/1999 | Ekanadham et al. |
| 5,734,921 A | 3/1998 | Dapp et al. | 5,996,083 A | 11/1999 | Gupta et al. |
| 5,737,516 A | 4/1998 | Circello et al. | 5,999,990 A | 12/1999 | Sharrit et al. |
| 5,737,565 A | 4/1998 | Mayfield | 6,003,143 A | 12/1999 | Kim et al. |
| 5,742,180 A | 4/1998 | DeHon et al. | 6,011,407 A | 1/2000 | New |
| 5,745,734 A | 4/1998 | Craft et al. | 6,014,509 A | 1/2000 | Furtek et al. |
| 5,748,872 A | 5/1998 | Norman | 6,020,758 A | 2/2000 | Patel et al. |
| 5,748,979 A | 5/1998 | Trimberger | 6,020,760 A | 2/2000 | Sample et al. |
| 5,752,035 A | 5/1998 | Trimberger | 6,021,490 A | 2/2000 | Vorbach et al. |
| 5,754,459 A | 5/1998 | Telikepalli | 6,023,564 A | 2/2000 | Trimberger |

| | | | |
|---|---|---|---|
| 6,023,742 A | 2/2000 | Ebeling et al. | |
| 6,026,481 A | 2/2000 | New et al. | |
| 6,034,538 A | 3/2000 | Abramovici | |
| 6,035,371 A | 3/2000 | Magloire | |
| 6,038,650 A | 3/2000 | Vorbach et al. | |
| 6,038,656 A | 3/2000 | Martin et al. | |
| 6,044,030 A | 3/2000 | Zheng et al. | |
| 6,047,115 A | 4/2000 | Mohan et al. | |
| 6,049,222 A | 4/2000 | Lawman | |
| 6,049,866 A | 4/2000 | Earl | |
| 6,052,773 A | 4/2000 | DeHon et al. | |
| 6,054,873 A | 4/2000 | Laramie | |
| 6,055,619 A | 4/2000 | North et al. | |
| 6,058,469 A | 5/2000 | Baxter | |
| 6,076,157 A | 6/2000 | Borkenhagen et al. | |
| 6,077,315 A | 6/2000 | Greenbaum et al. | |
| 6,081,903 A | 6/2000 | Vorbach et al. | |
| 6,084,429 A | 7/2000 | Trimberger | |
| 6,085,317 A | 7/2000 | Smith | |
| 6,086,628 A | 7/2000 | Dave et al. | |
| 6,088,795 A | 7/2000 | Vorbach et al. | |
| 6,092,174 A | 7/2000 | Roussakov | |
| 6,105,105 A | 8/2000 | Trimberger et al. | |
| 6,105,106 A | 8/2000 | Manning | |
| 6,108,760 A | 8/2000 | Mirsky et al. | |
| 6,118,724 A | 9/2000 | Higginbottom | |
| 6,119,181 A | 9/2000 | Vorbach et al. | |
| 6,122,719 A | 9/2000 | Mirsky et al. | |
| 6,125,408 A | 9/2000 | McGee et al. | |
| 6,127,908 A | 10/2000 | Bozler et al. | |
| 6,128,720 A | 10/2000 | Pechanek et al. | |
| 6,134,166 A | 10/2000 | Lytle et al. | |
| 6,137,307 A | 10/2000 | Iwanczuk et al. | |
| 6,145,072 A | 11/2000 | Shams et al. | |
| 6,150,837 A | 11/2000 | Beal et al. | |
| 6,150,839 A | 11/2000 | New et al. | |
| 6,154,048 A | 11/2000 | Iwanczuk et al. | |
| 6,154,049 A | 11/2000 | New | |
| 6,157,214 A | 12/2000 | Marshall | |
| 6,170,051 B1 | 1/2001 | Dowling | |
| 6,172,520 B1 | 1/2001 | Lawman et al. | |
| 6,173,434 B1 | 1/2001 | Wirthlin et al. | |
| 6,178,494 B1 | 1/2001 | Casselman | |
| 6,185,256 B1 | 2/2001 | Saito et al. | |
| 6,185,731 B1 | 2/2001 | Maeda et al. | |
| 6,188,240 B1 | 2/2001 | Nakaya | |
| 6,188,650 B1 | 2/2001 | Hamada et al. | |
| 6,198,304 B1 | 3/2001 | Sasaki | |
| 6,201,406 B1 | 3/2001 | Iwanczuk et al. | |
| 6,202,182 B1 | 3/2001 | Abramovici et al. | |
| 6,204,687 B1 | 3/2001 | Schultz et al. | |
| 6,211,697 B1 | 4/2001 | Lien et al. | |
| 6,212,650 B1 | 4/2001 | Guccione | |
| 6,215,326 B1 | 4/2001 | Jefferson et al. | |
| 6,216,223 B1 | 4/2001 | Revilla et al. | |
| 6,219,833 B1 | 4/2001 | Solomon et al. | |
| RE37,195 E | 5/2001 | Kean | |
| 6,230,307 B1 | 5/2001 | Davis et al. | |
| 6,240,502 B1 | 5/2001 | Panwar et al. | |
| 6,243,808 B1 | 6/2001 | Wang | |
| 6,247,147 B1 | 6/2001 | Beenstra et al. | |
| 6,252,792 B1 | 6/2001 | Marshall et al. | |
| 6,256,724 B1 | 7/2001 | Hocevar et al. | |
| 6,260,179 B1 | 7/2001 | Ohsawa et al. | |
| 6,262,908 B1 | 7/2001 | Marshall et al. | |
| 6,263,430 B1 | 7/2001 | Trimberger et al. | |
| 6,266,760 B1 | 7/2001 | DeHon et al. | |
| 6,279,077 B1 | 8/2001 | Nasserbakht et al. | |
| 6,282,627 B1 | 8/2001 | Wong et al. | |
| 6,282,701 B1 | 8/2001 | Wygodny et al. | |
| 6,285,624 B1 | 9/2001 | Chen | |
| 6,286,134 B1 | 9/2001 | Click, Jr. et al. | |
| 6,288,566 B1 | 9/2001 | Hanrahan et al. | |
| 6,289,440 B1 | 9/2001 | Casselman | |
| 6,298,472 B1 | 10/2001 | Phillips et al. | |
| 6,301,706 B1 | 10/2001 | Maslennikov et al. | |
| 6,311,200 B1 | 10/2001 | Hanrahan et al. | |
| 6,311,265 B1 | 10/2001 | Beckerle et al. | |
| 6,321,366 B1 | 11/2001 | Tseng et al. | |
| 6,321,373 B1 | 11/2001 | Ekanadham et al. | |
| 6,338,106 B1 | 1/2002 | Vorbach et al. | |
| 6,341,318 B1 | 1/2002 | Dakhil | |
| 6,347,346 B1 | 2/2002 | Taylor | |
| 6,349,346 B1 | 2/2002 | Hanrahan et al. | |
| 6,353,841 B1 | 3/2002 | Marshall et al. | |
| 6,362,650 B1 | 3/2002 | New et al. | |
| 6,370,596 B1 | 4/2002 | Dakhil | |
| 6,373,779 B1 | 4/2002 | Pang et al. | |
| 6,374,286 B1 | 4/2002 | Gee | |
| 6,378,068 B1 | 4/2002 | Foster et al. | |
| 6,381,624 B1 | 4/2002 | Colon-Bonet et al. | |
| 6,389,379 B1 | 5/2002 | Lin et al. | |
| 6,389,579 B1 | 5/2002 | Phillips et al. | |
| 6,392,912 B1 | 5/2002 | Hanrahan et al. | |
| 6,398,383 B1 | 6/2002 | Huang | |
| 6,400,601 B1 | 6/2002 | Sudo et al. | |
| 6,404,224 B1 | 6/2002 | Azegami et al. | |
| 6,405,185 B1 | 6/2002 | Pechanek et al. | |
| 6,405,299 B1 | 6/2002 | Vorbach et al. | |
| 6,421,808 B1 | 7/2002 | McGeer | |
| 6,421,809 B1 | 7/2002 | Wuytack et al. | |
| 6,421,817 B1 | 7/2002 | Mohan et al. | |
| 6,425,054 B1 | 7/2002 | Nguyen | |
| 6,425,068 B1 | 7/2002 | Vorbach | |
| 6,426,649 B1 | 7/2002 | Fu et al. | |
| 6,427,156 B1 | 7/2002 | Chapman et al. | |
| 6,430,309 B1 | 8/2002 | Pressman et al. | |
| 6,434,642 B1 | 8/2002 | Camilleri et al. | |
| 6,434,695 B1 | 8/2002 | Esfahani et al. | |
| 6,434,699 B1 | 8/2002 | Jones et al. | |
| 6,437,441 B1 | 8/2002 | Yamamoto | |
| 6,438,747 B1 | 8/2002 | Schreiber et al. | |
| 6,457,116 B1 | 9/2002 | Mirsky et al. | |
| 6,476,634 B1 | 11/2002 | Bilski | |
| 6,477,643 B1 | 11/2002 | Vorbach et al. | |
| 6,480,937 B1 | 11/2002 | Vorbach et al. | |
| 6,480,954 B2 | 11/2002 | Trimberger et al. | |
| 6,483,343 B1 | 11/2002 | Faith et al. | |
| 6,487,709 B1 | 11/2002 | Keller et al. | |
| 6,490,695 B1 | 12/2002 | Zagorski et al. | |
| 6,496,971 B1 | 12/2002 | Lesea et al. | |
| 6,504,398 B1 | 1/2003 | Lien et al. | |
| 6,507,898 B1 | 1/2003 | Gibson et al. | |
| 6,507,947 B1 | 1/2003 | Schreiber et al. | |
| 6,513,077 B2 | 1/2003 | Vorbach et al. | |
| 6,516,382 B2 | 2/2003 | Manning | |
| 6,518,787 B1 | 2/2003 | Allegrucci et al. | |
| 6,519,674 B1 | 2/2003 | Lam et al. | |
| 6,523,107 B1 | 2/2003 | Stansfield et al. | |
| 6,525,678 B1 | 2/2003 | Veenstra et al. | |
| 6,526,520 B1 | 2/2003 | Vorbach et al. | |
| 6,538,468 B1 | 3/2003 | Moore | |
| 6,538,470 B1 | 3/2003 | Langhammer et al. | |
| 6,539,415 B1 | 3/2003 | Mercs | |
| 6,539,438 B1 | 3/2003 | Ledzius et al. | |
| 6,539,477 B1 | 3/2003 | Seawright | |
| 6,542,394 B2 | 4/2003 | Marshall et al. | |
| 6,542,844 B1 | 4/2003 | Hanna | |
| 6,542,998 B1 | 4/2003 | Vorbach | |
| 6,553,395 B2 | 4/2003 | Marshall et al. | |
| 6,553,479 B2 | 4/2003 | Mirsky et al. | |
| 6,567,834 B1 | 5/2003 | Marshall et al. | |
| 6,571,381 B1 | 5/2003 | Vorbach et al. | |
| 6,587,939 B1 | 7/2003 | Takano | |
| 6,598,128 B1 | 7/2003 | Yoshioka et al. | |
| 6,631,487 B1 | 10/2003 | Abramovici et al. | |

| | | | | | | |
|---|---|---|---|---|---|---|
| 6,633,181 B1 | 10/2003 | Rupp | | 2003/0056202 A1 | 3/2003 | May et al. |
| 6,657,457 B1 | 12/2003 | Hanrahan et al. | | 2003/0061542 A1 | 3/2003 | Bates et al. |
| 6,658,564 B1 | 12/2003 | Smith et al. | | 2003/0062922 A1 | 4/2003 | Douglass et al. |
| 6,665,758 B1 | 12/2003 | Frazier et al. | | 2003/0086300 A1 | 5/2003 | Noyes et al. |
| 6,687,788 B2 | 2/2004 | Vorbach et al. | | 2003/0093662 A1 | 5/2003 | Vorbach et al. |
| 6,697,979 B1 | 2/2004 | Vorbach et al. | | 2003/0097513 A1 | 5/2003 | Vorbach et al. |
| 6,704,816 B1 | 3/2004 | Burke | | 2003/0123579 A1 | 7/2003 | Safavi et al. |
| 6,708,325 B2 | 3/2004 | Cooke et al. | | 2003/0135686 A1 | 7/2003 | Vorbach et al. |
| 6,717,436 B2 | 4/2004 | Kress et al. | | 2003/0192032 A1 | 10/2003 | Andrade et al. |
| 6,721,830 B2 | 4/2004 | Vorbach et al. | | 2004/0015899 A1 | 1/2004 | May et al. |
| 6,728,871 B1 | 4/2004 | Vorbach et al. | | 2004/0025005 A1 | 2/2004 | Vorbach et al. |
| 6,745,317 B1 | 6/2004 | Mirsky et al. | | 2004/0078548 A1 | 4/2004 | Claydon et al. |
| 6,748,440 B1 | 6/2004 | Lisitsa et al. | | 2004/0168099 A1 | 8/2004 | Vorbach et al. |
| 6,751,722 B2 | 6/2004 | Mirsky et al. | | 2004/0199688 A1 | 10/2004 | Vorbach et al. |
| 6,754,805 B1 | 6/2004 | Juan | | 2005/0066213 A1 | 3/2005 | Vorbach et al. |
| 6,757,847 B1 | 6/2004 | Farkash et al. | | 2005/0144210 A1 | 6/2005 | Simkins et al. |
| 6,757,892 B1 | 6/2004 | Gokhale et al. | | 2005/0144212 A1 | 6/2005 | Simkins et al. |
| 6,782,445 B1 | 8/2004 | Olgiati et al. | | 2005/0144215 A1 | 6/2005 | Simkins et al. |
| 6,785,826 B1 | 8/2004 | Durham et al. | | 2006/0130096 A1 | 10/2006 | Thendean et al. |
| 6,802,206 B2 | 10/2004 | Patterson et al. | | 2006/0230094 A1 | 10/2006 | Simkins et al. |
| 6,803,787 B1 | 10/2004 | Wicker, Jr. | | 2009/0085603 A1 | 4/2009 | Paul et al. |
| 6,820,188 B2 | 11/2004 | Stansfield et al. | | | | |
| 6,829,697 B1 | 12/2004 | Davis et al. | | FOREIGN PATENT DOCUMENTS | | |
| 6,847,370 B2 | 1/2005 | Baldwin et al. | | | | |
| 6,868,476 B2 | 3/2005 | Rosenbluth et al. | | DE | 44 16 881 | 11/1994 |
| 6,871,341 B1 | 3/2005 | Shyr | | DE | 38 55 673 | 11/1996 |
| 6,874,108 B1 | 3/2005 | Abramovici et al. | | DE | 196 51 075 | 6/1998 |
| 6,886,092 B1 | 4/2005 | Douglass et al. | | DE | 196 54 593 | 7/1998 |
| 6,901,502 B2 | 5/2005 | Yano et al. | | DE | 196 54 595 | 7/1998 |
| 6,928,523 B2 | 8/2005 | Yamada | | DE | 196 54 846 | 7/1998 |
| 6,961,924 B2 | 11/2005 | Bates et al. | | DE | 197 04 044 | 8/1998 |
| 6,975,138 B2 | 12/2005 | Pani et al. | | DE | 197 04 728 | 8/1998 |
| 6,977,649 B1 | 12/2005 | Baldwin et al. | | DE | 197 04 742 | 9/1998 |
| 7,000,161 B1 | 2/2006 | Allen et al. | | DE | 198 22 776 | 3/1999 |
| 7,007,096 B1 | 2/2006 | Lisitsa et al. | | DE | 198 07 872 | 8/1999 |
| 7,010,687 B2 | 3/2006 | Ichimura | | DE | 198 61 088 | 2/2000 |
| 7,028,107 B2 | 4/2006 | Vorbach et al. | | DE | 199 26 538 | 12/2000 |
| 7,038,952 B1 | 5/2006 | Zack et al. | | DE | 100 28 397 | 12/2001 |
| 7,043,416 B1 | 5/2006 | Lin | | DE | 100 36 627 | 2/2002 |
| 7,210,129 B2 | 4/2007 | May et al. | | DE | 101 29 237 | 4/2002 |
| 7,216,204 B2 | 5/2007 | Rosenbluth et al. | | DE | 102 04 044 | 8/2003 |
| 7,237,087 B2 | 6/2007 | Vorbach et al. | | EP | 0 208 457 | 1/1987 |
| 7,249,351 B1 | 7/2007 | Songer et al. | | EP | 0 221 360 | 5/1987 |
| 7,254,649 B2 | 8/2007 | Subramanian et al. | | EP | 0 398 552 | 11/1990 |
| 7,340,596 B1 | 3/2008 | Crosland et al. | | EP | 0 428 327 | 5/1991 |
| 7,346,644 B1 | 3/2008 | Langhammer et al. | | EP | 0 463 721 | 1/1992 |
| 7,350,178 B1 | 3/2008 | Crosland et al. | | EP | 0 477 809 | 4/1992 |
| 7,382,156 B2 | 6/2008 | Pani et al. | | EP | 0 485 690 | 5/1992 |
| 7,595,659 B2 | 9/2009 | Vorbach et al. | | EP | 0 497 029 | 8/1992 |
| 7,650,448 B2 | 1/2010 | Vorbach et al. | | EP | 0 539 595 | 5/1993 |
| 2001/0001860 A1 | 5/2001 | Bieu | | EP | 0 638 867 A2 | 8/1994 |
| 2001/0003834 A1 | 6/2001 | Shimonishi | | EP | 0 628 917 | 12/1994 |
| 2001/0010074 A1 | 7/2001 | Nishihara et al. | | EP | 0 678 985 | 10/1995 |
| 2001/0018733 A1 | 8/2001 | Fujii et al. | | EP | 0 686 915 | 12/1995 |
| 2001/0032305 A1 | 10/2001 | Barry | | EP | 0 707 269 | 4/1996 |
| 2002/0013861 A1 | 1/2002 | Adiletta et al. | | EP | 0 726 532 | 8/1996 |
| 2002/0038414 A1 | 3/2002 | Taylor | | EP | 0 735 685 | 10/1996 |
| 2002/0045952 A1 | 4/2002 | Blemel | | EP | 0 746 106 | 12/1996 |
| 2002/0083308 A1 | 6/2002 | Pereira et al. | | EP | 0 748 051 | 12/1996 |
| 2002/0103839 A1 | 8/2002 | Ozawa | | EP | 0 926 594 | 6/1999 |
| 2002/0124238 A1 | 9/2002 | Metzgen | | EP | 1 061 439 | 12/2000 |
| 2002/0138716 A1 | 9/2002 | Master et al. | | EP | 1 102 674 | 5/2001 |
| 2002/0143505 A1 | 10/2002 | Drusinsky | | EP | 1 115 204 | 7/2001 |
| 2002/0144229 A1 | 10/2002 | Hanrahan | | EP | 1 146 432 | 10/2001 |
| 2002/0156962 A1 | 10/2002 | Chopra et al. | | EP | 0 696 001 | 12/2001 |
| 2002/0165886 A1 | 11/2002 | Lam | | EP | 1 669 885 | 6/2006 |
| 2003/0001615 A1 | 1/2003 | Sueyoshi et al. | | FR | 2 752 466 | 2/1998 |
| 2003/0014743 A1 | 1/2003 | Cooke et al. | | GB | 2 304 438 | 3/1997 |
| 2003/0046607 A1 | 3/2003 | May et al. | | JP | 58-58672 | 4/1983 |
| 2003/0052711 A1 | 3/2003 | Taylor | | JP | 1-229378 | 9/1989 |
| 2003/0055861 A1 | 3/2003 | Lai et al. | | JP | 2-130023 | 5/1990 |
| 2003/0056085 A1 | 3/2003 | Vorbach | | JP | 2-226423 | 9/1990 |
| 2003/0056091 A1 | 3/2003 | Greenberg | | JP | 5-265705 | 10/1993 |

| | | |
|---|---|---|
| JP | 5-276007 | 10/1993 |
| JP | 5-509184 | 12/1993 |
| JP | 6-266605 | 9/1994 |
| JP | 7-086921 | 3/1995 |
| JP | 7-154242 | 6/1995 |
| JP | 8-148989 | 6/1995 |
| JP | 8-44581 | 2/1996 |
| JP | 08069447 | 3/1996 |
| JP | 8-101761 | 4/1996 |
| JP | 8-102492 | 4/1996 |
| JP | 8-221164 | 8/1996 |
| JP | 8-250685 | 9/1996 |
| JP | 9-27745 | 1/1997 |
| JP | 9-294069 | 11/1997 |
| JP | 11-184718 | 7/1999 |
| JP | 11-307725 | 11/1999 |
| JP | 2000-076066 | 3/2000 |
| JP | 2000-181566 | 6/2000 |
| JP | 2000-201066 | 7/2000 |
| JP | 2000-311156 | 11/2000 |
| JP | 2001-500682 | 1/2001 |
| JP | 2001-167066 | 6/2001 |
| JP | 2001-510650 | 7/2001 |
| JP | 2002-0033457 | 1/2002 |
| JP | 05-509184 | 12/2003 |
| JP | 3-961028 | 8/2007 |
| WO | WO90/04835 | 5/1990 |
| WO | WO90/11648 | 10/1990 |
| WO | WO92/01987 | 2/1992 |
| WO | WO93/11503 | 6/1993 |
| WO | WO94/06077 | 3/1994 |
| WO | WO94/08399 | 4/1994 |
| WO | WO95/00161 | 1/1995 |
| WO | WO95/26001 | 9/1995 |
| WO | WO98/10517 | 3/1998 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35294 | 8/1998 |
| WO | WO98/35299 | 8/1998 |
| WO | WO99/00731 | 1/1999 |
| WO | WO99/00739 | 1/1999 |
| WO | WO99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | 00/45282 | 8/2000 |
| WO | WO00/49496 | 8/2000 |
| WO | WO00/77652 | 12/2000 |
| WO | WO01/55917 | 8/2001 |
| WO | WO02/13000 | 2/2002 |
| WO | WO02/21010 | 3/2002 |
| WO | WO02/29600 | 4/2002 |
| WO | WO02/50665 | 6/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/032975 | 4/2003 |
| WO | WO03/036507 | 5/2003 |
| WO | WO2004/053718 | 6/2004 |
| WO | WO2004/114128 | 12/2004 |
| WO | WO2005/045692 | 5/2005 |

OTHER PUBLICATIONS

Ryo, A., "Auszug aus Handbuch der Informationsverarbeitung," Information Processing Society of Japan, ed., *Information Processing Handbook*, New Edition, Software Information Center, Ohmsha, Dec. 1998, 4 pages.

Asari, et al., "FeRAM circuit technology for system on a chip," *Proceedings First NASA/DoD Workshop on Evolvable Hardware*, pp. 193-197 (1999).

Lee, et al., "Multimedia extensions for general-purpose processors," *IEEE Workshop on Signal Processing Systems, SIPS 97—Design and Implementation*, pp. 9-23 (1997).

Pirsch, et al., "VLSI implementations of image and video multimedia processing systems," *IEEE Transactions on Circuits and Systems for Video Technology* 8(7): 878-891 (Nov. 1998).

Salefski, et al., "Re-configurable computing in wireless," *Annual ACM IEEE Design Automation Conference: Proceedings of the 38th conference on Design automation*, pp. 178-183 (2001).

Schmidt, et al., "Datawave: A Single-Chip Multiprocessor for Video Applications," *IEEE Micro* 11(3): 22-25 and 88-94 (Jun. 1991).

Abnous et al., "Ultra-Low-Power Domain-Specific Multimedia Processors," U.C. Berkeley, 1996 IEEE, pp. 461-470.

Abnous, A., et al., "The Pleiades Architecture," Chapter I of *The Application of Programmable DSPs in Mobile Communications*, A. Gatherer and A. Auslander, Ed., Wiley, 2002, pp. 1-33.

Ade, et al., "Minimum Memory Buffers in DSP Applications," Electronics Letters, vol. 30, No. 6, Mar. 17, 1994, pp. 469-471.

Albaharna, O.T. et al., "On the Viability of FPGA-Based Integrated Coprocessors," Dept. of Electrical and Electronic Engineering, Imperial College of Science, London, 1999 IEEE, pp. 206-215.

Alippi, et al., "Determining the Optimum Extended Instruction Set Architecture for Application Specific Reconfigurable VLIW CPUs," IEEE, 2001, pp. 50-56.

Altera, "Flex 8000 Programmable Logic Device Family," Altera Corporation product description, Jan. 2003, pp. 1-62.

Altera, "Flex 10K Embedded Programmable Logic Device Family," Altera Corporation product description, Jan. 2003, pp. 1-128.

Arabi, et al., "PLD Integrates Dedicated High-speed Data Buffering, Complex State machine, and Fast Decode Array," conference record on WESCON '93, Sep. 28, 1993, pp. 432-436.

Athanas, "A Functional Reconfigurable Architecture and Compiler for Adoptive Computing," IEEE 1993, pp. 49-55.

Athanas, et al., "An Adaptive Hardware Machine Architecture and Compiler for Dynamic Processor Reconfigutation," IEEE, Laboratory for Engineering man/Machine Systems Division of Engineering, Box D, Brown University, Providence, Rhode Island, 1991, pp. 397-400.

Athanas et al., "Processor Reconfiguration Through Instruction-Set Metamorphosis," 1993, IEEE Computers, pp. 11-18.

Atmel, 5-K-50K Gates Coprocessor FPGA with Free Ram, Data Sheet, Jul. 2006, 55 pages.

Atmel, FPGA-based FIR Filter Application Note, Sep. 1999, 10 pages.

Atmel, "An Introduction to DSP Applications using the AT40K FPGA," FPGA Application Engineering, San Jose, CA, Apr. 2004, 15 pages.

Atmel, Configurable Logic Design & Application Book, Atmel Corporation, 1995, pp. 2-19 through 2-25.

Atmel, Field Programmable Gate Array Configuration Guide, AT6000 Series Configuration Data Sheet, Sep. 1999, pp. 1-20.

Bacon, D. et al., "Compiler Transformations for High-Performance Computing," ACM Computing Surveys, 26(4):325-420 (1994).

Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.

Baumgarte, V. et al., PACT XPP "A Self-reconfigurable Data Processing Architecture," PACT Info. GmbH, Munchen Germany, 2001, 7 pages.

Beck et al., "From control flow to data flow," TR 89-1050, Oct. 1989, Dept. of Computer Science, Cornell University, Ithaca, NY, pp. 1-25.

Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).

Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002).

Becker et al., "Automatic Parallelism Exploitation for FPL-Based Accelerators." 1998, Proc. 31$^{st}$ Annual Hawaii International Conference on System Sciences, pp. 169-178.

Becker, J. et al., "Parallelization in Co-compilation for Configurable Accelerators—a Host/accelerator Partitioning Compilation Method," Poceedings of Asia and South Pacific Design Automation Conference, Yokohama, Japan, Feb. 10-13, 1998, 11 pages.

Bittner, "Wormhole Run-time Reconfiguration: Conceptualization and VLSI Design of a High Performance Computing System," *Dissertation*, Jan. 23, 1997, pp. I-XX, 1-415.

Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.

Cadambi, et al., "Managing Pipeline-reconfigurable FPGAs," ACM, 1998, pp. 55-64.

Callahan, et al., "The Garp Architecture and C Compiler," Computer, Apr. 2000, pp. 62-69.

Cardoso, J.M.P. et al., "A novel algorithm combining temporal partitioning and sharing of functional units," University of Algarve, Faro, Portugal, 2001 IEEE, pp. 1-10.

Cardoso, Joao M.P. and Markus Weinhardt, "XPP-VC: A C Compiler with Temporal Partitioning for the PACT-XPP Architecture," Field-Programmable Logic and Applications. Reconfigurable Computing is Going Mainstream, 12$^{th}$ International Conference FPL 2002, Proceedings (Lecture Notes in Computer Science, vol. 2438) Springer-Verlag Berlin, Germany, 2002, pp. 864-874.

Cardoso, J.M.P. et al., "Compilation and Temporal Partitioning for a Coarse-Grain Reconfigurable Architecture," Lysacht, P. & Rosentiel, W. eds., "New Algorithms, Architectures and Applications for Reconfigurable Computing," (2005) pp. 105-115.

Cardoso, J.M.P. et al., "Macro-Based Hardware Compilation of Java™ Bytecodes into a Dynamic Reconfigurable Computing System," Field-Programmable Custom Computing Machines (1999) FCCM '99. Proceedings. Seventh Annual IEEE Symposium on NAPA Valley, CA, USA, Apr. 21-23, 1999, IEEE Comput. Soc, US, (Apr. 21, 1999) pp. 2-11.

Cardoso, J.M.P. "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (Table of Contents and English Abtstract only).

Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.

Clearspeed, CSX Processor Architecture, Whitepaper, PN-1110-0702, 2007, pp. 1-15, www.clearspeed.com.

Clearspeed, CSX Processor Architecture, Whitepaper, PN-1110-0306, 2006, pp. 1-14, www.clearspeed.com.

Compton, K. et al., "Configurable Computing: A Survey of Systems and Software," Northwestern University, Dept. of ECE, Technical Report, 1999, (XP-002315148), 39 pages.

Cook, Jeffrey J., "The Amalgam Compiler Infrastructure," Thesis at the University of Illinois at Urbana-Champaign (2004) Chapter 7 & Appendix G.

Cronquist, D. et al., "Architecture Design of Reconfigurable Pipelined Datapaths," Department of Computer Science and Engineering, University of Washington, Seattle, WA, Proceedings of the 20$^{th}$ Anniversary Conference on Advanced Research in VSLI, 1999, pp. 1-15.

DeHon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.

DeHon, Andre, "Reconfigurable Architectures for General-Purpose Computing," Massachusetts Institute of Technology, Technical Report AITR-1586, Oct. 1996, XP002445054, Cambridge, MA, pp. 1-353.

Diniz, P., et al., "Automatic Synthesis of Data Storage and Control Structures for FPGA-based Computing Engines," 2000, IEEE, pp. 91-100.

Diniz, P., et al., "A behavioral synthesis estimation interface for configurable computing," University of Southern California, Marina Del Rey, CA, 2001 IEEE, pp. 1-2.

Donandt, "Improving Response Time of Programmable Logic Controllers by use of a Boolean Coprocessor," AEG Research Institute Berlin, IEEE, 1989, pp. 4-167-4-169.

Dutt, et al., "If Software is King for Systems-in-Silicon, What's New in Compilers?," IEEE, 1997, pp. 322-325.

Ebeling, C. et al., "Mapping Applications to the RaPiD Configurable Architecture," Department of Computer Science and Engineering, University of Washington, Seattle, WA, *FPGAs for Custom Computing Machines 1997. Proceedings., The 5th Annual IEEE Symposium*, Publication Date: Apr. 16-18, 1997, 10 pages.

Equator, Pixels to Packets, Enabling Multi-Format High Definition Video, Equator Technologies BSP-15 Product Brief, www.equator. com. 2001, 4 pages.

Fawcett, B.K., "Map, Place and Route: The Key to High-Density PLD Implementation," Wescon Conference, IEEE Center (Nov. 7, 1995) pp. 292-297.

Ferrante, J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.

Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.

Fornaciari, et al., System-level power evaluation metrics, 1997 Proceedings of the 2$^{rd}$ Annual IEEE International Conference on Innovative Systems in Silicon, New York, NY, Oct. 1997, pp. 323-330.

Franklin, Manoj et al., "A Fill-Unit Approach to Multiple Instruction Issue," Proceedings of the Annual International Symposium on Microarchitecture, Nov. 1994, pp. 162-171.

Freescale Slide Presentation, An Introduction to Motorola's RCF (Reconfigurable Compute Fabric) Technology, Presented by Frank David, Launched by Freescale Semiconductor, Inc., 2004, 39 pages.

Genius, D. et al., "A Case for Array Merging in Memory Hierarchies," Proceedings of the 9th International Workshop on Compilers for Parallel Computers, CPC'01 (Jun. 2001), 10 pages.

Gokhale, M.B.et al., "Automatic Allocation of Arrays to Memories in FPGA processors with Multiple Memory Banks," Field-Programmable Custom Computing Machines, 1999, IEEE, 6 pages.

Hammes, Jeff et al., "Cameron: High Level Language Compilation for Reconfigurable Systems," Department of Computer Science, Colorado State University, Conference on Parallel Architectures and Compilation Techniques, Oct. 12-16, 1999, 9 pages.

Hartenstein, R. et al., "A new FPGA architecture for word-oriented datapaths," Proc. FPL'94, Springer LNCS, Sep. 1994, pp. 144-155.

Hartenstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.

Hastie et al., "The implementation of hardware subroutines on field programmable gate arrays," Custom Integrated Circuits Conference, 1990, Proceedings of the IEEE 1990, May 16, 1990, pp. 31.3.1-31. 4.3 (3 pages).

Hauck, "The Roles of FPGAs in Reprogrammable Systems," IEEE, Apr. 1998, pp. 615-638.

Hauser, J.R., et al., "Garp: A MIPS Processor with a Reconfigurable Coprocessor," University of California, Berkeley, IEEE, 1997, pp. 24-33.

Hedge, S.J., "3D WASP Devices for On-line Signal and Data Processing," 1994, International Conference on Wafer Scale Integration, pp. 11-21.

Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.

Hwang, K., "Advanced Computer Architecture—Parallelism, Scalability, Programmability," 1993, McGraw-Hill, Inc., pp. 348-355.

Hwang, L. et al., "Min-cut Replication in Partitioned Networks," IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.

Hwang, K., "Computer Architecture and Parallel Processing," Data Flow Computers and VLSI Computations, XP-002418655, 1985 McGraw-Hill, Chapter 10, pp. 732-807.

IBM Technical Disclosure Bulletin, IBM Corp., New York, XP000424878, Bd. 36, Nr. 11, Nov. 1, 1993, pp. 335-336.

Inside DSP, "Ambric Discloses Massively Parallel Architecture," Aug. 23, 2006, HTTP://insidedsp.com/tabid/64/articleType/ArticleView/articleId/155/Defa . . ., 2 pages.

Intel, Intel MXP5800/MXP5400 Digital Media Processors, Architecture Overview, Jun. 2004, Revision 2.4, pp. 1-24.

Iseli, C., et al. "A C++ Compiler for FPGA Custom Execution Units Synthesis," IEEE, 1995, pp. 173-179.

Isshiki, Tsuyoshi, et al., "Bit-Serial Pipeline Synthesis for Multi-FPGA Systems with C++ Design Capture," 1996 IEEE, pp. 38-47.

Jacob, J., et al., "Memory Interfacing and Instruction Specification for Reconfigurable Processors," ACM 1999, pp. 145-154.

Jantsch, Axel et al., "A Case Study on Hardware/Software Partitioning," Royal Institute of Technology, Kista, Sweden, Apr. 10, 1994, IEEE, pp. 111-118.

John, L., et al., "A Dynamically Reconfigurable Interconnect for Array Processors," vol. 6, No. 1, Mar. 1998, IEEE, pp. 150-157.

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Kaul, M., et al., "An automated temporal partitioning and loop fission approach of FPGA based reconfigurable synthesis of DSP applications," University of Cincinnati, Cincinnati, OH, ACM 1999, pp. 616-622.

Kean, T.A., "Configurable Logic: A Dynamically Programmable Cellular Architecture and its VLSI Implementation," University of Edinburgh (Dissertation) 1988, pp. 1-286.

Kean, T., et al., "A Fast Constant Coefficient Multiplier for the XC6200," Xilinx, Inc., Lecture Notes in Computer Science, vol. 1142, Proceedings of the 6$^{th}$ International Workshop of Field-Programmable Logic, 1996, 7 pages.

Kim et al., "A Reconfigurable Multifunction Computing Cache Architecture," IEEE Transactions on Very Large Scale Integration (VLSI) Systems vol. 9, Issue 4, Aug. 2001 pp. 509-523.

Knittel, Gunter, "A PCI-compatible FPGA-Coprocessor for 2D/3D Image Processing," University of Turgingen, Germany, 1996 IEEE, pp. 136-145.

Koch, Andreas et al., "High-Level-Language Compilation for Reconfigurable Computers," Proceedings of European Workshop on Reconfigurable Communication-Centric SOCS (Jun. 2005) 8 pages.

Koch, A., et al., "Practical Experiences with the SPARXIL Co-Processor," 1998, IEEE, pp. 394-398.

Koren et al., "A data-driven VLSI array for arbitrary algorithms," IEEE Computer Society, Long Beach, CA vol. 21, No. 10, Oct. 1, 1988, pp. 30-34.

Kung, "Deadlock Avoidance for Systolic Communication," 1988 Conference Proceedings of the 15$^{th}$ Annual International Symposium on Computer Architecture, May 30, 1998, pp. 252-260.

Larsen, S. et al., "Increasing and Detecting Memory Address Congruence," Proceedings of the 2002 IEEE International Conference on Parallel Architectures and Compilation Techniques (PACT'02), pp. 1-12 (Sep. 2002).

Lee et al., "A new distribution network based on controlled switching elements and its applications," IEEE/ACT Trans. of Networking, vol. 3, No. 1, pp. 70-81, Feb. 1995.

Lee, Jong-eun et al., "Reconfigurable ALU Array Architecture with Conditional Execution," International Soc. Design Conference (ISOOC) [online] Oct. 25, 2004, Seoul, Korea, 5 pages.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317.

Mano, M.M., "Digital Design," by Prentice Hall, Inc., Englewood Cliffs, New Jersey 07632, 1984, pp. 119-125, 154-161.

Margolus, N., "An FPGA architecture for DRAM-based systolic computations," Boston University Center for Computational Science and MIT Artificial Intelligence Laboratory, IEEE 1997, pp. 2-11.

Maxfield, C., "Logic that Mutates While-U-Wait," EDN (Bur. Ed) (USA), EDN (European Edition), Nov. 7, 1996, Cahners Publishing, USA, pp. 137-140, 142.

Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).

Mei, Bingfeng, et al., "Design and Optimization of Dynamically Reconfigurable Embedded Systems," IMEC vzw, 2003, Belgium, 7 pages, http://www.imec.be/reconfigurable/pdf/ICERSA_01_design.pdf.

Miller, M.J., et al., "High-Speed FIFOs Contend with Widely Differing Data Rates: Dual-port RAM Buffer and Dual-pointer System Provide Rapid, High-density Data Storage and Reduce Overhead," Computer Design, Sep. 1, 1985, pp. 83-86.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-166.

Miyamori, T. et al., "REMARC: Reconfigurable Multimedia Array Coprocessor," Computer Systems Laboratory, Stanford University, IEICE Transactions on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.

Moraes, F., et al., "A Physical Synthesis Design Flow Based on Virtual Components," XV Conference on Design of Circuits and Integrated Systems (Nov. 2000) 6 pages.

Muchnick, S., "Advanced Compiler Design and Implementation" (Morgan Kaufmann 1997), Table of Contents, 11 pages.

Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.

Myers, G. "Advances in Computer Architecture," Wiley-Interscience Publication, 2nd ed., John Wiley & Sons, Inc., 1978, pp. 463-494.

Nageldinger, U., "Design-Space Exploration for Coarse Grained Reconfigurable Architectures," (Dissertation) Universitaet Kaiserslautern, 2000, Chapter 2, pp. 19-45.

Nilsson, et al., "The Scalable Tree Protocol—A Cache Coherence Approaches for Large-Scale Multiprocessors," IEEE, pp. 498-506, Dec. 1992.

Norman, R.S., "Hyperchip Business Summary, The Opportunity," Jan. 31, 2000, pp. 1-3.

Neumann, T., et al., "A Generic Library for Adaptive Computing Environments," Field Programmable Logic and Applications, 11$^{th}$ International Conference, FPL 2001, Proceedings (Lecture Notes in Computer Science, vol. 2147) (2001) pp. 503-512.

Olukotun, K., "The Case for a Single-Chip Microprocessor," ACM Sigplan Notices, ACM, Association for Computing Machinery, New York, vol. 31, No. 9, Sep. 1996 pp. 2-11.

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.

PACT Corporation, "The XPP Communication System," Technical Report 15 (2000), pp. 1-16.

Parhami, B., "Parallel Counters for Signed Binary Signals," Signals, Systems and Computers, 1989, Twenty-Third Asilomar Conference, vol. 1, pp. 513-516.

Piotrowski, A., "IEC-BUS, Die Funktionsweise des IEC-Bus unde seine Anwendung in Geräten und Systemen," 1987, Franzis-Verlag GmbH, München, pp. 20-25.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Razdan et al., A High-Performance Microarchitecture with Hardware-Programmable Functional Units, Micro-27, Proceedings of the $27^{th}$ Annual International Symposium on Microarchitecture, IEEE Computer Society and Association for Computing Machinery, Nov. 30-Dec. 2, 1994, pp. 172-180.

Saleeba, Z.M.G., "A Self-Reconfiguring Computer System," Department of Computer Science, Monash University (Dissertation) 1998, pp. 1-306.

Saleeba, M. "A Self-Contained Dynamically Reconfigurable Processor Architecture," Sixteenth Australian Computer Science Conference, ASCS-16, QLD, Australia, Feb. 1993, pp. 59-70.

Schmidt, H. et al., "Behavioral synthesis for FGPA-based computing," Carnegie Mellon University, Pittsburgh, PA, 1994 IEEE, pp. 125-132.

Schmit, et al., "Hidden Markov Modeling and Fuzzy Controllers in FPGAs, FPGAs for Custom Computing Machines," 1995; Proceedings, IEEE Symposium in Napa Valley, CA, Apr. 1995, pp. 214-221.

Schönfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, ( Oct. 1, 1995) vol. 11(1/2), pp. 51-74.

Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.

Shin, D., et al., "C-based Interactive RTL Design Methodology," Technical Report CECS-03-42 (Dec. 2003) pp. 1-16.

Siemers, C.,"Rechenfabrik Ansaetze Fuer Extrem Parallele Prozessoren," Verlag Heinze Heise GmbH., Hannover, DE No. 15, Jul. 16, 2001, pp. 170-179.

Siemers et al., "The .>S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the $3^{rd}$ Australian Computer Architecture Conference, Perth, John Morris, Ed., Feb. 2-3, 1998, pp. 169-178.

Simunic, et al., Source Code Optimization and Profiling of Energy Consumption in Embedded Systems, Proceedings of the $13^{th}$ International Symposium on System Synthesis, Sep. 2000, pp. 193-198.

Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.

Skokan, Z.E., "Programmable logic machine (A programmable cell array)," IEEE Journal of Solid-State Circuits, vol. 18, Issue 5, Oct. 1983, pp. 572-578.

Sondervan, J., "Retiming and logic synthesis," Electronic Engineering (Jan. 1993) vol. 65(793), pp. 33, 35-36.

Soni, M., "VLSI Implementation of a Wormhole Run-time Reconfigurable Processor," Jun. 2001, (Masters Thesis)Virginia Polytechnic Institute and State University, 88 pages.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119.

Sutton et al., "A Multiprocessor DSP System Using PADDI-2," U.C. Berkeley, 1998 ACM, pp. 62-65.

Tau, E., et al., "A First Generation DPGA Implementation," *FPD'95*, pp. 138-143.

Tenca, A.F., et al., "A Variable Long-Precision Arithmetic Unit Design for Reconfigurable Coprocessor Architectures," University of California, Los Angeles, 1998, pp. 216-225.

The XPP White Paper, Release 2.1, Pact—A Technical Perspective, Mar. 27, 2002, pp. 1-27.

TMS320C54X DSP: CPU and Peripherals, Texas Instruments, 1996, 25 pages.

TMS320C54x DSP: Mnemonic Instruction Set, Texas Instruments, 1996, 342 pages.

Tsutsui, A., et al., "Yards: FPGA/MPU Hybrid Architecture for Telecommunication Data Processing," NTT Optical Network Systems Laboratories, Japan, 1997 ACM, pp. 93-99.

Vasell et al., "The Function Processor: A Data-Driven Processor Array for Irregular Computations," Chalmers University of Technology, Sweden, pp. 1-21.

Villasenor, et al., "Configurable Computing Solutions for Automatic Target Recognition," IEEE, 1996 pp. 70-79.

Villasenor, et al., "Configurable Computing," *Scientific American*, vol. 276, No. 6, Jun. 1997, pp. 66-71.

Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.

Wada, et al., "A Performance Evaluation of Tree-based Coherent Distributed Shared Memory," Proceedings of the Pacific RIM Conference on Communications, Comput and Signal Processing, Victoria, May 19-21, 1993, pp. 390-393.

Waingold, E., et al., "Baring it all to software: Raw machines," IEEE Computer, Sep. 1997, at 86-93.

Weinhardt, M., "Compilation Methods for Structure-programmable Computers," dissertation, ISBN 3-89722-011-3, 1997. [Table of Contents and English Abstract Provided].

Weinhardt, Markus et al., "Pipeline Vectorization for Reconfigurable Systems," 1999, IEEE, pp. 52-62.

Weinhardt, Markus et al., "Pipeline Vectorization," IEEE Transactions on Computer-Aided Design of Integrated Circuits and Systems, vol. 20, No. 2, Feb. 2001, pp. 234-248.

Weinhardt, Markus et al., "Memory Access Optimization for Reconfigurable Systems," IEEE Proceedings Computers and Digital Techniques, 48(3) (May 2001) pp. 1-16.

Wittig, et al., "OneChip: An FPGA Processor with Reconfigurable Logic," IEEE, 1996, pp. 126-135.

Wolfe, M. et al., "High Performance Compilers for Parallel Computing" (Addison-Wesley 1996) Table of Contents, 11 pages.

Wu, et al., "A New Cache Directory Scheme," IEEE, pp. 466-472, Jun. 1996.

Xu, H. et al., "Parallel QR Factorization on a Block Data Flow Architecture," Conference Proceeding Article, Mar. 1, 1992, pp. 332-336 XPO10255276, p. 333, Abstract 2.2, 2.3, 2.4—p. 334.

Xilinx, "Logic Cell Array Families: XC4000, XC4000A and XC4000H," 1994, product description, pp. 2-7, 2-9, 2-14, 2-15, 8-16, and 9-14.

Xilinx, "Spartan and SpartanXL Families Field Programmable Gate Arrays," Jan. 1999, Xilinx, pp. 4-3 through 4-70.

Xilinx, "XC6200 Field Programmable Gate Arrays," Apr. 24, 1997, Xilinx product description, pp. 1-73.

Xilinx, "XC3000 Series Field Programmable Gate Arrays," Nov. 6, 1998, Xilinx product description, pp. 1-76.

Xilinx, "XC4000E and XC4000X Series Field Programmable Gate Arrays," May 14, 1999, Xilinx product description, pp. 1-68.

Xilinx, "Virtex-E 1.8 V Extended Memory Field Programmable Gate Arrays," Jul. 17, 2002, Xilinx Production Product Specification, pp. 1-118.

Xilinx, "Virtex-II and Virtex-II Pro X FPGA User Guide," Mar. 28, 2007, Xilinx user guide, pp. 1-559.

Ye, Z.A. et al., "A C-Compiler for a Processor With a Reconfigurable Functional Unit," FPGA 2000 ACM/SIGNA International Symposium on Field Programmable Gate Arrays, Monterey, CA Feb. 9-11, 2000, pp. 95-100.

Yeung, A. et al., "A data-driven architecture for rapid prototyping of high throughput DSP algorithms," Dept. of Electrical Engineering and Computer Sciences, Univ. of California, Berkeley, USA, Proceedings VLSI Signal Processing Workshop, *IEEE Press*, pp. 225-234, Napa, Oct. 1992.

Yeung, A. et al., "A reconfigurable data-driven multiprocessor architecture for rapid prototyping of high throughput DSP algorithms,"

Dept. of Electrical Engineering and Computer Sciences, Univ. of California, Berkeley, USA, pp. 169-178, *IEEE* 1993.

Zhang, et al., "Architectural Evaluation of Flexible Digital Signal Processing for Wireless Receivers, Signals, Systems and Computers," 2000; Conference Record of the Thirty-Fourth Asilomar Conference, Bd. 1, Oct. 29, 2000, pp. 78-83.

Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.

Zhang et al., "Abstract: Low-Power Heterogeneous Reconfigurable Digital Signal Processors with Energy-Efficient Interconnect Network," U.C. Berkeley (2004), pp. 1-120.

Zima, H. et al., "Supercompilers for parallel and vector computers" (Addison-Wesley 1991) Table of Contents, 5 pages.

Advanced RISC Machines, "Introduction to AMBA," Section 1, pp. 1-1 to 1-7 (Oct. 1996).

ARM, "The Architecture for the Digital World," http://www.arm.com/products, 3 pages (Mar. 18, 2009).

ARM, "The Architecture for the Digital World; Milestones," http://www.arm.com/aboutarm/ milestones.html, 5 pages (Mar. 18, 2009).

Del Corso, et al., "Microcomputer Buses and Links," Academic Press Inc. Ltd., pp. 138-143, 277-285 (1986).

"IEEE Standard Test Access Port and Boundary-Scan Architecture," IEEE Std. 1149.1-1990, pp. 1-127 (1993).

PCI Local Bus Specification, Production Version, Revision 2.1, Portland, OR, pp. 1-281 (Jun. 1, 1995).

"The Programmable Logic Data Book," Xilinx, Inc., Section 2, pp. 1-240, Section 8, pp. 1, 23-25, 29, 45-52, 169-172 (1994).

Chaudhry, G.M. et al., "Separated caches and buses for multiprocessor system," Circuits and Systems, 1993; Proceedings of the 36$^{th}$ Midwest Symposium on Detroit, MI, USA, Aug. 16-18, 1993, New York, NY IEEE, Aug. 16, 1993, pp. 1113-1116, XP010119918 ISBN: 0-7803-1760-2.

Culler, D.E; Singh, J.P., "Parallel Computer Architecture," pp. 434-437, 1999, Morgan Kaufmann, San Francisco, CA USA, XP002477559.

Jantsch, Axel et al., "Hardware/Software Partitioning and Minimizing Memory Interface Traffic," Electronic System Design Laboratory, Royal Institute of Technology, ESDLab, Electrum 229, S-16440 Kista, Sweden (Apr. 1994), pp. 226-231.

Lange, H. et al., "Memory access schemes for configurable processors," Field-Programmable Logic and Applications, International Workshop, FPL, Aug. 27, 2000, pp. 615-625, XP02283963.

Lee, Ming-Hau et al., "Designs and Implementation of the MorphoSys Reconfigurable Computing Processors," The Journal of VLSI Signal Processing, Kluwer Academic Publishers, BO, vol. 24, No. 2-3, Mar. 2, 2000, pp. 1-29.

Mei, Bingfeng et al., "Adres: An Architecture with Tightly Coupled VLIW Processor and Coarse-Grained Reconfigurable Matrix," Proc. *Field-Programmable Logic and Applications* (FPL 03), Springer, 2003, pp. 61-70.

Ohmsha, "Information Processing Handbook," edited by the Information Processing Society of Japan, pp. 376, Dec. 21, 1998.

Altera, "APEX 20K Programmable Logic Device Family," Altera Corporation Data Sheet, Mar. 2004, ver. 5.1, pp. 1-117.

Kanter, David, "NVIDIA's GT200: Inside a Parallel Processor," http://www.realworldtech.com/page.cfm?ArticleID=RWT090989195242&p=1, Sep. 8, 2008, 27 pages.

Xilinx, "Virtex-E 1.8 V Extended Memory Field Programmable Gate Arrays," (v2.2) Sep. 10, 2002, Xilinx Production Product Specification, pp. 1-52.

Xilinx, "Virtex-II and Virtex-II Pro X FPGA Platform FPGAs: Complete Data Sheet," (v4.6) Mar. 5, 2007, pp. 1-302.

Xilinx, "Virtex-II Platform FPGAs: Complete Data Sheet," (v3.5) Nov. 5, 2007, pp. 1-226.

Agarwal, A., et al., "April: A Processor Architecture for Multiprocessing," Laboratory for Computer Science, MIT, Cambridge, MA, IEEE 1990, pp. 104-114.

Almasi and Gottlieb, *Highly Parallel Computing*, The Benjamin/Cummings Publishing Company, Inc., Redwood City, CA, 1989, 3 pages. (Fig. 4.1).

Advanced RISC Machines Ltd (ARM), "AMBA—Advanced Microcontroller Bus Architecture Specification," (Document No. ARM IHI 0001C), Sep. 1995, 72 pages.

Alfke, Peter; New, Bernie, *Xilinx Application Note*, "Additional XC3000 Data," XAPP 024.000, 1994, pp. 8-11 through 8-20.

Alfke, Peter; New, Bernie, *Xilinx Application Note*, "Adders, Subtracters and Accumulators in XC3000," XAPP 022.000, 1994, pp. 8-98 through 8-104.

Alfke, Peter, *Xilinx Application Note*, "Megabit FIFO in Two Chips: One LCA Device and One DRAM," XAPP 030.000, 1994, pp. 8-148 through 8-150.

Alfke, Peter, *Xilinx Application Note*, "Dynamic Reconfiguration," XAPP 093, Nov. 10, 1997, pp. 13-45 through 13-46.

Alfke, Peter; New, Bernie, *Xilinx Application Note*, "Implementing State Machines in LCA Devices," XAPP 027.001, 1994, pp. 8-169 through 8-172.

Algotronix, Ltd., CAL64K Preliminary Data Sheet, Apr. 1989, pp. 1-24.

Algotronix, Ltd., CAL4096 Datasheet, 1992, pp. 1-53.

Algotronix, Ltd., CHS2x4 User Manual, "CHA2x4 Custom Computer," 1991, pp. 1-38.

Allaire, Bill; Fischer, Bud, *Xilinx Application Note*, "Block Adaptive Filter," XAPP 055, Aug. 15, 1996 (Version 1.0), pp. 1-10.

Altera Application Note (73), "Implementing FIR Filters in FLEX Devices," Altera Corporation, Feb. 1998, ver. 1.01, pp. 1-23.

Athanas, P. (Thesis), "An adaptive machine architecture and compiler for dynamic processor reconfiguration," Brown University 1992, pp. 1-157.

Berkeley Design Technology, Inc., *Buyer's Guide to DSP Processors*, 1995, Fremont, CA., pp. 673-698.

Bittner, R. et al., "Colt: an Experiment in Wormhole Run-Time Reconfiguration," Bradley Department of Electrical and Computer Engineering, Blacksburg, VA, SPIE—International Society for Optical Engineering, vol. 2914/187, Nov. 1996, Boston, MA, pp. 187-194.

Camilleri, Nick; Lockhard, Chris, *Xilinx Application Note*, "Improving XC4000 Design Performance," XAPP 043.000, 1994, pp. 8-21 through 8-35.

Cartier, Lois, *Xilinx Application Note*, "System Design with New XC4000EX I/O Features," Feb. 21, 1996, pp. 1-8.

Chen, D., (Thesis) "Programmable arithmetic devices for high speed digital signal processing," U. California Berkeley 1992, pp. 1-175.

Churcher, S., et al., "The XC6200 FastMap TM Processor Interface," Xilinx, Inc., Aug. 1995, pp. 1-8.

Cowie, Beth, *Xilinx Application Note*, "High Performance, Low Area, Interpolator Design for the XC6200," XAPP 081, May 7, 1997 (Version 1.0), pp. 1-10.

Duncan, Ann, *Xilinx Application Note*, "A32x16 Reconfigurable Correlator for the XC6200," XAPP 084, Jul. 25, 1997 (Version 1.0), pp. 1-14.

Ebeling, C., et al., "RaPiD—Reconfigurable Pipelined Datapath," Dept. of Computer Science and Engineering, U. Washington, 1996, pp. 126-135.

Epstein, D., "IBM Extends DSP Performance with Mfast—Powerful Chip Uses Mesh Architecture to Accelerate Graphics, Video," 1995 MicroDesign Resources, vol. 9, No. 16, Dec. 4, 1995, pp. 231-236.

Fawcett, B., "New SRAM-Based FPGA Architectures Address New Applications," Xilinx, Inc. San Jose, CA, Nov. 1995, pp. 231-236.

Goslin, G; Newgard, B, *Xilinx Application Note*, "16-Tap, 8-Bit FIR Filter Applications Guide," Nov. 21, 1994, pp. 1-5.

Iwanczuk, Roman, *Xilinx Application Note*, "Using the XC4000 RAM Capability," XAPP 031.000, 1994, pp. 8-127 through 8-138.

Knapp, Steven, "Using Programmable Logic to Accelerate DSP Functions," Xilinx, Inc., 1995, pp. 1-8.

New, Bernie, *Xilinx Application Note*, "Accelerating Loadable Counters in SC4000," XAPP 023.001, 1994, pp. 8-82 through 8-85.

New, Bernie, *Xilinx Application Note*, "Boundary Scan Emulator for XC3000," XAPP 007.001, 1994, pp. 8-53 through 8-59.

New, Bernie, *Xilinx Application Note*, "Ultra-Fast Synchronous Counters," XAPP 014.001, 1994, pp. 8-78 through 8-81.

New, Bernie, *Xilinx Application Note*, "Using the Dedicated Carry Logic in XC4000," XAPP 013.001, 1994, pp. 8-105 through 8-115.

New, Bernie, *Xilinx Application Note*, "Complex Digital Waveform Generator," XAPP 008.002, 1994, pp. 8-163 through 8-164.

New, Bernie, *Xilinx Application Note*, "Bus-Structured Serial Input-Output Device," XAPP 010.001, 1994, pp. 8-181 through 8-182.

Ridgeway, David, *Xilinx Application Note*, "Designing Complex 2-Dimensional Convolution Filters," XAPP 037.000, 1994, pp. 8-175 through 8-177.

Rowson, J., et al., "Second-generation compilers optimize semicustom circuits," Electronic Design, Feb. 19, 1987, pp. 92-96.

Schewel, J., "A Hardware/Software Co-Design System using Configurable Computing Technology," Virtual Computer Corporation, Reseda, CA, IEEE 1998, pp. 620-625.

Segers, Dennis, Xilinx Memorandum, "MIKE—Product Description and MRD," Jun. 8, 1994, pp. 1-29.

Texas Instruments, "TMS320C8x System-Level Synopsis," Sep. 1995, 75 pages.

Texas Instruments, "TMS320C80 Digital Signal Processor," Data Sheet, Digital Signal Processing Solutions 1997, 171 pages.

Texas Instruments, "TMS320C80 (MVP) Parallel Processor," User's Guide, Digital Signal Processing Products 1995, 73 pages.

Trainor, D.W., et al., "Implementation of the 2D DCT Using a Xilinx XC6264 FPGA," 1997, IEEE Workshop of Signal Processing Systems SiPS 97, pp. 541-550.

Trimberger, S, (Ed.) et al., "Field-Programmable Gate Array Technology," 1994, Kluwer Academic Press, pp. 1-258 (and the Title page, Table of Contents, and Preface) [274 pages total].

Trimberger, S., "A Reprogrammable Gate Array and Applications," IEEE 1993, Proceedings of the IEEE, vol. 81, No. 7, Jul. 1993, pp. 1030-1041.

Trimberger, S., et al., "A Time-Multiplexed FPGA," Xilinx, Inc., 1997 IEEE, pp. 22-28.

Ujvari, Dan, *Xilinx Application Note*, "Digital Mixer in an XC7272," XAPP 035.002, 1994, p. 1.

Veendrick, H., et al., "A 1.5 GIPS video signal processor (VSP)," Philips Research Laboratories, The Netherlands, IEEE 1994 Custom Integrated Circuits Conference, pp. 95-98.

Wilkie, Bill, *Xilinx Application Note*, "Interfacing XC6200 to Microprocessors (TMS320C50 Example)," XAPP 064, Oct. 9, 1996 (Version 1.1), pp. 1-9.

Wilkie, Bill, *Xilinx Application Note*, "Interfacing XC6200 to Microprocessors (MC68020 Example)," XAPP 063, Oct. 9, 1996 (Version 1.1), pp. 1-8.

XCELL, Issue 18, Third Quarter 1995, "Introducing three new FPGA Families!"; "Introducing the XC6200 FPGA Architecture: The First FPGA Architecture Optimized for Coprocessing in Embedded System Applications," 40 pages.

*Xilinx Application Note*, Advanced Product Specification, "XC6200 Field Programmable Gate Arrays," Jun. 1, 1996 (Version 1.0), pp. 4-253-4-286.

*Xilinx Application Note*, A Fast Constant Coefficient Multiplier for the XC6200, XAPP 082, Aug. 24, 1997 (Version 1.0), pp. 1-5.

Xilinx Technical Data, "XC5200 Logic Cell Array Family," Preliminary (v1.0), Apr. 1995, pp. 1-43.

Xilinx Data Book, "The Programmable Logic Data Book," 1996, 909 pages.

Xilinx, Series 6000 User's Guide, Jun. 26, 1997, 223 pages.

Yeung, K., (Thesis) "A Data-Driven Multiprocessor Architecture for High Throughput Digital Signal Processing," Electronics Research Laboratory, U. California Berkeley, Jul. 10, 1995, pp. 1-153.

Yeung, L., et al., "A 2.4GOPS Data-Driven Reconfigurable Multiprocessor IC for DSP," Dept. of EECS, U. California Berkeley, 1995 IEEE International Solid State Circuits Conference, pp. 108-110.

ZILOG Preliminary Product Specification, "Z86C95 CMOS Z8 Digital Signal Processor," 1992, pp. 1-82.

ZILOG Preliminary Product Specification, "Z89120 Z89920 (ROM-less) 16-Bit Mixed Signal Processor," 1992, pp. 1-82.

Defendants' Invalidity Contentions in *PACT XPP Technologies, AG v. Xilinx, Inc., et al.*, (E.D. Texas Dec. 28, 2007) (No. 2:07cv563)., including Exhibits A through K in separate PDF files.

IMEC, "ADRES multimedia processor & 3MF multimedia platform," Transferable IP, IMEC Technology Description, (Applicants believe the date to be Oct. 2005), 3 pages.

Becker, J., "A Partitioning Compiler for Computers with Xputer-based Accelerators," 1997, Kaiserslautern University, 326 pp.

Hartenstein et al., "Parallelizing Compilation for a Novel Data-Parallel Architecture," 1995, PCAT-94, Parallel Computing: Technology and Practice, 13 pp.

Hartenstein et al., "A Two-Level Co-Design Framework for Xputer-based Data-driven Reconfigurable Accelerators," 1997, Proceedings of the Thirtieth Annual Hawaii International Conference on System Sciences, 10 pp.

Huang, Libo et al., "A New Architecture for Multiple-Precision Floating-Point Multiply-Add Fused Unit Design," School of Computer National University of Defense Technology, China, IEEE 2007, 8 pages.

Jo, Manhwee et al., "Implementation of Floating-Point Operations for 3D Graphics on a Coarse-Grained Reconfigurable Architecture," Design Automation Laboratory, School of EE/CS, Seoul National University, Korea, IEEE 2007, pp. 127-130.

Xilinx, White Paper 370: (Virtex-6 and Spartan-6 FPGA Families) "Reducing Switching Power with Intelligent Clock Gating," Frederic Rivoallon, May 3, 2010, pp. 1-5.

Xilinx, White Paper 298: (Spartan-6 and Virtex-6 Devices) "Power Consumption at 40 and 50 nm," Matt Klein, Apr. 13, 2009, pp. 1-21.

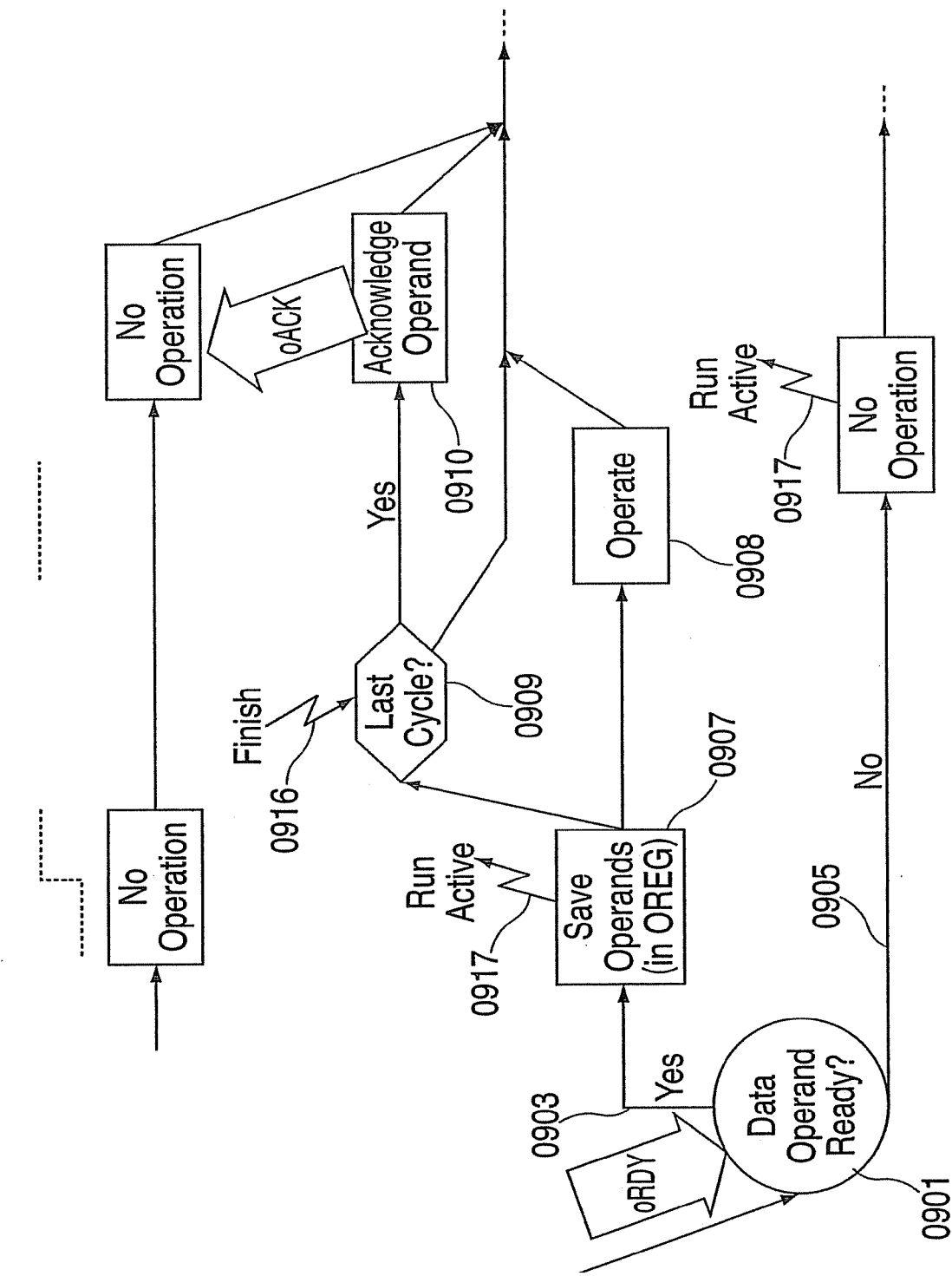
FIG. 9/1

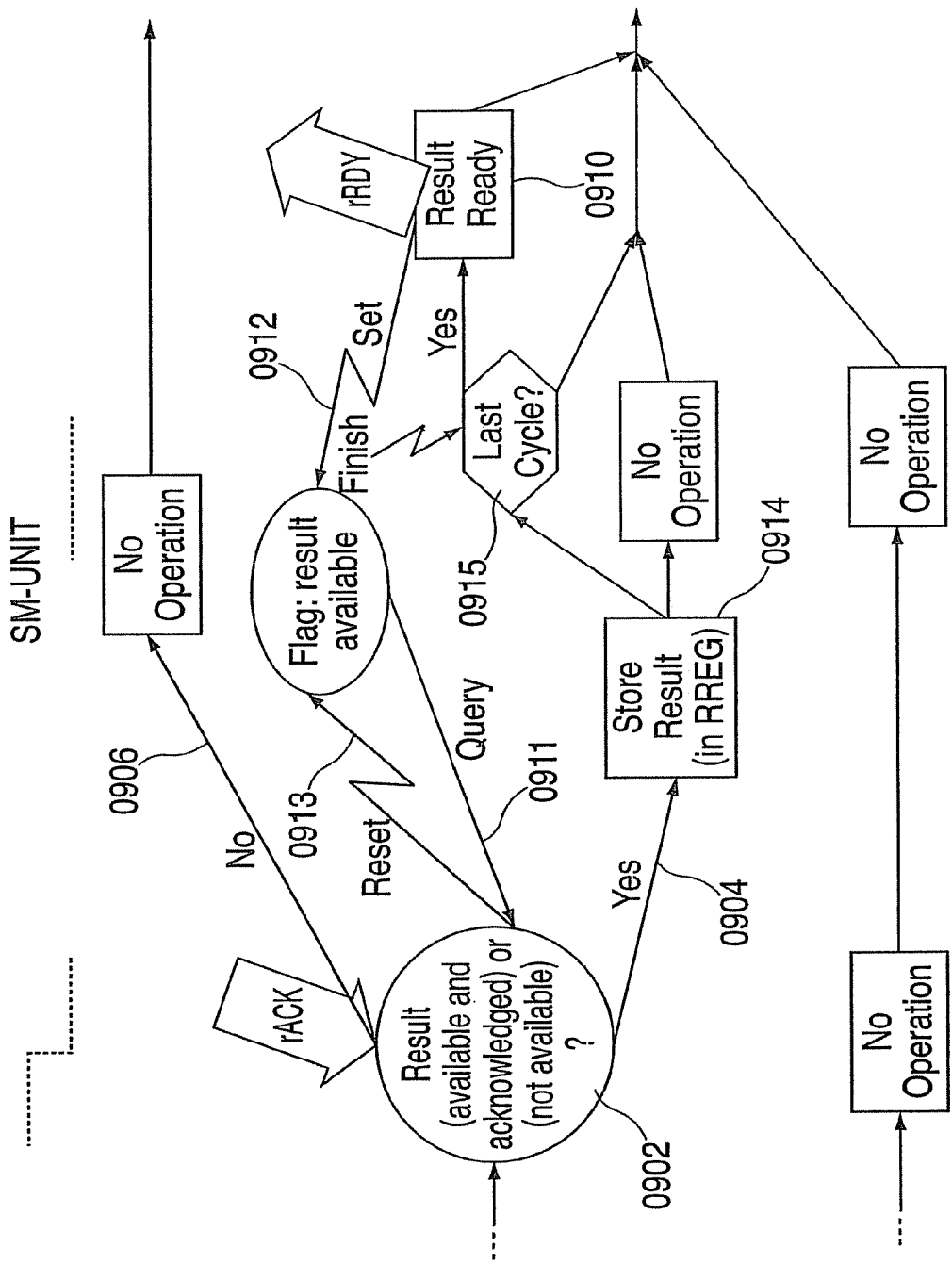
FIG. 9/2

CIRCUIT HAVING A MULTIDIMENSIONAL STRUCTURE OF CONFIGURABLE CELLS THAT INCLUDE MULTI-BIT-WIDE INPUTS AND OUTPUTS

CROSS REFERENCE TO RELATED APPLICATIONS

This application is a continuation of and claims priority to U.S. patent application Ser. No. 10/791,501, filed on Mar. 1, 2004; now U.S. Pat. No. 7,565,525 which is a continuation of and claims priority to U.S. patent application Ser. No. 10/329,132, filed Dec. 24, 2002; now U.S. Pat. No. 6,958,710 which is a continuation of and claims priority to International Application Serial No. PCT/DE97/02949, filed on Dec. 9, 1997; and which is a continuation-in-part of and claims priority to U.S. patent application Ser. No. 08/946,810, filed on Oct. 8, 1997, now U.S. Pat. No. 6,425,068 the entire contents of each of which are expressly incorporated herein by reference.

BACKGROUND INFORMATION

German Patent No. 44 16 881 describes a method of processing data, where homogeneously arranged cells which can be configured freely in function and interconnection are used.

Independently of the above-mentioned patent, field programmable gate array (FPGA) units are being used to an increasing extent to assemble arithmetic and logic units and data processing systems from a plurality of logic cells.

Another known method is to assemble data processing systems from fixed program-controlled arithmetic and logic units with largely fixed interconnection, referred to as systolic processors.

Problems

Units Described in German Patent No. 44 16 881

Units described in German Patent No. 44 16 881 (referred to below as "VPUs") are very complicated to configure owing to the large number of logic cells. To control one logic cell, several control bits must be specified in a static memory (SRAM). There is one SRAM address for each logic cell. The number of SRAM cells to be configured is very large, thus, a great deal of space and time is needed for configuring and reconfiguring such a unit. The great amount of space required is problematical because the processing power of a VPU increases with an increase in the number of cells, and the area of a unit that can be used is limited by chip manufacturing technologies. The price of a chip increases approximately proportionally to the square of the chip area. It is impossible to broadcast data to multiple receivers simultaneously because of the repeated next-neighbor interconnection architecture. If VPUs are to be reconfigured on site, it is absolutely essential to achieve short reconfiguration times. However, the large volume of configuration data required to reconfigure a chip stands in the way of this. There is no possibility of separating cells from the power supply or having them cycle more slowly to minimize the power loss.

FPGAs

FPGAs for the use in the area described here usually include multiplexers or look-up table (LUT) architectures. SRAM cells are used for implementation. Because of the plurality of small SRAM cells, they are very complicated to configure. Large volumes of data are required, necessitating a comparably large amount of time for configuration and reconfiguration. SRAM cells take up a great deal of space, and the usable area of a unit is limited by the chip manufacturing technologies. Here again, the price increases approximately proportionally to the square of the chip area. SRAM-based technology is slower than directly integrated logic due to the SRAM access time. Although many FPGAs are based on bus architectures, there is no possibility of broadcasting for rapid and effective transmission of data to multiple receivers simultaneously. If FPGAs are to be reconfigured at run time, it is absolutely essential to achieve short configuration times. However, the large volume of configuration data required stands in the way. FPGAs do not offer any support for reasonable reconfiguration at run time. The programmer must ensure that the process takes place properly without interfering effects on data and surrounding logic. There is no intelligent logic to minimize power loss. There are no special function units to permit feedback on the internal operating states to the logic controlling the FPGA.

Systolic Processors

Reconfiguration is completely eliminated with systolic processors, but these processors are not flexible because of their rigid internal architecture. Commands are decoded anew in each cycle. As described above, there are no functions which include broadcasting or efficient minimization of power loss.

SUMMARY

The present invention relates to a cascadable arithmetic and logic unit (ALU) which is configurable in function and interconnection. No decoding of commands is needed during execution of the algorithm. It can be reconfigured at run time without any effect on surrounding ALUs, processing units or data streams. The volume of configuration data is very small, which has positive effects on the space required and the configuration speed. Broadcasting is supported through the internal bus systems in order to distribute large volumes of data rapidly and efficiently. The ALU is equipped with a power-saving mode to shut down power consumption completely. There is also a clock rate divider which makes it possible to operate the ALU at a slower clock rate. Special mechanisms are available for feedback on the internal states to the external controllers.

The present invention is directed to the architecture of a cell as described in, for example, German Patent No. 44 16 881, or, or example, conventional FPGA cells. An expanded arithmetic and logic unit (EALU) with special extra functions is integrated into this cell to perform the data processing. The EALU is configured by a function register which greatly reduces the volume of data required for configuration. The cell can be cascaded freely over a bus system, the EALU being decoupled from the bus system over input and output registers. The output registers are connected to the input of the EALU to permit serial operations. A bus control unit is responsible for the connection to the bus, which it connects according to the bus register. The unit is designed so that distribution of data to multiple receivers (broadcasting) is possible. A synchronization circuit controls the data exchange between multiple cells over the bus system. The EALU, the synchronization circuit, the bus control unit and registers are designed so that a cell can be reconfigured on site independently of the cells surrounding it. A power-saving mode which shuts down the cell can be configured through the function register; clock rate dividers which reduce the working frequency can also be set.

BRIEF DESCRIPTION OF THE DRAWINGS

FIGS. 9/1-9/2 shows the functioning of an example sync UNIT.

DETAILED DESCRIPTION

Figure 1:
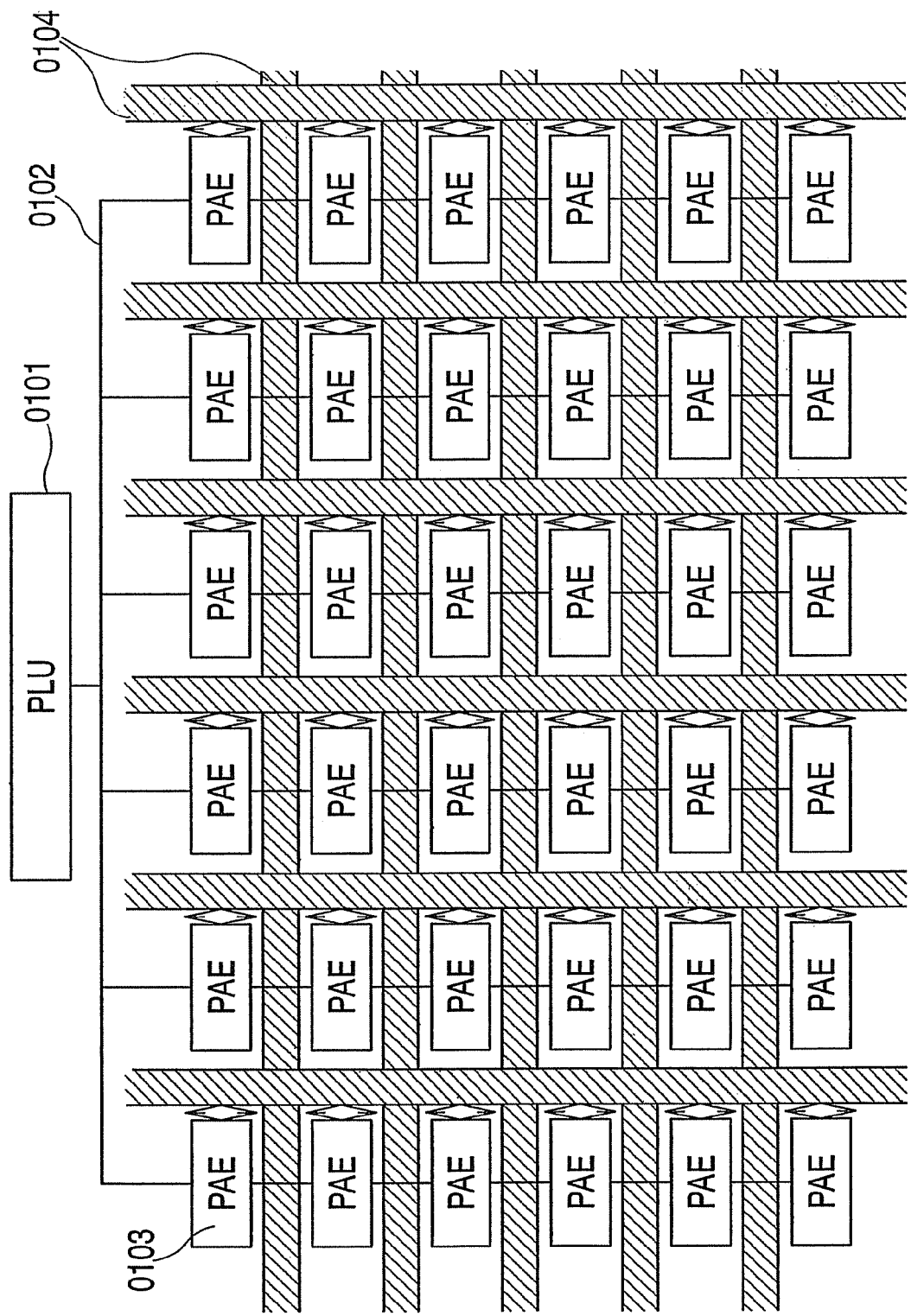
FIG. 1 shows an example arrangement of several PAEs forming one PA with PLU. Without connection to input/output systems or memories.

The present invention relates to the design of a cell (e.g., processing array element or "PAE") as described in German Patent No. 44 16 881, or, for example, conventional FPGA cells, where the PAEs can be cascaded to form an array (e.g., a processing array or "PA"). One PAE is composed of a plurality of function units.

EALU

The computing unit includes an expanded arithmetic and logic unit (EALU) permanently implemented in the logic unit. An EALU is an ordinary known arithmetic and logic unit (ALU) which has been expanded by special functions such as counters. This EALU is capable of performing a plurality of arithmetic and logic operations; which do not have to be specified here exactly, because it is possible to refer to known ALUs. The EALU has direct access to its own results (described below) which are returned as the operand. Thus counters or serial operations such as serial multiplication, division or series expansion are possible. In addition to its result, the EALU delivers the signals CarryOut-AlessB and AequalB-0detect. CarryOut-AlessB specifies either the carry-over in arithmetic operations, or in comparisons by means of subtraction of two values, it specifies the carry-over, i.e., CarryOut-AlessB, that A<B or B<A, depending on the operand negated. The signal is the usual carry-over generated by a full adder. AequalB-0detect specifies that the result in the result register R-REGsft is zero. The signal is generated by a NOR element from the result. The signals are used for simple status analysis and can be returned to the PLU. Additional status signals can be implemented, depending on the application.

The function of the EALU is configured in a function register (F-PLUREG).

O-REG

The input operands of the EALU are stored in two independent operand registers (O-REG). The input operands are thus available independently of the status of the unit supplying the data (data transmitter). This permits decoupling from the bus and for the PAs to be freely reconfigurable. One or both O-REGs have a shift function which is triggered by the EALU, for each O-REG individually, if so required. The shift function makes it possible to perform serial operations such as serial multiplication or division in the EALU. O-REGsft denotes O-REGs with a shift function.

R-REGsft

The result of the EALU is stored in a result register (R-REGsft). This provides time independence of the unit or units receiving the result (data receivers). The R-REGsft has a shift function which is triggered by the EALU, thus permitting serial operations.

R2O MUX

The result data available in R-REGsft is introduced as an operand through a multiplexer (R2O-MUX) between one of the O-REGs and the EALU to guarantee feedback of results for serial operations, counters and similar functions. The multiplexer is set by the F-PLUREG.

Clock Cycles

It is appropriate but not absolutely necessary to trigger the O-REGsft at a clock pulse edge and the R-REGsft at the subsequent negated clock pulse edge. Thus, the EALU has a half clock pulse available to carry out its function; the second half clock pulse is available for signal propagation times and multiplexers. Thus, it is possible to perform a complete operation in each clock pulse.

StateMachine, SM Unit

An SM UNIT is available for sequence control in the EALU. The SM UNIT controls the O-REG and R-REGsft and their shift function, as well as controlling the R2O-MUX. Consequently, serial operations and shift and counting functions can be performed easily by the EALU. The state machine is easy to implement by the conventional methods.

Sync UNIT

A synchronization unit (Sync UNIT) is provided for synchronization of one PAE in an array (PA) of PAEs. The Sync UNIT analyzes a series of input signals, which execute a handshake protocol.

rACK(h/l): The data receiver acknowledges the data received, rACKh being the acknowledgment of the high result byte (bits 8 through 15) and rACKl being the acknowledgment of the low result byte (bits 0 through 7). The two are linked with an AND (rACKh AND rACKl) and yield the signal rACK. rACK is not true while one or both data receivers are busy processing their data and becomes true when the processing of the data of both data receivers is concluded, and the result is stored in the R-REGsft of the respective data receiver. The rACK(h/l) signals are often considered below in their AND-linked form as rACK (=rACKh & rACKl).

oRDY(½): The data transmitter signals its readiness to send new data. oRDY is not true while the data transmitter is busy processing its data, and it becomes true when the result of the data transmitter, which is the operand of the PAE, is available. oRDY1 is the enable signal of the data transmitter of the first operand, and oRDY2 is that of the second. The two are linked with an AND (oRDY1 AND oRDY2) and yield the oRDY signal. oRDY is true only when both data transmitters are ready to send data. The oRDY(½) signals are often considered below in their AND-linked form as oRDY (=oRDY1 & oRDY2).

Output signals generated from the input signals and the status of the sync UNIT which, together with the sequence control of the EALU, represent the overall status of the PAE; those output signals are in turn regarded as input signals by the sync UNITs of the data transmitters and receivers. Status information and the F-PLUREG register are used for sequence control of the EALU.

rRDY: Indicates that the PAE has finished its data processing and a result is available in R-REGsft. rRDY is transmitted as rRDYh and rRDY1 to both data receivers. However, it is the same signal in each case.

oACK: Indicates that the PAE has processed its operands and can receive new data in O-REG(sft). oACK is transmitted as oACK1 and oACK2 to both data transmitters. However, it is the same signal in each case.

The RDY signals retain their level up to the input of the acknowledgment through ACK. This is necessary when the data receiver is reconfigured while the data are being made available. If RDY is applied until acknowledged through ACK, the data receiver will recognize after the reconfiguration that data is available and will accept it.

The linking of the signals over multiple PAEs is as follows:

| Data transmitter | | PAE | | Data receiver |
|---|---|---|---|---|
| rRDY | → | oRDY rRDY | → | oRDY |
| rACK | ← | oACK rACK | ← | oACK |

This means that the output signal rRDY of the data transmitter, for example, represents the input signal oRDY1 or oRDY2 of PAE. The output signal rRDY of PAE is the input signal oRDY of the data receiver.

The sync UNIT has the following types of sequences:

| Mode | Description | Comments |
|---|---|---|
| Wait OP | The PAE waits for operands | Only if no multiple-cycle operation is taking place |
| Cycle 1 | A single-cycle operation is being carried out | Operands are acknowledged |
| Cycle n | One cycle of a multiple-cycle operation is being carried out | — |
| Cycle Z | The last cycle of a multiple-cycle operation is being carried out | Operands are acknowledged |
| Wait ERG | The PAE waits for acknowledgment of the result | Only if a preceding result exists |
| Stop | Stops execution after conclusion of the current cycle, then acknowledges | |
| | ReConfig if the result has also been acknowledged | |

The sync UNIT makes available a special mode which enables the clock signal only when operands are available. This mode is appropriate especially when the data transmitters do not supply the data in each clock pulse of the processor but instead only in every $n^{th}$ clock pulse. Then the clock cycle corresponds to one period of the normal clock cycle and is enabled through rACK or oRDY(½). The enable is referred to as OneShot. This mode is called the OneShot MODE. The clock pulse is AND-linked with one of the enable signals through an AND gate. The mode and signal selection take place through F-PLUREG. The enable signal generated through rACK or oRDY(½) can be lengthened by the SM UNIT. This is necessary so that operations which need more than one cycle can be carried out in one-shot MODE. To make this possible, a corresponding signal line of the SM UNIT is OR-linked to the enable signal.

If the registry entry STOP is set in F-PLUREG, the sync UNIT runs the current function to the end. Thereafter, no more operands are accepted or acknowledged. As soon as rACK indicates that the result has been accepted by the data receiver, the readiness of the PLU for reconfiguration is indicated by the ReConfig signal. The signal is generated when rACK stores the stop of F-PLUREG in a D flip-flop. ReConfig can be polled by read access of the PLU to F-PLUREG at the stop bit position.

Likewise, the sync UNIT can be used to generate and analyze error states or other status signals.

BM UNIT

To apply the operands and the result to the external bus systems, there is a bus multiplex unit (BM UNIT). The BM. UNIT has two multiplexers and two gates, with the two multiplexers being for the operands (O-MUX) and the two gates for the result (R-GATE), one switch being for the higher-order result and one for the low-order result. The multiplexers and switches are controlled over the multiplexer register (M-PLUREG). The sync UNIT signals are controlled over the switches to the bus. The correlation of the multiplexers/switches and signals is as follows:

O-MUX1:oRDY1, oACK
O-MUX2:oRDY2, oACK
RH-GATE:rRDY, rACKh
RL-GATE:rRDY, rACKl

The R-GATE can be brought by M-PLUREG to a state in which it does not drive a bus system.

The table gives a description of the signals and their respective interface architecture:

| Signal | oRDY | oACK | rRDY | rACK | D7-0 |
|---|---|---|---|---|---|
| Indicates | operands ready | operands acknowledged | result ready | result acknowledged | data |
| Type | input | open collector | driver | input | bidirectional |

It is possible to operate several data receivers from one data transmitter (broadcasting). To do so, several data receivers are connected to the same bus. To guarantee acknowledgment of the data, the driver stage of the acknowledgment line oACK is designed as an open collector driver. The bus operates as wired AND, i.e., only when all data receivers have acknowledged the data does the H level required for the acknowledgment occur. This is accomplished by the fact that this data receiver which does NOT acknowledge the data pulls the bus to an L level over an open collector transistor. Data receivers which acknowledge the data do not trigger the open collector transistor and thus add no load to the bus. When all the data receivers have acknowledged the data, there is no more load on the bus and it assumes an H level via a pull-up resistor.

State-Back UNIT

The PAE is capable of supplying feedback about its operating state to its primary logic unit, hereinafter called PLU (see DE 44 16 881 A1). The primary logic unit configures the PA and requires information about the status of the individual PAEs in order to be able to perform appropriate reconfigurations. This is done through the StateBack UNIT. This transmits either the lower 3-bit of the result from the R-REGsft—to deliver calculated values to the PLU—or the CarryOut-AlessB and AequalB-0detect signals to a 3-bit status bus, depending on the entry in the F-PLUREG. To allow signals to be impressed from several PAEs, a simple wired-OR method over open collector drivers is used. In order for the reconfiguration of the PAE to begin only when the receiver has acknowledged the data, a latch unit can be inserted between the signals and the open collector drivers to enable the signals only after receipt of rACK. The status bus is monitored by the PLU, which reacts by its program flow and reconfiguration to the status supplied by the bus.

Power UNIT

The PAE has a power-saving mode (Sleep MODE) which, like the function of the EALU, is set in F-PLUREG. There is a bit for this which, when set, starts the sleep MODE. To do so, either the clock line of the PAE is set at a constant logic 0 or 1, or the voltage of the PAE is turned off via a transistor. F-PLUREG is always energized within the PAE and cannot be switched off. Unused areas (gates) of the PAE for the function executed are switched off by analysis of the F-PLUREG. This is done through a transistor which isolates those areas from the power supply. To prevent unwanted interference, the outputs of the areas are defined over pull-up/pull-down resistors.

In addition, the power save MODE can also be used within the one-shot MODE which is controlled by the sync UNIT. All parts of the PAE except the F-PLUREG, M-PLUREG and sync UNIT are isolated from the power supply. Only when the sync UNIT senses a one-shot mode are all the required PAE parts connected over the power UNIT. The sync UNIT delays the clock signal until all the newly connected parts are capable of functioning.

Registers

The F-PLUREG and M-PLUREG registers are connected to the PLU bus. The addresses of the data packages sent by the PLU are decoded in a comparator. If the address of the PAE is recognized, the data is stored in the registers. The PLU bus has the following architecture:

AX7-0: X address of the X/Y matrix
AY7-0: Y address of the X/Y matrix
RS: Register select; logic 0 selects F-PLUREG, logic 1 selects M-PLUREG
AEN: Address enable; the bus contains a final address. The addresses must be decoded as long as AEN is logic 0. AEN is logic 0 during the entire bus access, i.e., also during the data transmission.
D23-00: Data
DEN: Data enable; the bus contains final data. The data must be transferred to the register at the rising edge of the DEN signal.
OEN: Output enable; the PLU reads valid data out of the PLUREGs.

Architecture of F-PLUREG:

1. The architecture of the register in write access:

| F11 | F10-9 | F8 | F8 | F5 | F4-0 |
|---|---|---|---|---|---|
| Stop | StateBack | Sleep | OneShot | PowerSave | EALU function |

The functions of the individual bits:

| Function | State | Effect |
|---|---|---|
| Stop | 0 | Normal function |
| | 1 | Stop functions after current cycle, no acknowledgment of the operands |
| StateBack | 00 | No feedback, bus open |
| | 01 | D2-0 to bus |
| | 10 | CarryOut-AlessB, AequalB-0detect to bus |
| | 11 | Illegal |
| Sleep | 0 | No function, de-energized |
| | 1 | Normal function, energized |
| OneShot | 00 | Normal function |
| | 01 | OneShot to oRDY1 |
| | 10 | OneShot to oRDY2 |
| | 11 | OneShot to (rACKh & rACKl) |
| PowerSave | 0 | No PowerSave |
| | 1 | Power-saving mode in combination with one-shot mode |
| EALU function | 00000 | No operation (NOP) |
| | 00001 | |
| | ... | Function according to design of the EALU |
| | 11111 | |

The reset state is 0 in all bits.

2. Register architecture in read access:

| F11 |
|---|
| ReConfig |

The functions of the individual bits:

| Function | State | Effect |
|---|---|---|
| ReConfig | 0 | No reconfiguration possible |
| | 1 | Reconfiguration possible |

The reset state is 0 in all bits.

Architecture of M-PLUREG:

| M23-18 | M17-12 | M11-06 | M05-00 |
|---|---|---|---|
| High-order result | Low-order result | Operand 1 | Operand 0 |

The values M(n+5)–.n=000000, n∈{0, 6, 12, 18} mean that the multiplexers/switches are open and have no bus contact. It may be appropriate to block M-PLUREG via the ReConfig signal, i.e., as soon as ReConfig is activated, PAE disconnects from all bus systems. The reset status is 0 in all bits.

Summary

The function of PAE can be configured and reconfigured more easily and quickly than in known technologies, in particular the FPGA technology. The interconnection of the ALU is specified in M-PLUREG, whereas in the traditional technologies a plurality of individual unrelated configuration bits must be occupied. The transparent architecture of the registers simplifies (re)configuration.

Due to the direct design as an ALU, the PAE requires less space than in traditional technologies where ALUs have been implemented by a plurality of logic cells. At the same time, the run delays are lower and the attainable clock frequencies are higher accordingly.

A broadcasting function is guaranteed due to the design of the BM UNIT, and acknowledgment is automatic. A data transfer that is largely independent in time is guaranteed due to the input and output registers (O-REG, R-REG).

Configuration and reconfiguration are greatly simplified due to the decoupling of each PAE from the overall system through the O-REG and R-REG registers since the individual PAEs are largely independent of one another. Feedback to the PLU as well as the interaction of STOP and ReConfig permit efficient control of (re)configuration.

Power saving functions have been implemented which lead to a reduction in power consumption—automatically to some extent (one-shot MODE).

The PAE architecture can be implemented in the FPGAs to increase their efficiency. Arithmetic operations can thus be implemented much more efficiently.

DESCRIPTION OF THE FIGURES

Referring now to the figures, FIG. 1 shows a simplified processor according to German Patent 44 16 881 A1. The PLU (0101) and its bus system (0102) are shown. The PAEs (0103) are shown as an array, and the internal bus system (0104) in the chip is indicated schematically.

Figure 2:
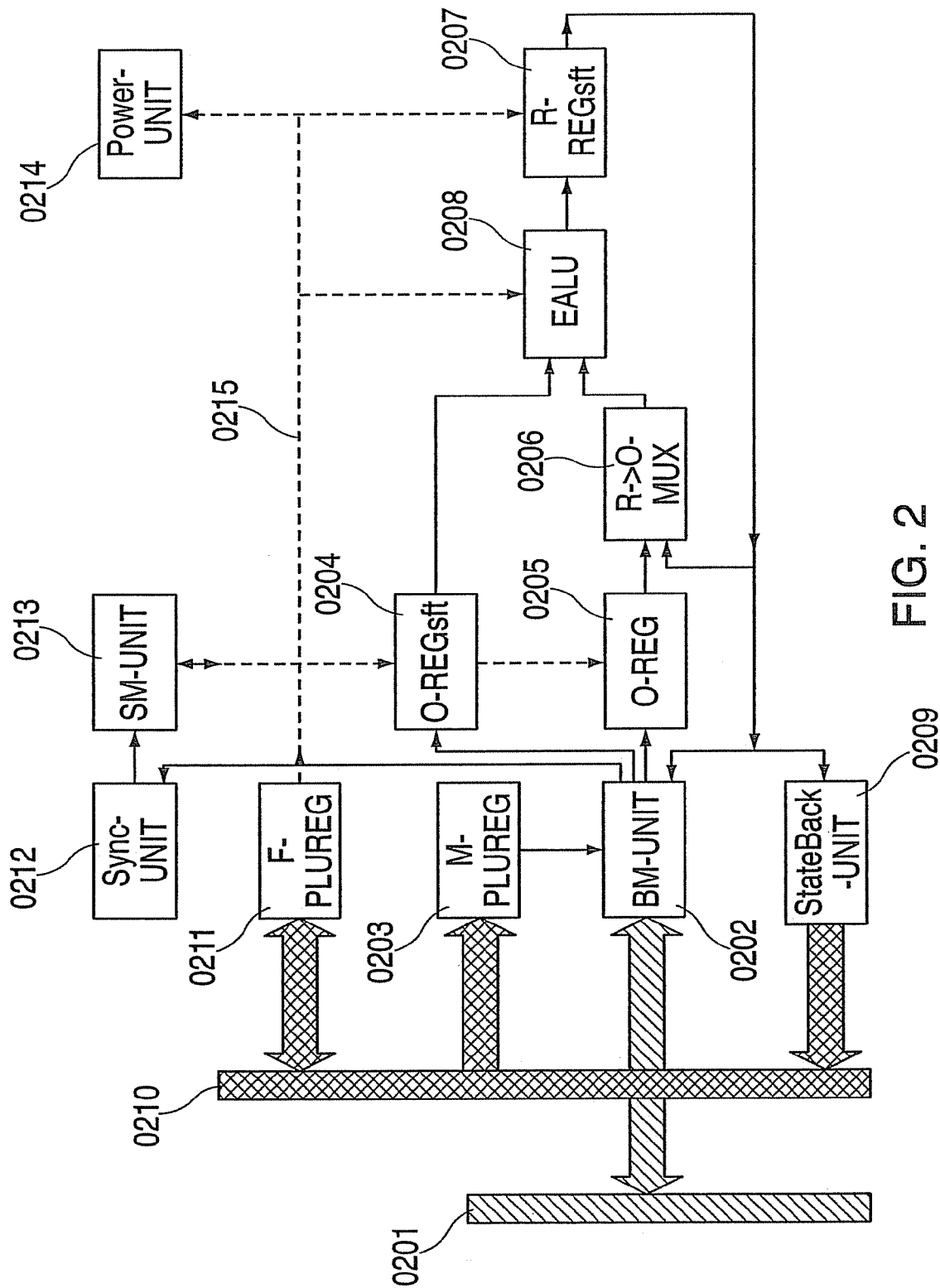
FIG. 2 shows an example architecture of a PAE.

FIG. 2 shows the schematic architecture of a PAE. The internal bus system (0201) within the chip is connected to the BM UNIT (0202) which connects the buses selected by M-REG (0203) to O-REG1sft (0204) as operand 1 and O-REG (0205) as operand 2. The result available in result register R-REGsft (0207) is optionally introduced into the data path of operand 2 over R2O-MUX (0206). The data from O-REGsft (0204) and R2O-MUX (0206) are processed in the EALU (0208). Feedback goes to the PLU over the state-back UNIT (0209). The PLU bus (0210) is connected to the F-PLUREG (0211) and M-PLUREG (0212) registers and to the state-back UNIT (0209), and the PAE is configured and monitored over it. F-PLUREG contains all functional configuration data, M-PLUREG contains the interconnection information of the PAE. The sync UNIT (0212) controls the interaction of the data exchange between the data transmitters, the data receivers and the processing PAE. The SM UNIT (0213) controls the entire internal sequence of the PAE. The power UNIT (0214) regulates the power supply and serves to reduce power consumption.

Figure 3:
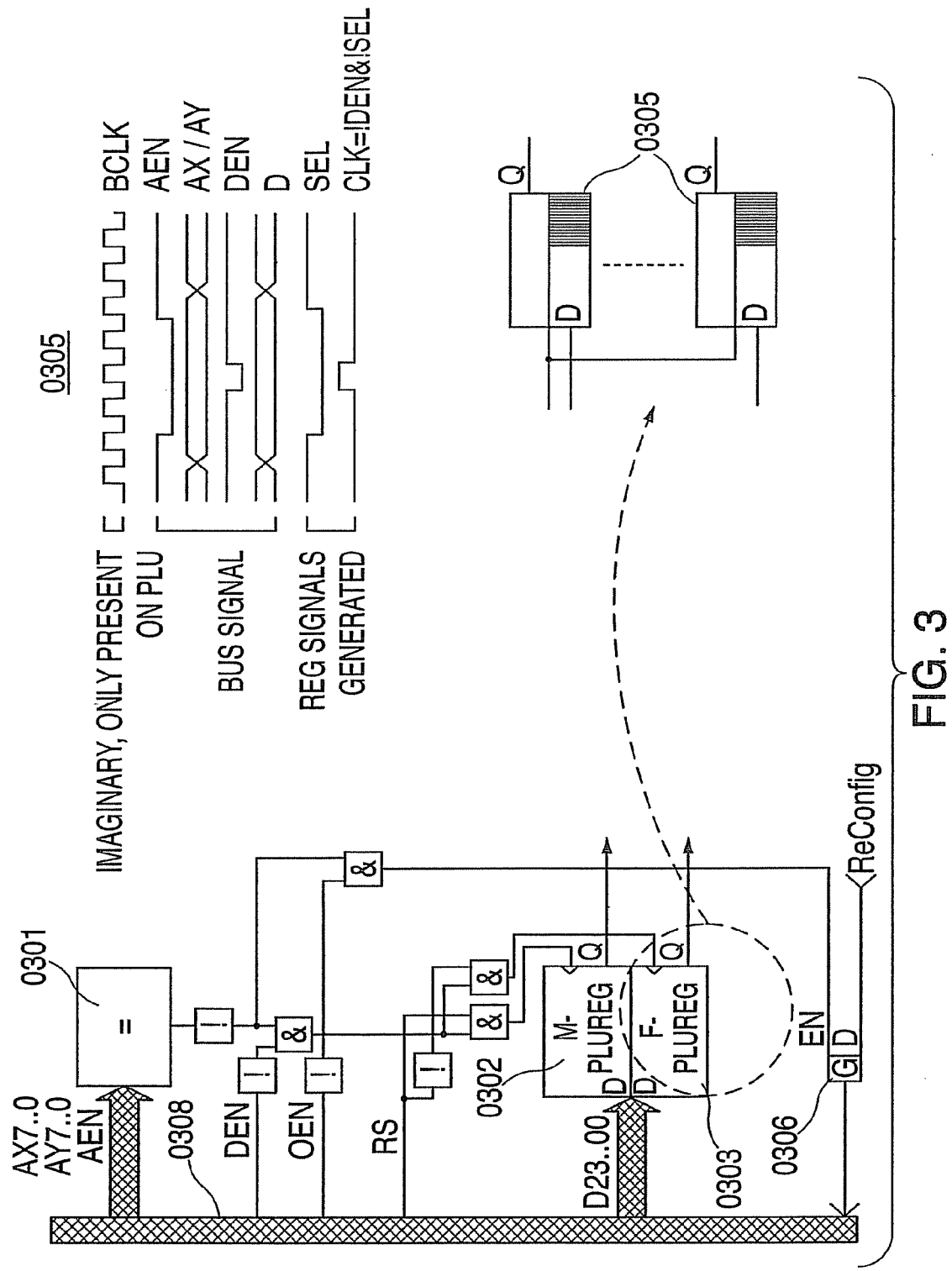
FIG. 3 shows an example architecture of F-PLUREG and M-PLUREG.

FIG. 3 illustrates the functioning of the M-PLUREG and F-PLUREG registers. The AX and AY addresses of the PLU bus (0308) are compared with the address of PAE in a comparator (0301) if AEN (address enable) indicates a valid bus transfer. Each PAE has a unique address composed of its line and column within a PA. If DEN (data enable) indicates data transmission, then either M-PLUREG (0302) or F-PLUREG (0303) is selected over RS (register select). The data are stored in the respective register at the rising edge of DEN. The registers are implemented as D flip-flops (0304). Timing diagram 0305 illustrates the sequence. The ReConfig signal is sent from the sync UNIT to the PLU bus only over the gate (0306) for read access to the F-PLUREG. Enable is based on the result of the comparator (0301) AND the OEN signal.

Figure 4A:
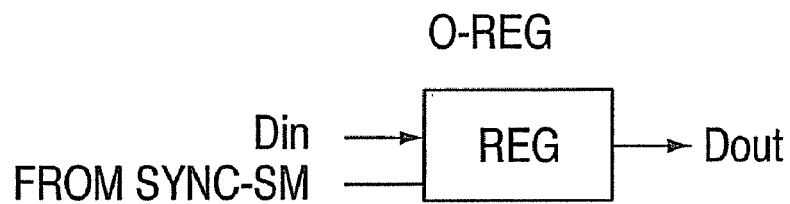
FIGS. 4a-4c shows an example architecture of an O-REG.
Figure 4B:
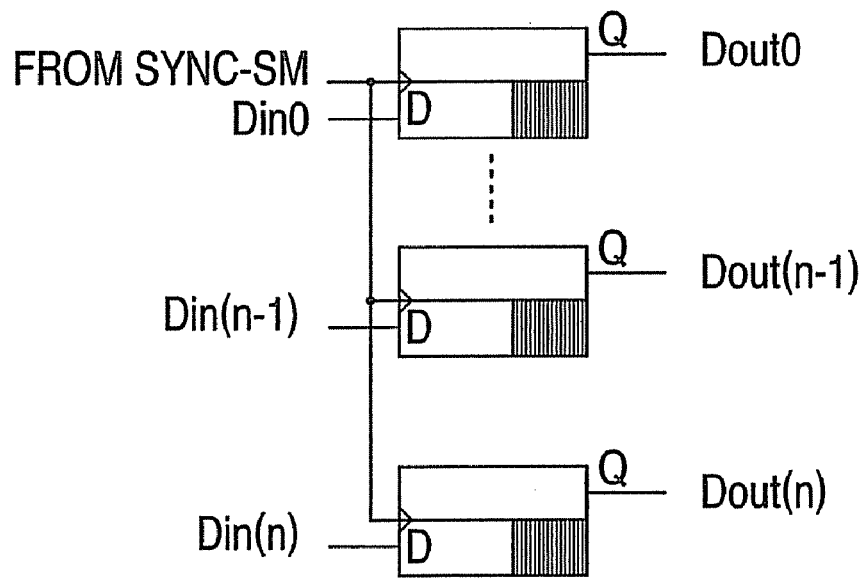
Figure 4C:
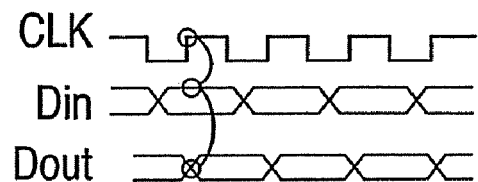

FIG. 4*a* shows a block diagram of O-REG. FIG. 4*b* shows how the O-REG is constructed of D flip-flops. FIG. 4*c* shows the timing diagram. The clock signal is generated by SYNC-SM.

Figure 5A:
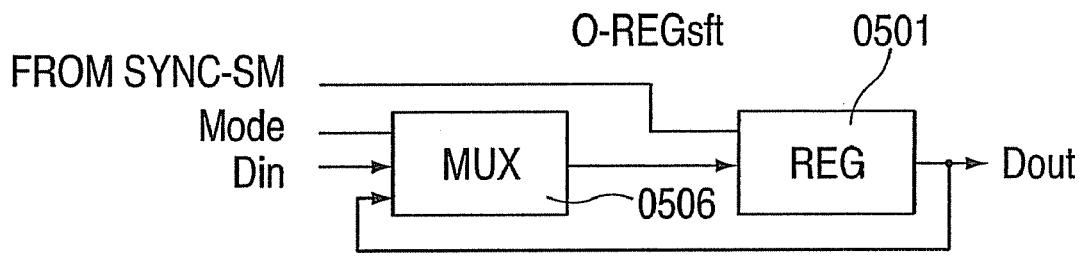
FIGS. 5a-5c shows an example architecture of an O-REGsft with a right shift function.
Figure 5B:
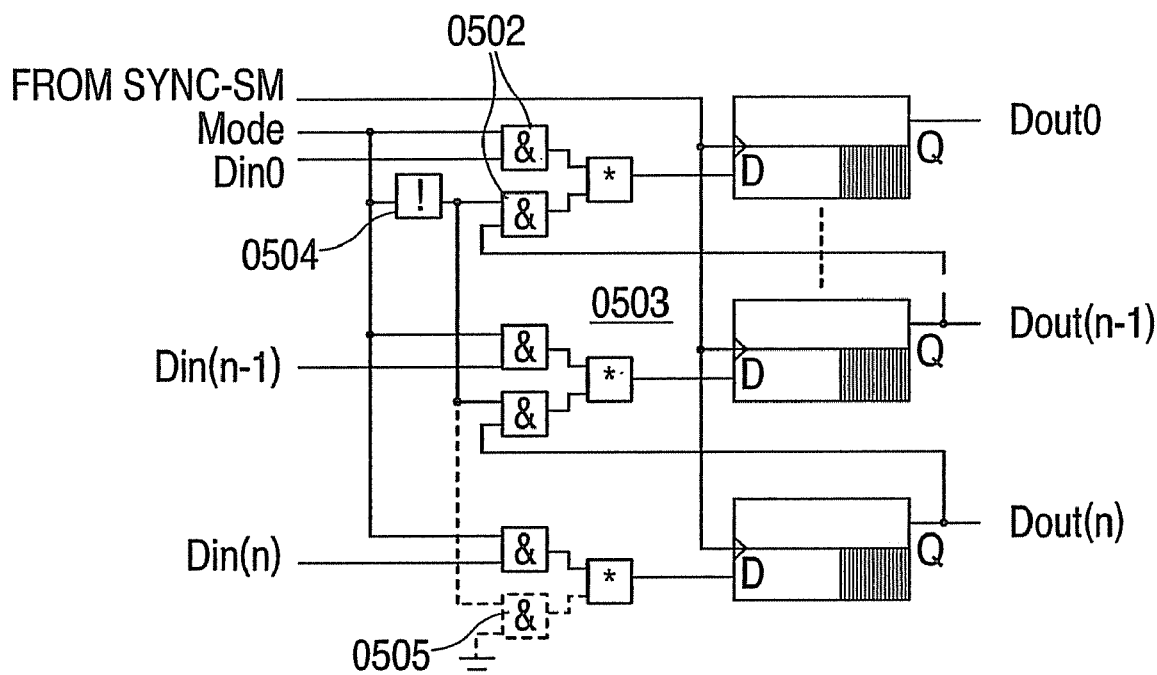
Figure 5C:
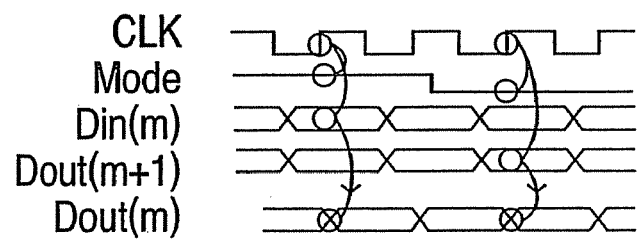

FIG. 5*a* shows a block diagram of O-REGsft. FIG. 5*b* shows how O-REGsft is constructed of D flip-flops (0501). The AND gates (0502) and OR gates (0503) form, via the inverter (0504), a mode-controlled multiplexer (0506) which either switches the input data to the D flip-flops (0501) or sends the output-data of the D flip-flops, shifted by one bit, to their inputs. The AND gate (0505) is not necessary, because one input is permanently at logic 0. It is shown only for the purpose of illustration. FIG. 5*c* shows the timing diagram as a function of the signal mode. The clock pulse is generated by SYNC-SM.

Figure 6A:
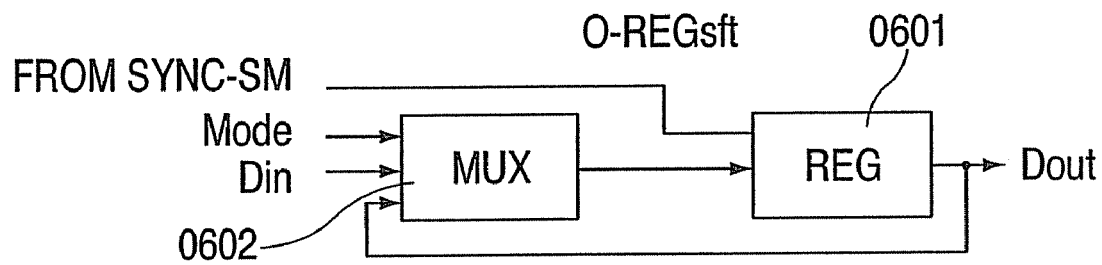
FIGS. 6a-6c shows an example architecture of an R-REGsft with right/left 1-2-bit barrel shifter.
Figure 6C:
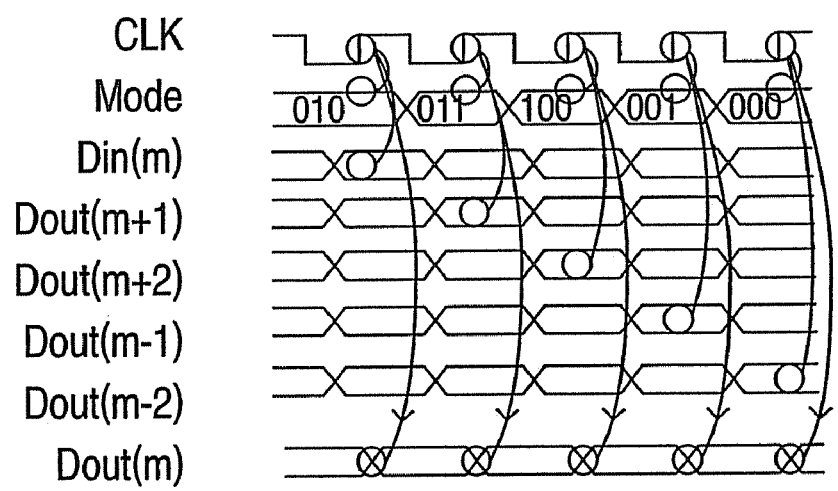
Figure 6B:
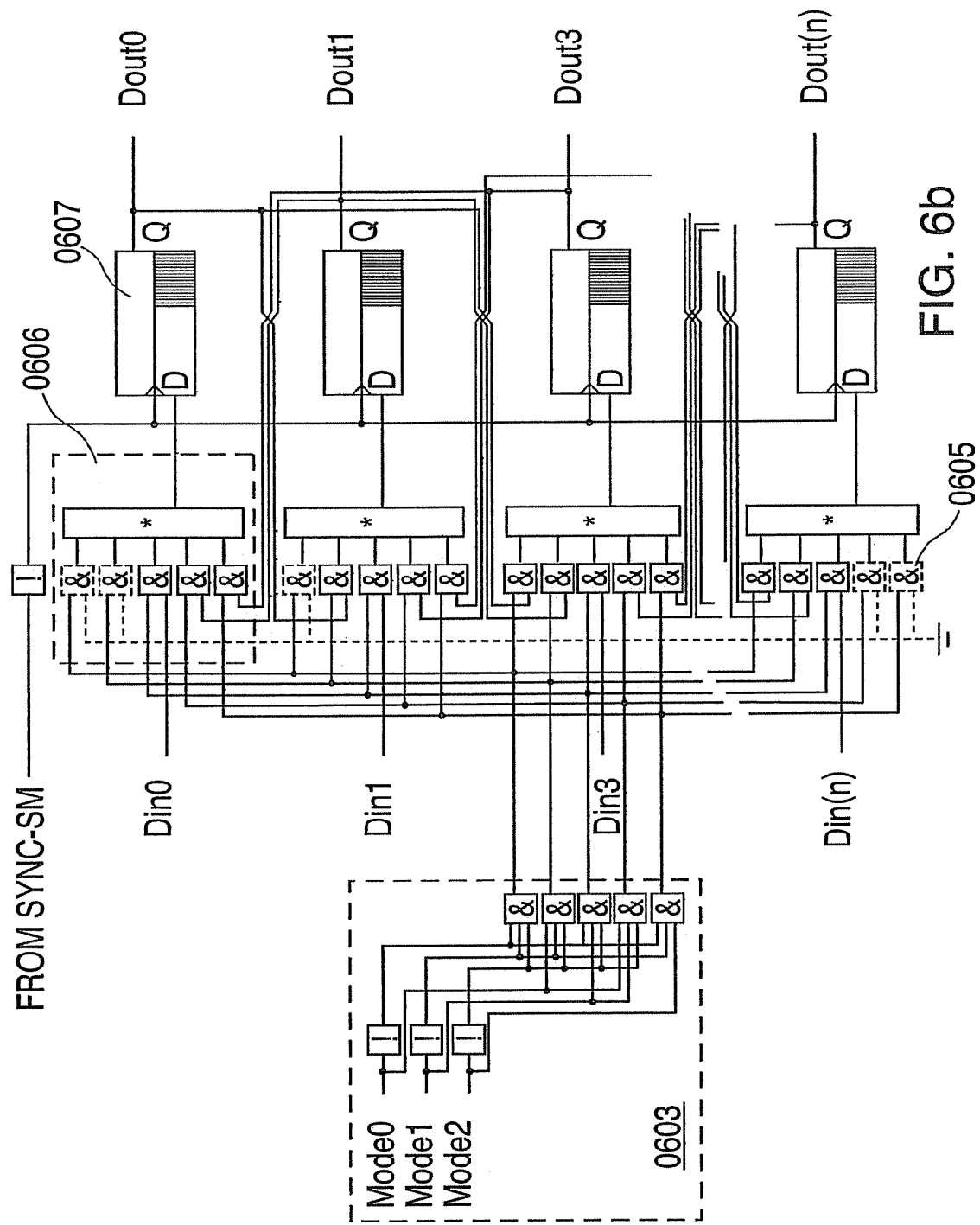

FIG. 6*a* shows the block architecture of R-REGsft. Upstream from the register (0601) there is a multiplexer (0602) which either switches the input data to the register (0601) or directs the shifted output data of the register (0601) to its input. The clock pulse generated by SYNC-SM is sent to the register, shifted by one half clock pulse. FIG. 6*b* shows the block diagram on a gate level. Modes 0-2 switch a multiplexer (0606) consisting of AND gates with a downstream OR gate via a decoder (0603). Gates shown with dotted lines (0605, etc.) are shown only for the sake of illustration. They are functionless, because one input is constantly at L. The multiplexer switches the input signal to the registers (0607) in modes 0-2=010. In modes 0-2=000 to modes 0-2=001, the output values of the registers (0607) are shifted by one bit to the left, and in modes 0-2=011 to modes 0-2=100 they are shifted by two bits to the right and sent to the inputs of the registers. The timing diagram in FIG. 6*c* illustrates the shift function, depending on modes 0-2.

Figure 7A:
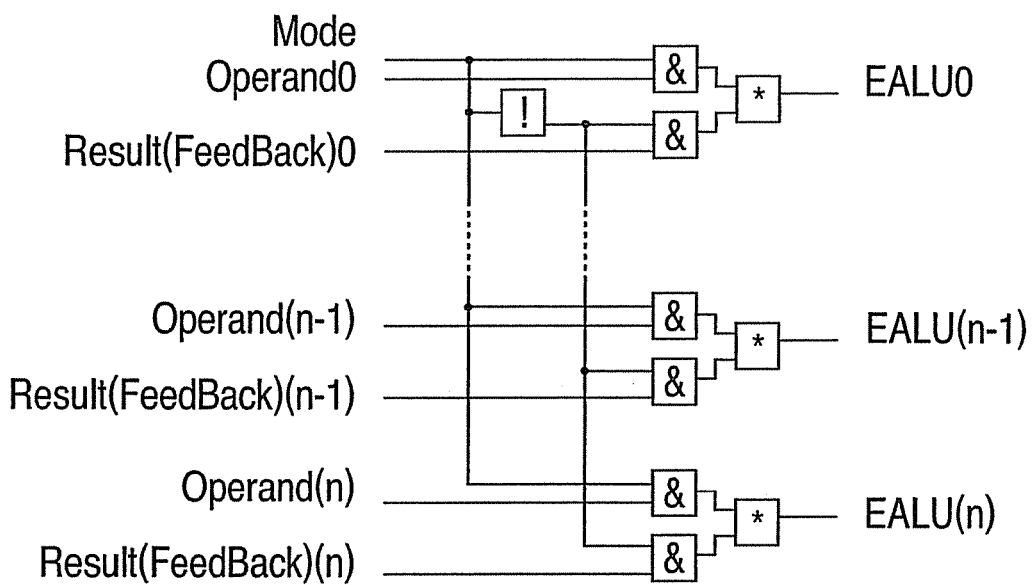
FIGS. 7a-7b shows an example architecture of the R2O-MUX and implementation of a MUX in transfer gate technology.
Figure 7B:
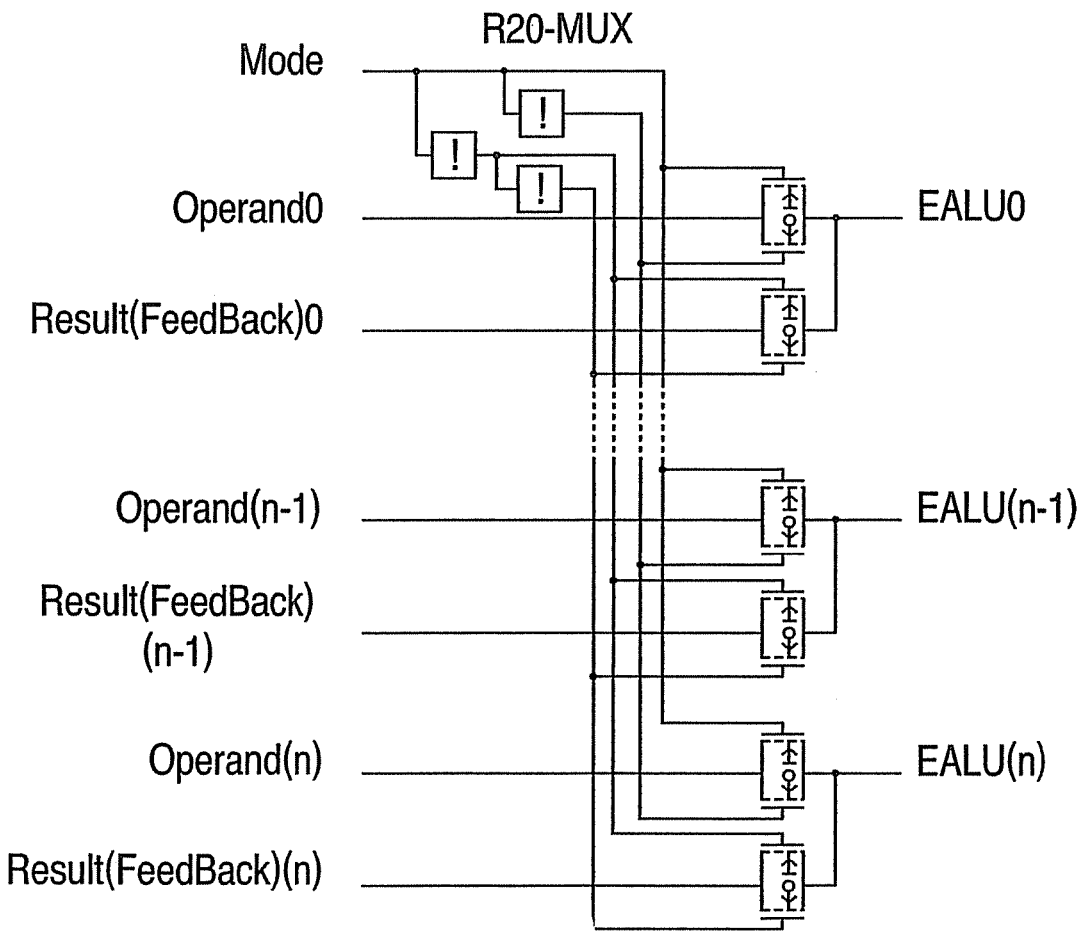

FIG. 7*a* shows the architecture of multiplexer R20-MUX which sends the operands or the result to EALU as a function of mode. FIG. 7*a* shows a traditional multiplexer design, while FIG. 7*b* shows the space-saving and power-saving variant due to the use of CMOS transfer gates (0701). All the multiplexers described in this document can be constructed with transfer gates.

A gate may be composed of transfer gates in a design equivalent to that of the multiplexer. However, the direction of data exchange is exactly the opposite!

Figure 8:
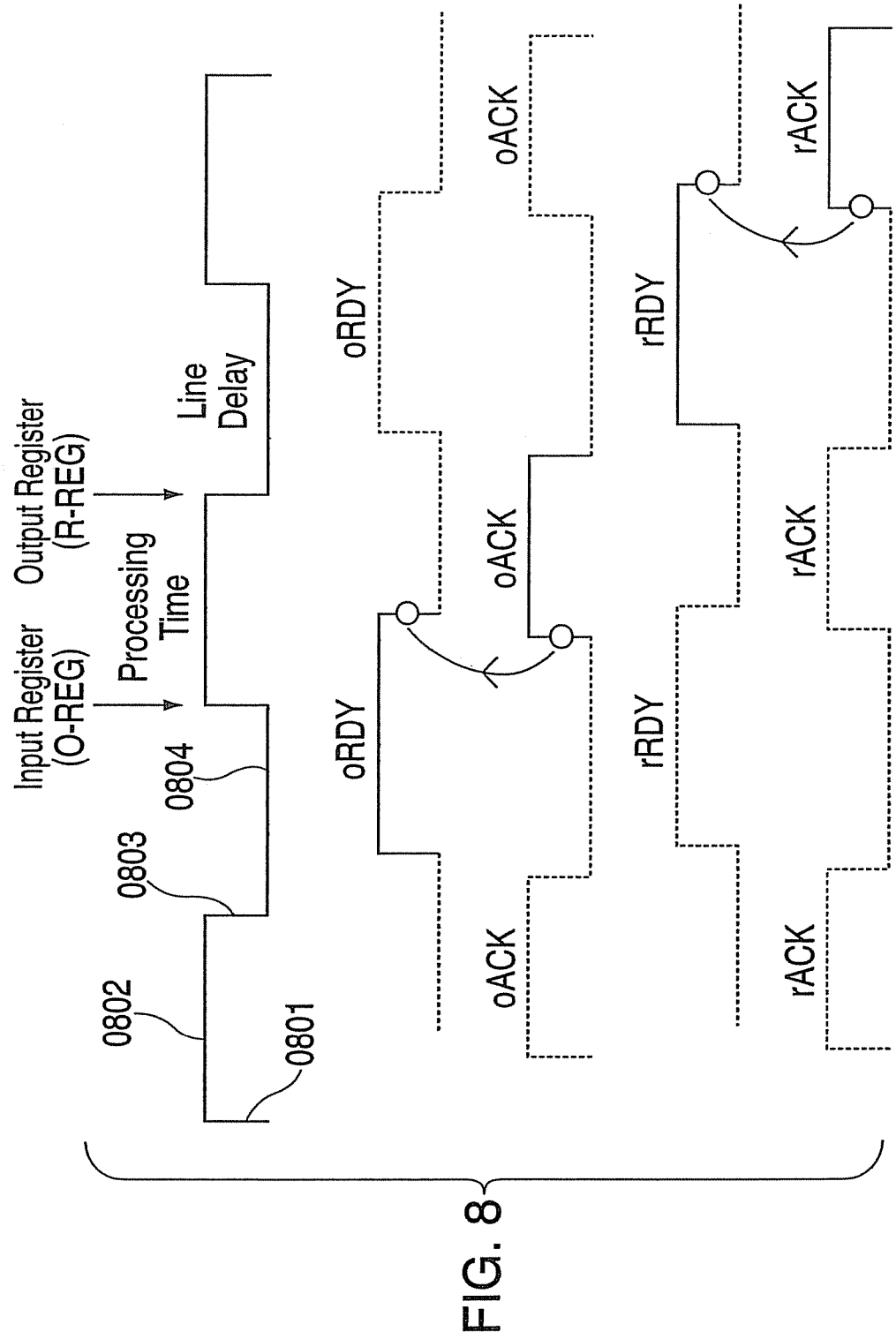
FIG. 8 shows example clock synchronization, delays and sync signals.

FIG. 8 shows the relationship of PAE-internal clock CLK to the activities taking place. At the rising edge (0801), operands are stored in the O-REG. During the H level (0802), PAE processes the data (ΔPAE=processing phase). This includes the data traffic between O-REG and R-REG. At the trailing edge (0803) the result is stored in R-REG. The L level (0804)

is used for distribution of the BM UNIT enclosed in the bus system (Δnetwork=bus phase). The time sequence of signals (oRDY and oACK, rRDY and rACK) generated by SYNC-SM is shown in the time diagram.

FIG. 9 shows the sequence diagram of the sync UNIT. The state machine recognizes two fixed states, DATA (0901) and RESULT (0902). DATA is synchronized at the rising edge, RESULT at the trailing edge. The status of the input parameters is analyzed and, depending on the result, the machine jumps to the YES branch (0903/0904) or the NO branch (0905/0906). If the operands are not ready in DATA, the machine jumps to NO. No operation is carried out in the next steps until the machine jumps back according to DATA and performs an analysis again. If operands, indicated by oRDY, are ready, the operands are stored in O-REG (0907). The operands are processed (0908) and analyzed (0909) at the same time to ascertain whether it is the last cycle in multiple-cycle operations (serial operations requiring more than one clock cycle) or whether a single-cycle operation is taking place. In these cases, the operands are acknowledged by oACK (0910). RESULT is synchronized with the trailing edge, and a check is performed to determine whether the "result available" flag has been set (0911). This flag is always set when a finished result is signaled by rRDY (0912).

In two cases, the system jumps to the YES branch (0904):
1. There is no preceding result ("result available" flag is false).
2. There is a preceding result ("result available" flag is true) and it is acknowledged with rACK. In this case (and only in this case(!)) 0902 resets the result (0913).

Otherwise the system jumps to the NO branch (0906) and no operation is carried out until the state machine returns after RESULT (0902). In the YES branch (0904) the result is stored in output register R-REGsft (0914). It is then determined whether this is the last cycle of a multiple-cycle operation (0915) (cf. 0909) or a single-cycle operation; if yes, the presence of the result is signaled by rRDY (0916). The state machine returns after DATA (0901). The recognition of whether it is the last cycle of an operation—or a single-cycle operation—can be queried of the SM UNIT via the FINISH signal (0916). This is active when the last—or single-cycle takes place. The status of the sync UNIT is signaled to the SM UNIT via RUN (0917). RUN is active in the event an operation is taking place; otherwise it is inactive. The mechanism of the STOP entry in F-PLUREG and the ReConfig generated from this are not shown in FIG. 9 because the sequence is trivial and is apparent from the description of the sync UNIT.

Figure 10:
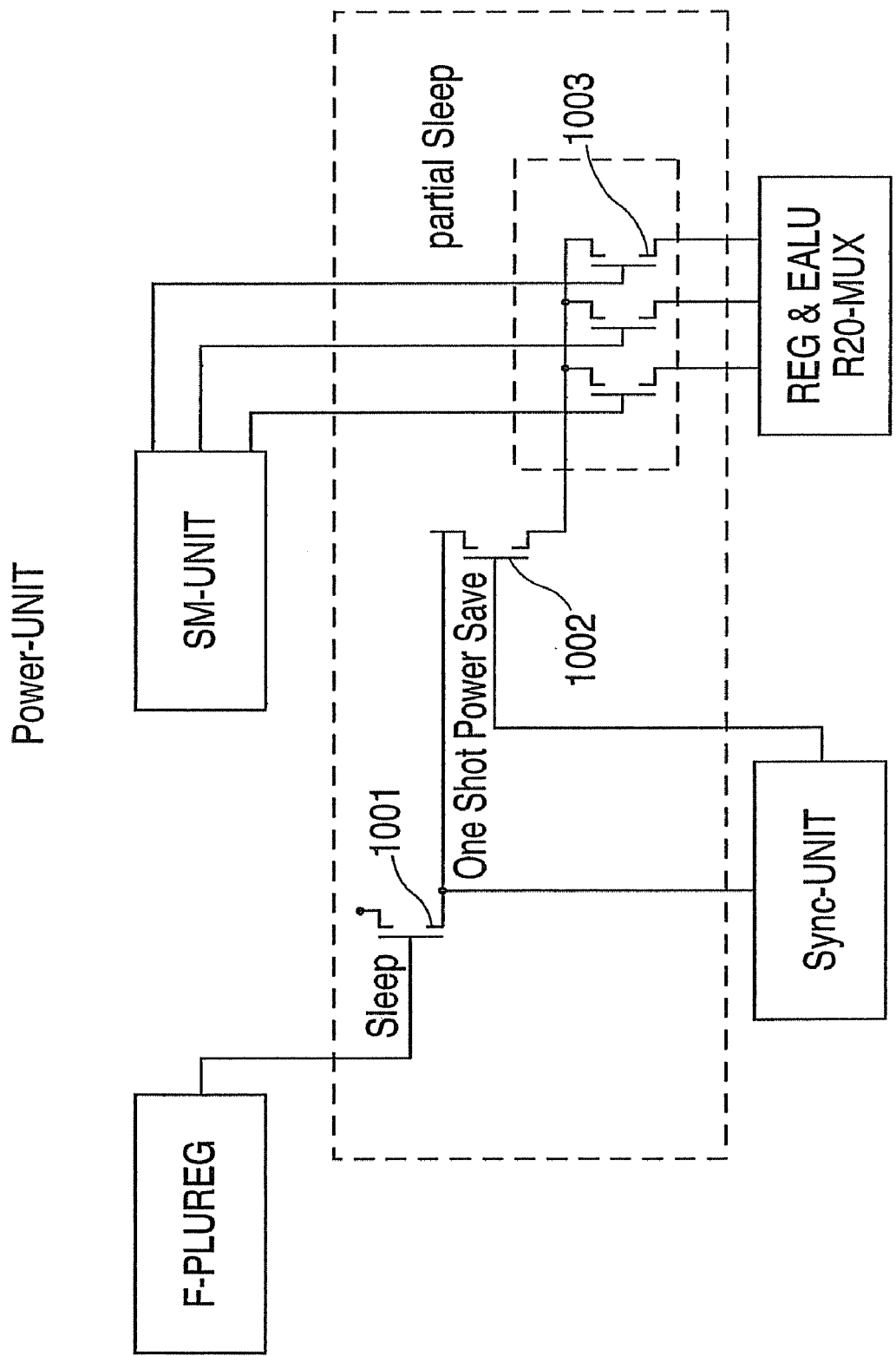
FIG. 10 shows an example architecture of a power UNIT.

FIG. 10 shows the basic architecture of the power UNIT. The sleep signal is sent from F-PLUREG to a transistor or a transistor stage (1001) which controls the power supply for all cell functions that can be switched off. The sync UNIT delivers the one-shot power-save signal (see FIG. 16) which enables the power supply of the remaining cell functions via a transistor or transistor stage (1002). Depending on the functions actually used in the cell, the transistors or transistor stages (1003) shut down the unneeded functions (power down). It is understandable that other similar means such as capacitors, etc., must be provided for proper power supply and EMC behavior.

Figure 11:
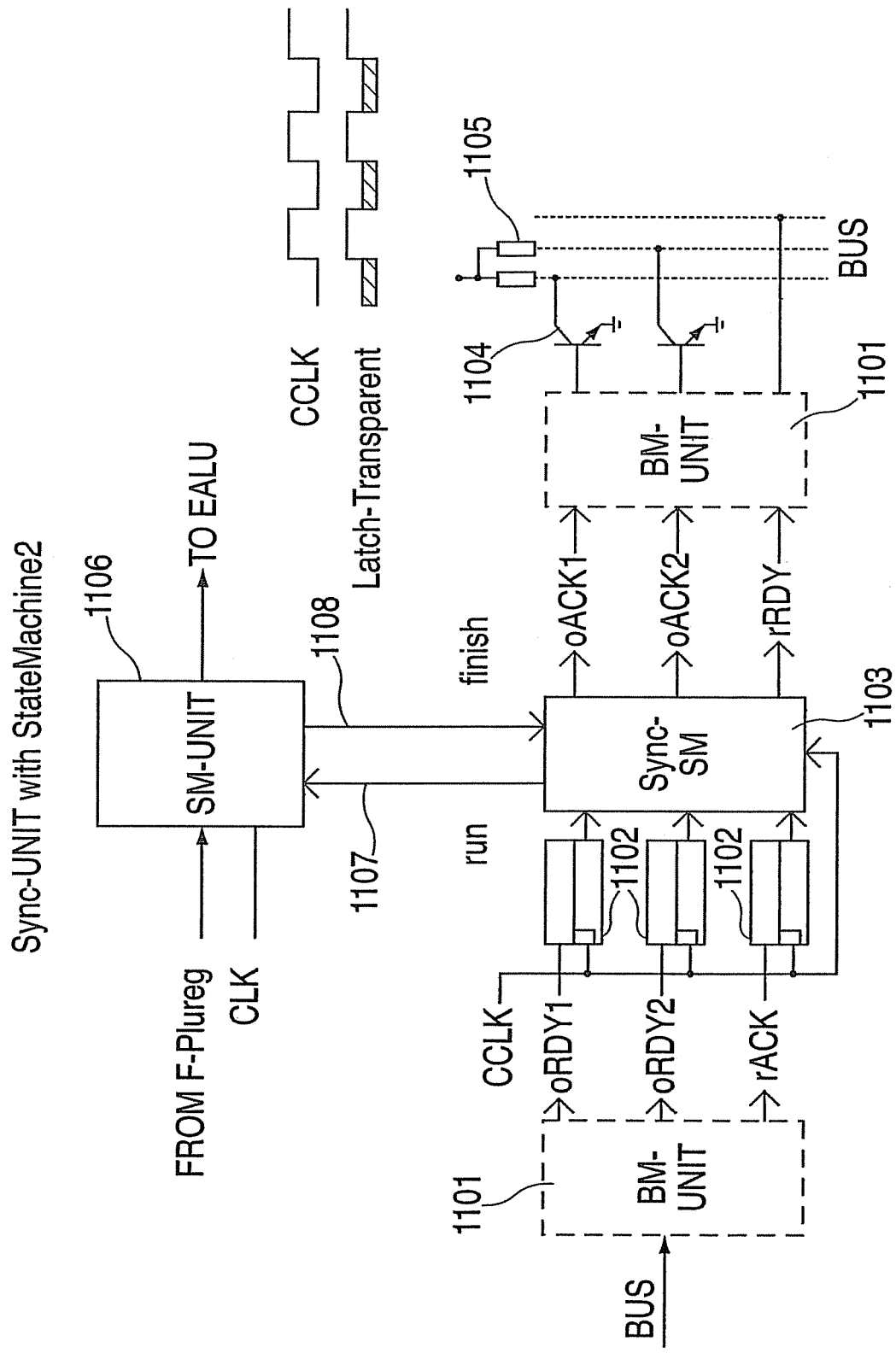
FIG. 11 shows an example architecture of a sync UNIT.

FIG. 11 shows the implementation of the machine from FIG. 9 in the concept. The oRDY(½) and rACK signals are switched over the BM UNIT (1101) (in simplified terms—there is actually rACKh and RACK1, rACK=rACK1 & rACKh) to the CCLK-controlled latches (1102). The latches are switched in such a way that they are transparent in the L phase (bus phase) of CCLK and hold their status in the H phase (processing phase). The outputs of the latches make available the signals for the sync state machine (1103). rRDY (in simplified terms: there are actually rRDYh and L5 rRDY1—they are completely identical but are sent to different receivers) from 1103 is switched to the bus over a gate. The oACK(M) signals from 1103 are negated in the BM UNIT (1101) and sent to the inverting open collector bus driver (1104). The bus is pulled to H over resistors (1105). The BM UNIT is switched so that the following cases occur:
1. If the corresponding bus is not driven by the BM UNIT, L is at the base of the transistors (1104). Therefore, they place no load on the bus.
2. If the corresponding bus is driven by the BM UNIT and the signal is not acknowledged, the base of the transistors (1104) is at H. This means that the bus is pulled to L. If a result is distributed to multiple data receivers by broadcasting, then all PAEs that have not yet acknowledged the result data and need waiting cycles pull the bus to L.
3. If the corresponding bus is driven by the BM UNIT and the signal is acknowledged, the base of the transistors (1104) is at L. This means that the bus is not placed under load. If a result is distributed to multiple data receivers by broadcasting, all PAEs which have acknowledged the result data and do not need waiting cycles place no load on the bus.

In its initial state, the bus assumes the H level, i.e., acknowledgment, so non-acknowledgment according to case 2 overrides the acknowledgment by pulling the bus to L. The bus goes to the H level, i.e., the acknowledgment state, only when all PAEs acknowledge the result data. Thus, a wired-AND circuit is implemented. The sync state machine supplies the RUN signal (1107) to the SM UNIT (1106) which is running on the basis of RUN. If the SM UNIT is in the last—or only processing cycle—it signals this to the sync state machine via FINISH (1108). FINISH is analyzed in the analysis units to recognize the last cycle (0907, 0915). The SM UNIT runs in sync with the PAE-internal clock CLK.

Figure 12:
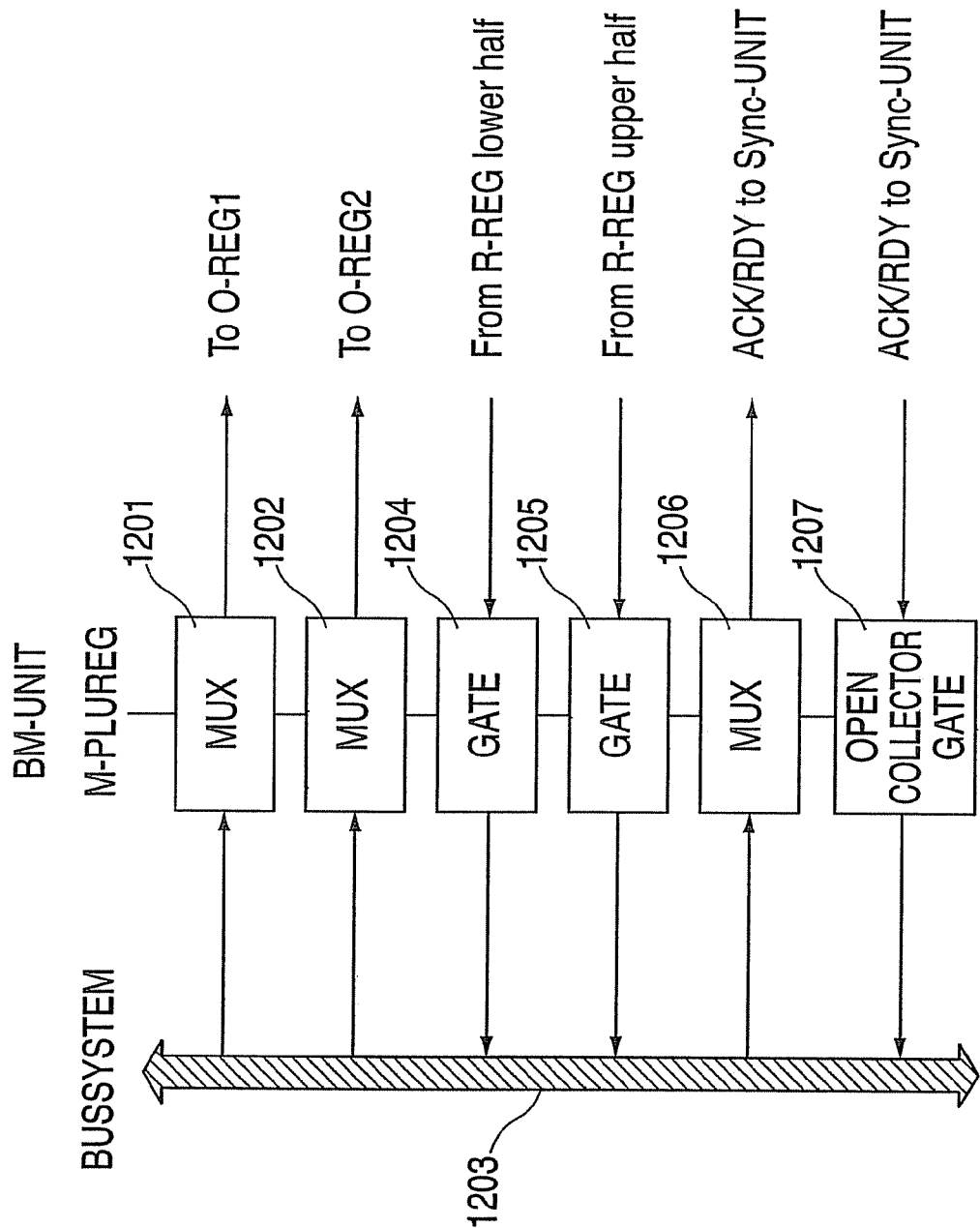
FIG. 12 shows an example architecture of a BM UNIT.

FIG. 12 shows the architecture of the BM UNIT. Depending on the entries into M-PLUREG, the multiplexers (1201, 1202) switch the operands from the internal bus (1203) to O-REG. Likewise, the gates (1204, 1205) switch the upper and lower halves of the result to the bus. Multiplexer 1206 switches oRDY(½) according to the position of 1201 and 1202 and switches rACK according to the position of 1204 and 1205 from the bus to the PAE. The rACK signals of the two data receivers are linked together by AND. If there is only one data receiver, the multiplexer is switched so that it returns a logic 1 instead of the missing rACK. 1207 contains a gate for switching the oACK(½) and rRDY signals to the bus. The oACK(½) signals are first inverted and then switched to the bus over the open collector driver (1104).

Figure 13:
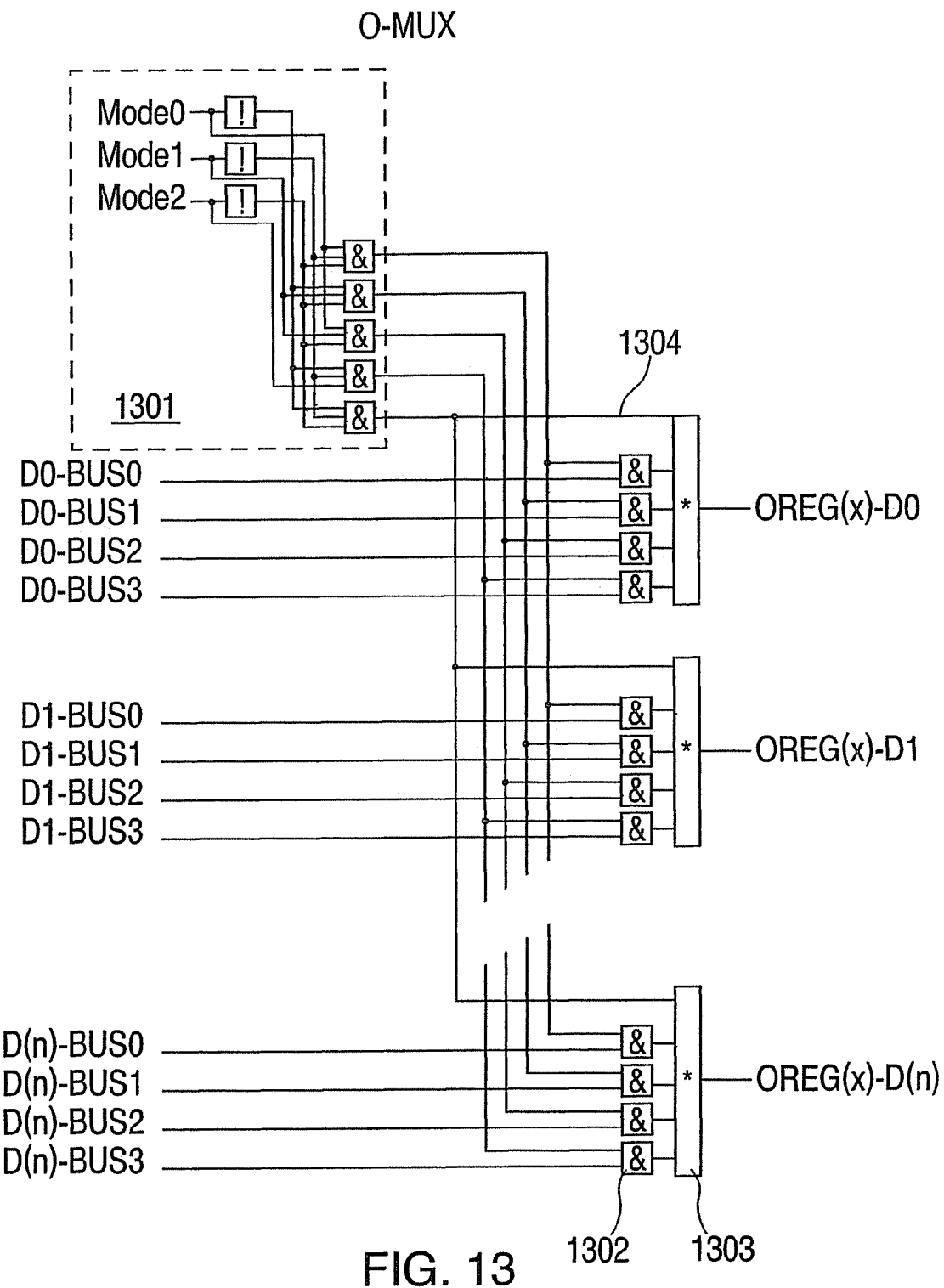
FIG. 13 shows an example architecture of an O-MUX, limited to four bus systems.

FIG. 13 illustrates the architecture of an O-MUX. There is a 3:5 decoder (1301) for analyzing mode 2-0 signals from M-PLUREG. The multiplexer is constructed with AND gates (1302) and a downstream OR gate (1303). The analysis signal of mode 2-0=000 of the decoder (1301) is switched directly to the OR gate (1304). This causes logic 1 to always be returned in the open state, i.e., no connection to a bus system (see rACK in FIG. 12). Only a reduced bus size is shown for the sake of simplicity.

Figure 14:
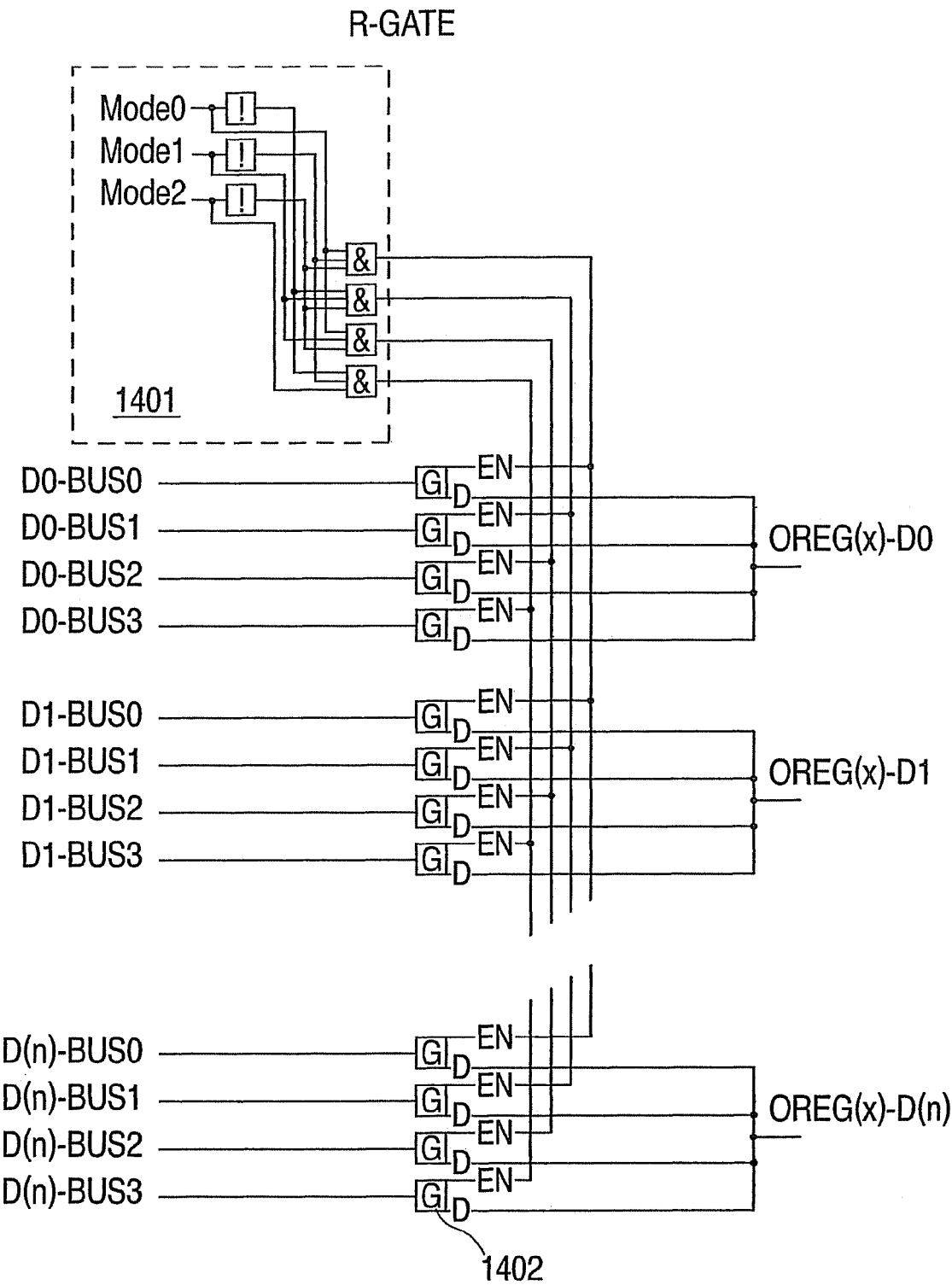
FIG. 14 shows an example architecture of an R GATE, limited to four bus systems.

FIG. 14 shows the architecture of an R GATE. There is a 3:4 decoder (1401) for analyzing mode 2-0 signals from M-PLUREG. The analysis signal of mode 2-0=000 of the decoder is not used. Therefore, no bus connection is established with this bit combination. The gates (1402) are composed either of AND gates or transmission gates (see 0701). An amplifier stage for driving the bus load is connected upstream or downstream. Only a reduced bus size is shown for the sake of simplicity.

Figure 15:
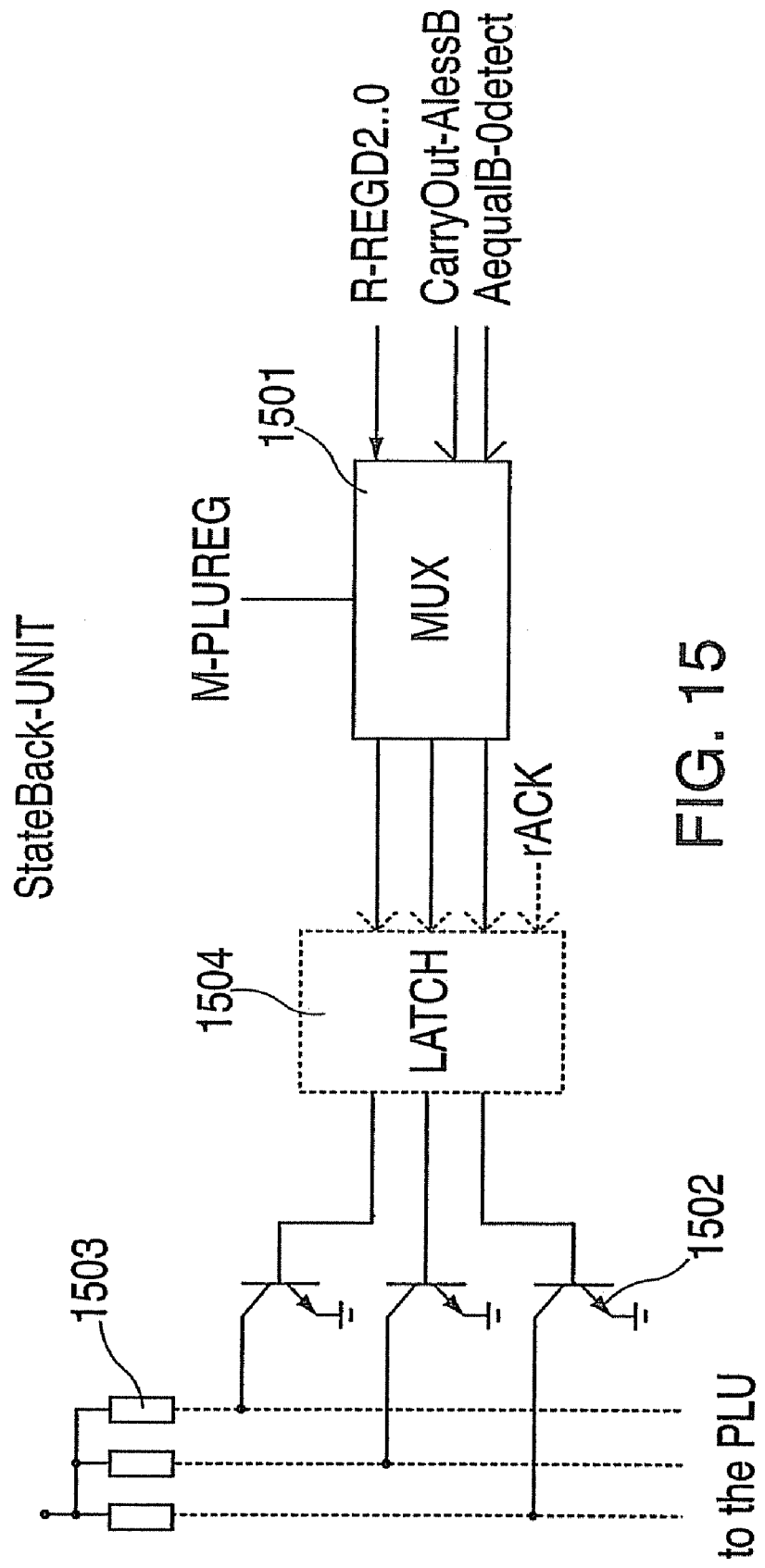
FIG. 15 shows an example architecture of the state-back UNIT.

FIG. 15 shows the state-back UNIT. Depending on the setting in M-PLUREG, a multiplexer (1501) switches through either the signals CarryOut-AlessB, AequalB-0detect from the EALU or the outputs of R-REG R-REGD2-0. The signals go to an open collector transistor stage (1502) and are switched to the PLU bus. The PLU bus needs external pull-up resistors (1503) positioned near the PLU. Latch 1504 is optional. If it is inserted into the output signals of 1501, they are switched to the bus (1503) only after the data receiver has acknowledged the data via rACK. Consequently, the readiness for reconfiguration is indicated by the status signals only when the data have been accepted. This is normally regulated by the interaction of STOP and ReConfig in the sync UNIT. Therefore, the latch is optional. The rACK signal is used as the latch clock pulse. The latch is transparent at rACK=1 and saved at rACK=0.

Figure 16:
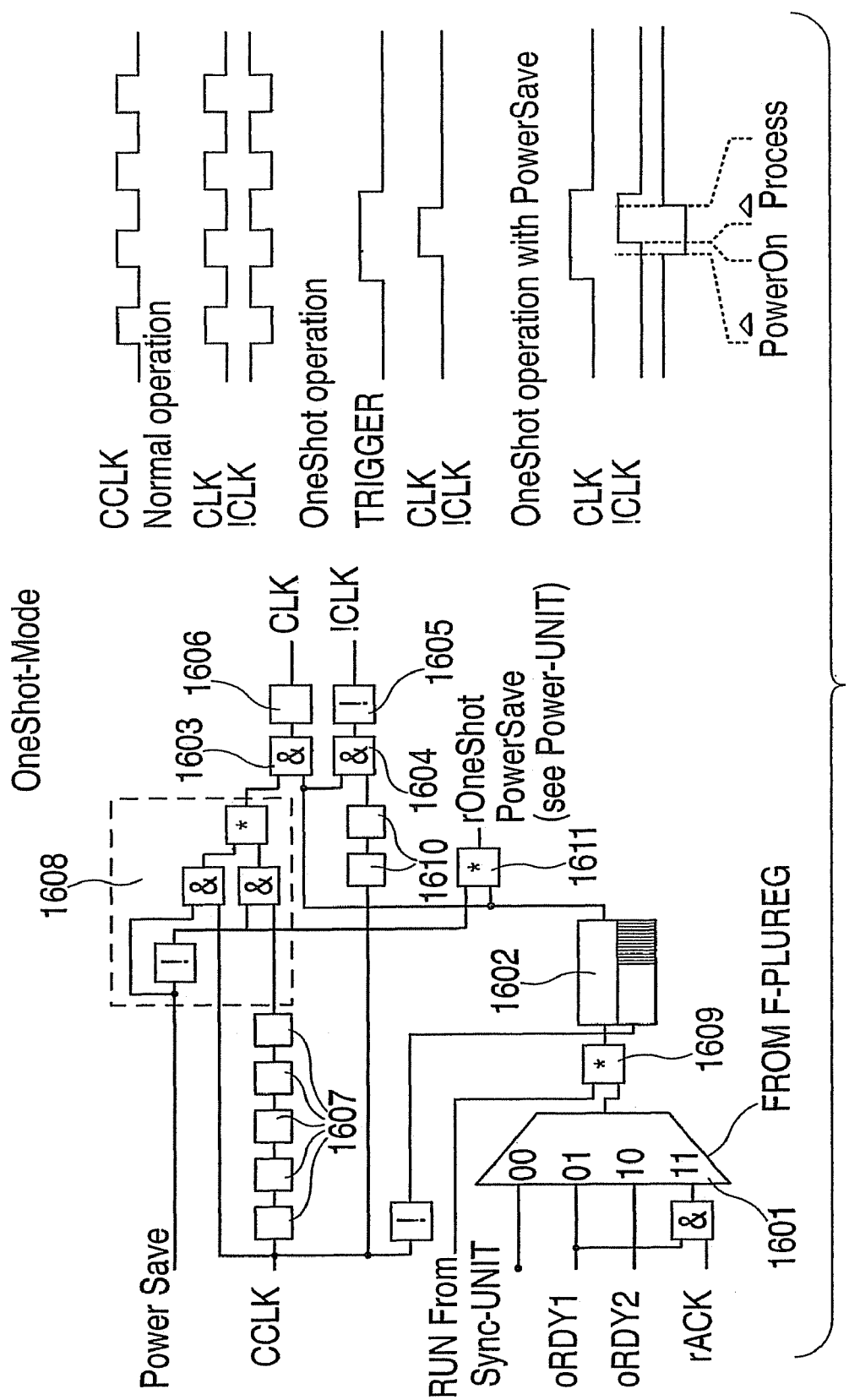
FIG. 16 shows an exemplary operating principle of the one-shot MODE and the one-shot/power-save MODE.

FIG. 16 illustrates the operation of the one-shot MODE.

The Signals
1. Vcc
2. oRDY1
3. oRDY2
4. (oRDY1 & rACK)

enable the cell clock via a multiplexer (1601) depending on the setting in F-PLUREG. The effect of the enable via Vcc is that the clock is always running (see "normal operation" in the timing diagram).

In the three remaining modes, the clock does not run until the signals or signal combinations enable the clock. The enable is synchronized to clock CCLK by a latch (1602), so the phase is not aborted prematurely when the enable signal is too short. The latch is transparent in the L phase of CCLK and holds its value in the H phase. The enable signal goes to the AND gate pair (1603 and 1604) which enables the clock. Inverted clock signal !CLK is generated by an inverter (1605); CLK runs through a time-delay element (1606) to guarantee phase coincidence (see "one-shot operation" in the timing diagram). CCLK is delayed over two delay pulses (1610) in the incoming line to 1604 to guarantee phase coincidence with CCLK which is applied to 1603 and has been delayed by the multiplexer (1608). If a PAE is brought into the power-save mode, the power supply of the cell is mostly shut down. This is done via OR gate 1611. If the power-save MODE has been activated, i.e., power save=1, the negated signal carries an L level. If one-shot MODE has also been switched on and register 1602 is at L, the power supply transistor in the power UNIT (see FIG. 17) is also switched off via the one-shot power-save signal. However, if register 1602 is at logic 1 (or power save=1), the power supply transistor is switched on via 1611. The following table gives an overview of the function:

| Power save | Latch (1602) | Voltage | Comments |
|---|---|---|---|
| L | X | on | |
| H | L | off | only when one-shot MODE has been set! |
| H | H | on | |

When switching on the power supply, there is a wake-up time of fixed duration until the cell is capable of functioning. To nevertheless function properly, the signals must be delayed accordingly. Therefore, CCLK is sent over a delay line (1607). A multiplexer (1608) selects according to the power-save signal from F-PLUREG whether the normal or delayed clock pulse is sent to the cell. Only the uninverted clock pulse is delayed by the Δpower-on period; the inverted clock pulse is not delayed. Therefore, the result is available in synchronization with the remaining functions of the unit. Thus, the usable processing time is reduced to Δprocess. The maximum clock frequency of the unit thus depends on Δpower-on+cprocess (see "one-shot operation with power save" in the timing diagram).

Figure 17:
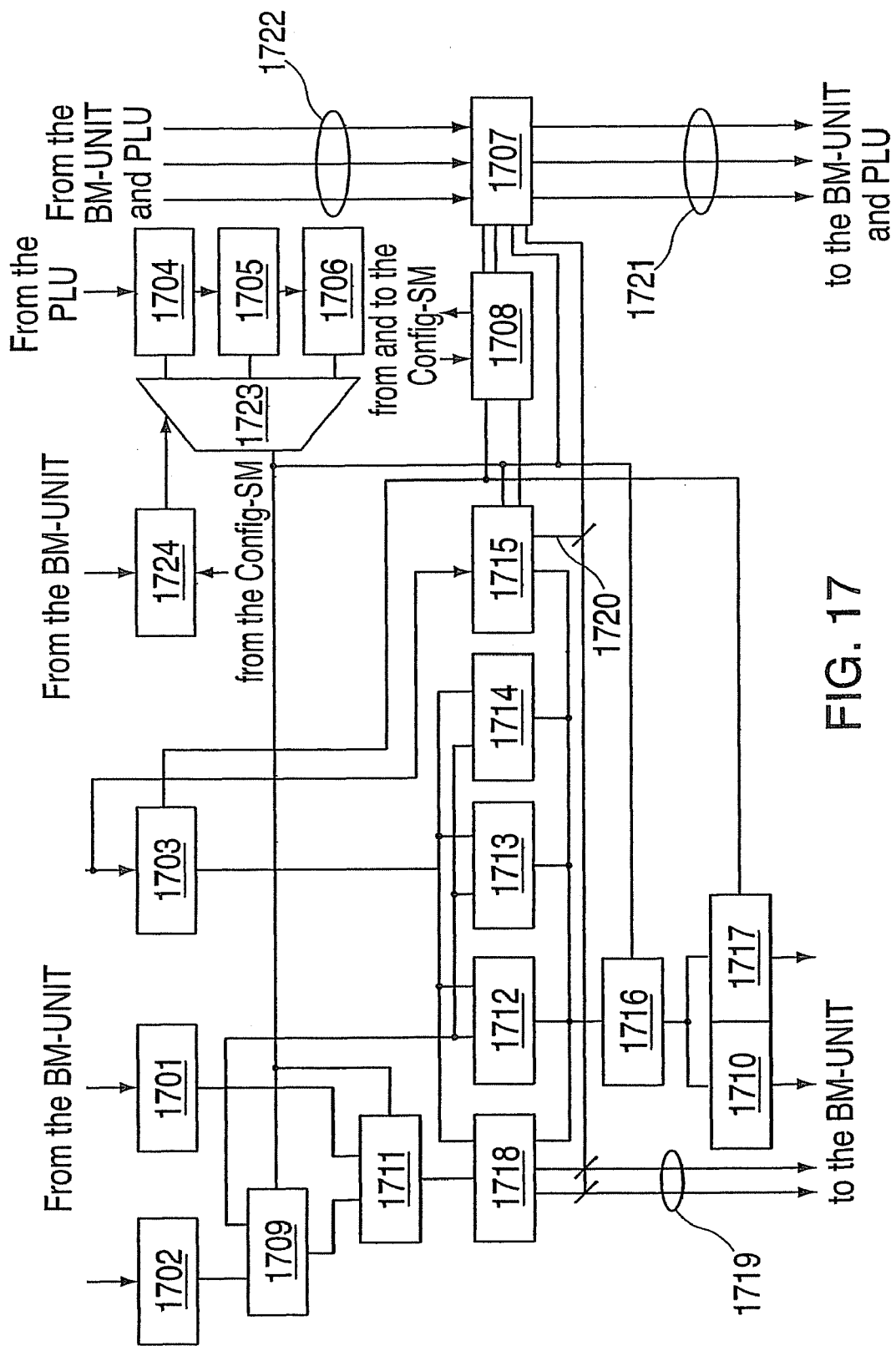
FIG. 17 shows an example of implementation of a PAE.

FIG. 17 shows an example of implementation of a PAE. The BM unit, the power unit, the StateBack unit, the PLU bus and the M-PLUREG are not shown.

The PAE has three input registers oREG1 (1701), oREG2 (1702), oREG3 (1703) for the data to be processed. The input registers receive their data from preceding PAEs via the BM unit. All the input registers are registers without a shift function.

The F-PLUREGs (1704, 1705, 1706) determine a plurality of configurations of the PAEs. They are loaded by the PLU over the PLU bus. A configuration selected via the multiplexer (1723) is stored in each F-PLUREG. The multiplexer (1723) is controlled by the register (1724). The register (1724) receives data or triggers from a preceding PAE through the BM unit. This PAE is not identical to the PAEs which supply the data for the input registers. Of course, a larger or smaller number of F-PLUREGs is also conceivable.

The third input register oREG3 (1703) supplies the operand for a multiply-add function, where the contents of the oREG1 (1701) are multiplied by the contents of the oREG2 (1702) in the multiplier (1709) and then the contents of the oREG3 (1703) are added in the adder/comparator (1718). The adder/comparator is configured so that it performs an addition. If only multiplication is to be performed, the oREG3 (1703) is loaded with the value zero. If only addition is to be performed, the F-PLUREG switches the multiplexer (1711). Thus, the value of the oREG1 (1701) goes directly to the adder/comparator (1718). The second function of the adder/comparator (1718) takes the value of the oREG1 (1701) and the value of oREG3 (1703) and compares the two values. The output signals CarryOut-AlessB and AequalB-0detect (1719) indicate whether the two values are the same or the value of oREG3 (1703) is greater or less than the value of oREG1 (1701).

Additional functions implemented in the PAE include a shift register (1712), a divider (1713), logic functions (1714) and AND, OR, NOT and a counter (1715). The counter (1715) generates a trigger signal (1720) as soon as it has counted from a predetermined value to zero. The counter (1715) is loaded directly with the value also received by oREG3 (1703). It is also conceivable to use other counters, such as incremental counters which count from zero to a loaded value and then generate a trigger signal.

The results of the function units are relayed by the multiplexer (1716) to the two output registers rREG1 (1710) and rREG2 (1702) which are connected to the BM unit and thus relay the data to the downstream PAEs. The sequence is controlled by a sync unit (1708) connected to the trigger logic (1707). In addition, it exchanges control signals with the config state machine, guaranteeing the correct sequence when the configuration is changed by the multiplexer (1711). The trigger logic (1707) is connected to the F-PLUREG and analyzes the incoming signals (1722) in accordance with the configuration stored in the F-PLUREGs. The incoming signals include the ReConfig, the general trigger signal as well as the handshake signals oRDY and rACK. Depending on the configuration, the trigger logic (1707) delivers the handshake signals to the sync unit (1708), which in turn generates the enable signals for the input and output registers and the counter. In addition, the sync unit (1708) generates outgoing handshake signals oACK and rRDY, relaying them to the trigger logic (1707). Depending on the configuration, the signals (1719) or the trigger of the counter (1720) can be used as a general trigger signal and sent to the trigger logic (1707). The signals (1721) ReConfig, handshake signals oRDY and rACK and the general trigger signal are outgoing from the trigger logic (1707) and sent to the BM unit.

Figure 18:
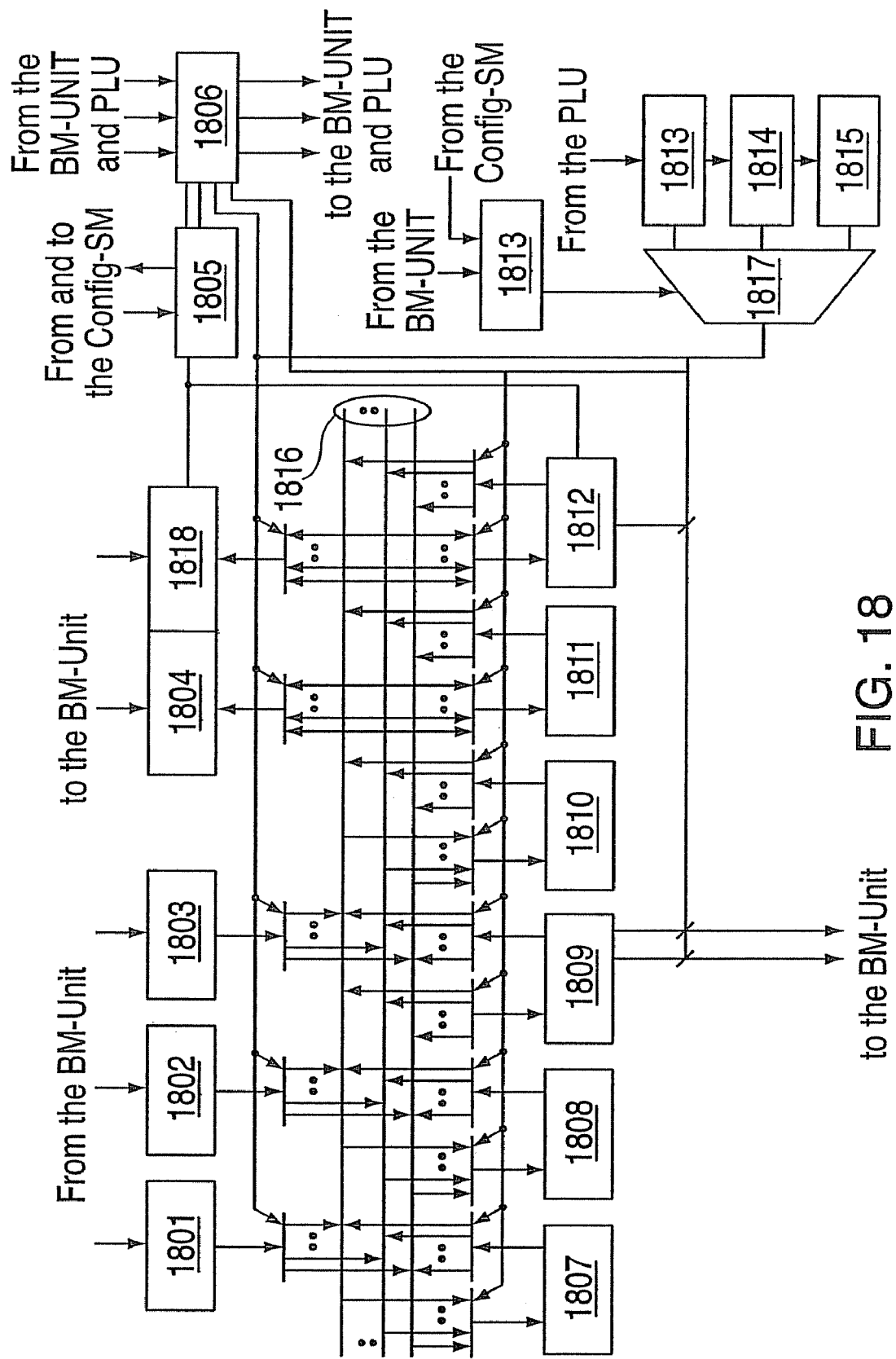
FIG. 18 shows an example architecture of a PAE, with the individual functions being linked via a bus system.

FIG. 18 shows a PAE with the same extent of functions as the PAE in FIG. 17. Here again, the BM unit, the power unit, the StateBack unit and the M-PLUREG are not shown. It has three input registers oREG1 (1801), oREG2 (1802), oREG3 (1803), two output registers rREG1 (1804), rREG2 (1818), three F-PLUREGs (1813, 1814, 1815), a multiplexer (1817), one sync unit (1805) and one trigger logic (1806). The function units include a divider (1807), a multiplier (1817), an adder/comparator (1809), logic functions (1810), a shift register (1811) and a counter (1812). The function of the individual units corresponds to that described with regard to FIG. 17. It is also conceivable to have additional functions integrated into the PAE, such as the trigonometric functions, root and exponential functions. This is of course also true of the PAE described with regard to FIG. 17. The individual functions can be implemented as integers or as floating point units. In contrast with the PAE in FIG. 17, the individual function units are linked by a bus system (1816), so that the individual functions can be interconnected in any sequence. The wiring is determined by the configuration stored in the F-PLUREGs. The bus system (1816) may have different designs. Possibilities include one or more segmented buses whose segments connect two functions that are wired together or a number of continuous buses wiring two function units together. In addition, there is the possibility of the individual functions and registers sending a target address with the help of which a connection is established.

Figure 19:
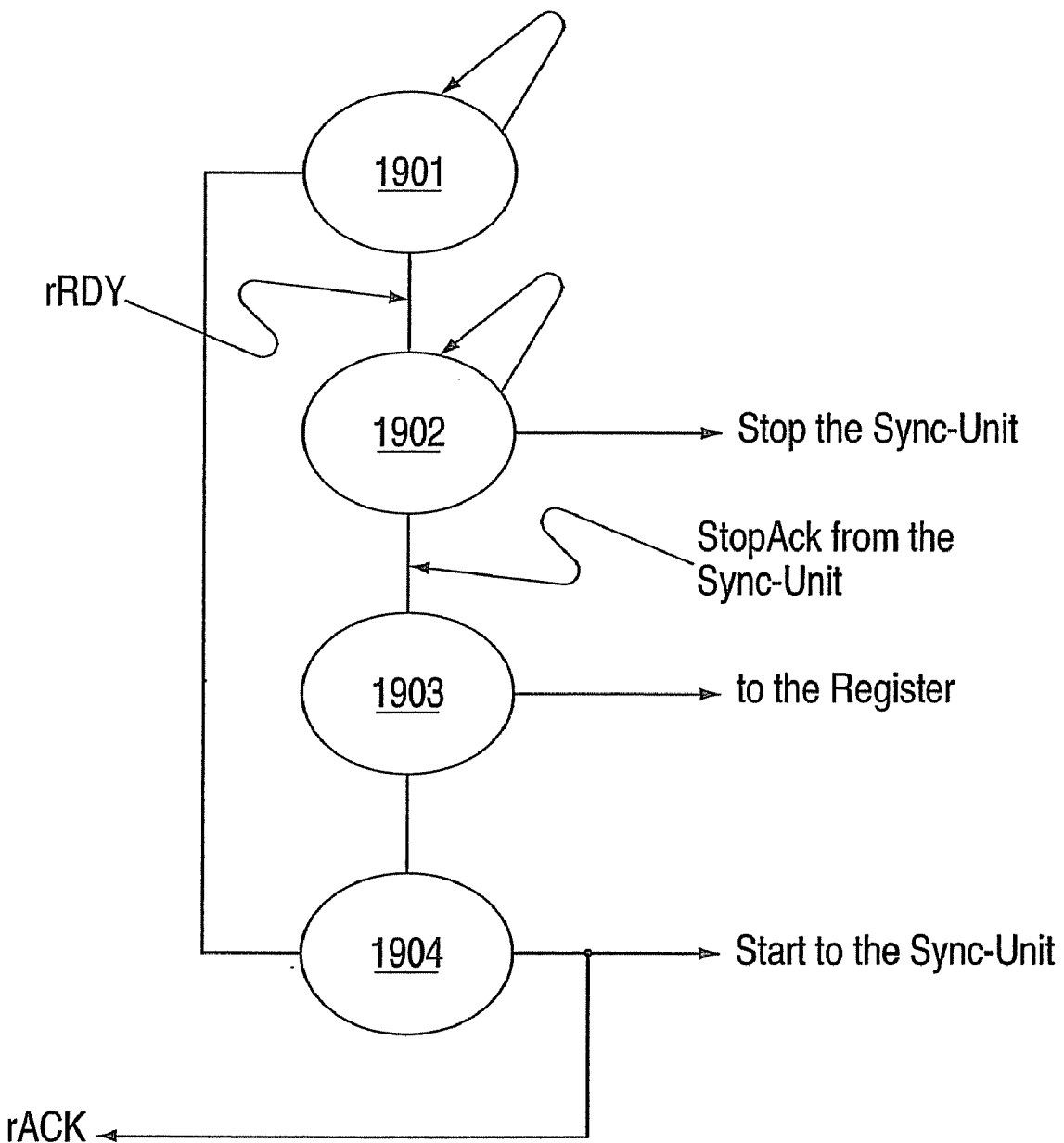
FIG. 19 shows an example operation of the config state machine.
Figure 20:
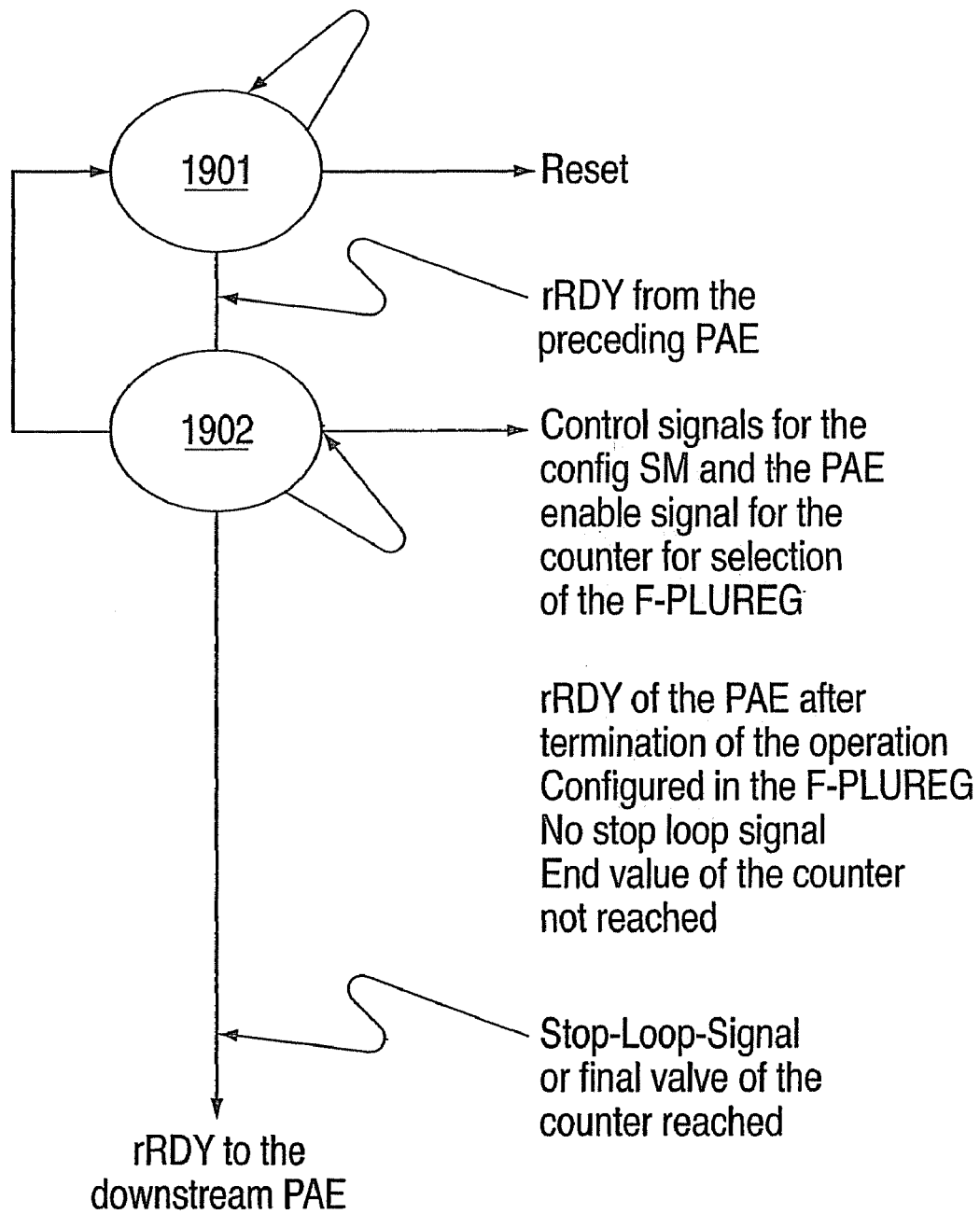
FIG. 20 shows an example operation of a loop state machine.

FIG. 19 shows a config state machine which manages the configuration registers. At the start, the config state machine is in the IDLE state (1901). This state is not left until after a rRDY signal has been received from the config PAE selecting the configuration register. Then the config state machine enters the stop state (1902) and transmits a stop signal to the sync unit of the PAE. The PAE terminates its operation at the next possible time, sending a stop acknowledge signal to the config state machine. The latter goes into the reload state (1903) and transmits an enable signal to the register of the config PAE. Then the config state machine changes into the restart state (1904), sends a start signal to the sync unit, which resumes its processing. At the same time, it sends an rACK signal to the config PAE. Finally, the config state machine returns to the IDLE state (1901). FIG. 20 shows a state machine for automatically running through the various configurations of the PAE, which is referred to below as a loop state machine. Since there are several F-PLUREGs, it is appropriate under some circumstances to perform multiple operations in succession and only then relay the data as well as the =trigger signals and handshake signals to the downstream PAE.

The result of the individual operations is returned from the rREG of the PAE to the input registers via the feedback described above. This process can be controlled by an external stop loop signal or an internal counter.

At the beginning, the loop state machine is in the IDLE state (2001). In the IDLE state (2001) the loop state machine delivers a reset signal to a counter. This counter is used to dial the F-PLUREG. After the rRDY of the preceding PAE, the loop state machine enters the configuration state (2002), where it generates the handshake signals for the PAE and the control signals for the config state machine. In addition, an enable signal is generated for the counter, whose value is incremented by one. If the loop state machine then does not receive any stop loop signal or if the internal counter of the PAE has not yet reached its final value, it remains in the configuration state (2002), and the sequence described above is repeated. On arrival of a stop loop signal or when the internal counter of the PAE has reached its final value, the state machine returns to the IDLE state (2001) and the rRDY signal is relayed to the next PAE.

Figure 21:
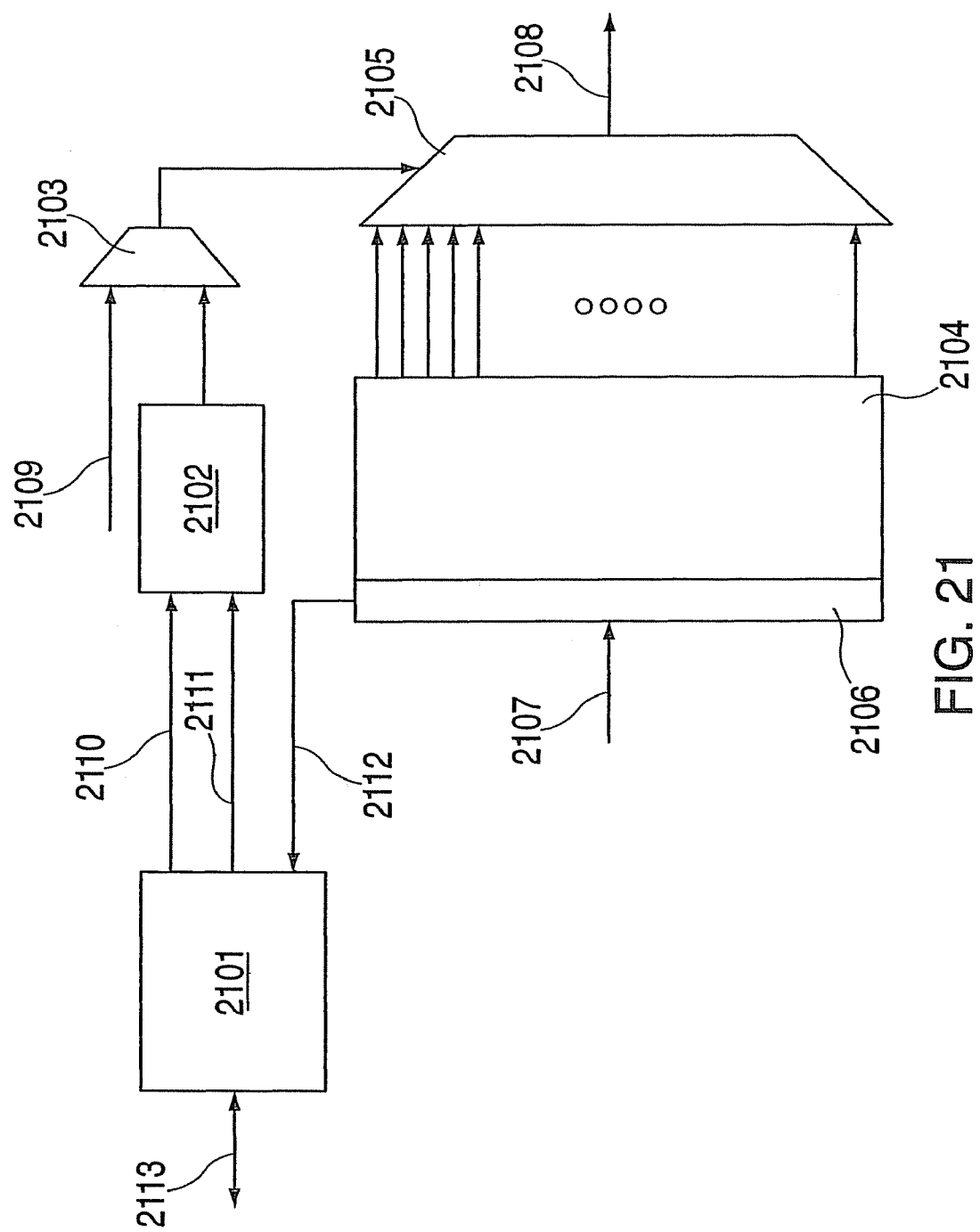
FIG. 21 shows an example cyclical processing of the configuration register data.

FIG. 21 illustrates the part of the PAE needed for the sequential run-through of the configurations stored in the F-PLUREG. The F-PLUREGs (2104) receive their data from the PLU (2107) and are slightly modified in comparison with the embodiments described previously. Each F-PLUREG contains an additional bit, the loop bit (2106). This loop bit is returned to the loop state machine (2102) described with regard to FIG. 20 through the link (2112). It functions there as a stop loop signal, i.e., with the loop bit (2106) set, the loop sequence is terminated; otherwise, it is continued until the loop stop bit is set, or the internal counter of the loop state machine (2101) described in conjunction with FIG. 20 has reached its final value. The loop state machine (2101) controls the counter (2102) whose value controls the selection of the F-PLUREG (2104) by the multiplexer (2105). The control signals of the config state machine and the handshake signals of the PAE are transmitted through the link (2113). The configuration data of the F-PLUREG is relayed over the link (2108) to the function units of the PAE.

The counter (2102) receives an enable signal (2110) so that the value of the counter (2102) is incremented. In addition, the loop state machine (2101) sends a reset signal (2111) to the counter as soon as a loop operation is concluded. A choice can be made between loop mode and the normal process in the PAE by way of the multiplexer (2103). In a normal sequence, the multiplexer (2103) relays a data (2109) for selection of an F-PLUREG (2104) to the multiplexer (2105).

DEFINITION OF TERMS

AequalB-0detect: Signal generated by the EALU, indicating in arithmetic operations that the result is equal to zero. In comparisons, it indicates that operand A is equal to operand B.

ALU: Arithmetic and logic unit. Basic unit for processing data. The unit can perform arithmetic operations such as addition, subtraction or under some circumstances also multiplication, division, series expansions, etc. The unit may be designed as an integer unit or as a floating point unit. It may also perform logic operations such as AND, OR and comparisons.

BM UNIT: Unit for connecting the data to the bus systems outside the PAE. The connection takes place via multiplexers for the data inputs and gates for the data outputs. oACK lines are implemented as open collector drivers. The BM UNIT is controlled by M-PLUREG.

Broadcast: Transmitting data from a PAE to multiple data receivers.

CarryOut-AlessB: Signal generated by the EALU which indicates a carry-over in arithmetic operations. In comparisons, it indicates that operand A is smaller than operand B.

Data receiver: The unit(s) which processes further the results of the PAE.

Data transmitter: The unit(s) which makes available the data for the PAE as operands.

D flip-flop: Storage element that stores a signal at the rising edge of a clock pulse.

EALU: Expanded arithmetic and logic unit. An ALU expanded to add special functions which are needed or appropriate for the operation of a data processing system according to German Patent No. 44 16 881. These are counters in particular.

FPGA: Known field-programmable gate array.

F-PLUREG: Register in which the function of the PAE is set. The one-shot and sleep modes are also set here. The PLU writes into the register.

Gate: Group of transistors that perform a basic logic function. Basic functions include, for example, NAND, NOR. Transmission gates.

H level: Logic 1 level, depending on the technology used.

Handshake: Signal protocol in which one signal A indicates a state and another signal B confirms that it accepts signal A and responds (has responded) to it.

Configuring: Determining the function and interconnecting a logic unit, a (FPGA) cell or a PAE (see reconfiguring).

Latch: Storage element which normally relays a signal transparently during the H level and stores it during the L level. Latches where the function of the levels is exactly reversed are occasionally used in PAEs, in which case an inverter is connected upstream from the clock of a conventional latch.

L level: Logic 0 level, depending on the technology used.

M-PLUREG: Register in which the interconnection of the PAE is set. The PLU writes into the register.

Next-neighbor interconnection: Interconnection of bus systems with the adjacent neighbors abutting at the edges.

O-MUX: Multiplexer within the BM UNIT which selects the bus system of the operands.

One shot: Mode in which a PAE operates at a lower clock rate than the processor clock rate. The clock rate is synchronous with the processor clock rate and corresponds to one period. There is no phase shift. The clock pulse is enabled by one of the signals oRDY(½) or rRDY. This mode serves to save power when the data transmitters or receivers are transmitting or receiving data at a slower rate than the processor clock rate.

Open collector: Circuitry in which a bus signal pulled to the H level via a pull-up is applied to the collector of a transistor. The emitter of the transistor is grounded. If the transistor switches, the bus signal is pulled to the L level. The advantage of this method is that a plurality of such transistors can control the bus without electrical collision. The signals are OR linked, resulting in wired-OR.

O-REG: Operand register for storing the operands of the EALU. It makes it possible for the PAE to be independent of the data transmitters in time and function. This simplifies data transfer because it can be asynchronous or packet-oriented. At the same time, the possibility of reconfiguring the data transmitters independently of the PAEs or reconfiguring the PAEs independently of the data transmitters is created.

O-REGsft: O-REG with a shift register controlled by the SM UNIT.

PA: Processing array: array of PAEs.

PAE: Processing array element: EALU with O-REG, R-REG, R20-MUX, F-PLUREG, M-PLUREG, BM UNIT, SM UNIT, sync UNIT, state-back UNIT and power UNIT.

PLU: Unit for configuring and reconfiguring the PAW. Configured by a microcontroller adapted specifically to its task.

Power-save MODE: Power-saving mode within the one-shot MODE. None of the parts of the PAE except the F-PLUREG, M-PLUREG and sync unit are supplied with voltage when no operation is being carried out.

Power Unit: Unit which regulates the power-saving functions.

Pull-down: Resistor which pulls a bus line to an L level.

Pull-up: Resistor which pulls a bus line to an H level.

R GATE: Switch within the BM UNIT which switches the result to the corresponding bus system. Some signals are switched over open collector drivers. The R GATE works as a bus driver and can enter a bus-neutral mode.

R2O-MUX: Multiplexer for inserting the result in an R-REGsft into the data path between O-REG and EALU.

R-REGsft: Result register for storing the result of the EALU. It makes it possible for the PAE to be independent, in time and function, of the data receivers. This simplifies data transfer because it can be asynchronous or packet-oriented. At the same time, this creates the possibility of reconfiguring the data receivers independently of the PAE or reconfiguring the PAE independently of the data receivers. The register is provided with a shift function which is controlled by the SM UNIT.

Serial operations: Operations performed by serial processing of a data word or an algorithm. Serial multiplication, serial division, series expansion.

Sleep MODE: Power-saving mode in which the PAE, except for F-PLUREG, carries no voltage.

SM UNIT: State machine UNIT. State machine which controls the EALU.

StateBack UNIT: Unit which controls the feedback of the status signals to the PLU. Consists of a multiplexer and an open collector bus driver stage.

Sync UNIT: Unit responsible for the synchronization of the PAE with the data transmitters and receivers, which also monitors the reconfiguration of PAEs. At the same time, it assumes the one-shot functions.

Gate: Switch that forwards or blocks a signal. Simple comparison: relay.

Reconfiguring: New configuration of any number of PAEs while any remaining PAEs continue with the same function (see configuring).

State machine: Logic which can assume various states. The transitions between the states depend on various input parameters. These are known machines that are used to control complex functions.

Conventions

Naming Conventions

Component: UNIT

Operating mode: MODE

Multiplexer: MUX

Negated signal: not

Visible register for PLU: PLUREG

Internal register: REG

Shift registers: sft

Function Conventions

Shift registers: sft

AND function: &

| A | B | Q |
|---|---|---|
| 0 | 0 | 0 |
| 0 | 1 | 0 |
| 1 | 0 | 0 |
| 1 | 1 | 1 |

OR function: #

| A | B | Q |
|---|---|---|
| 0 | 0 | 0 |
| 0 | 1 | 1 |
| 1 | 0 | 1 |
| 1 | 1 | 1 |

NOT function: !

| A | Q |
|---|---|
| 0 | 1 |
| 1 | 0 |

GATE function: G

| EN | D | Q |
|---|---|---|
| 0 | 0 | — |
| 0 | 1 | — |
| 1 | 0 | 0 |
| 1 | 1 | 1 |

What is claimed:

1. A Field Programmable Gate Array integrated circuit comprising:
   a multi-dimensional configurable cell structure including a plurality of configurable cells; and
   a configurable interconnect connecting the configurable cells;
   wherein each of at least one of the cells is a data processing circuit that is hard-wired within the Field Programmable Gate Array and includes:
      at least two input ports, each being at least 4-bit wide;
      at least one output port being at least 4-bit wide;
      at least one multiplier hardware unit arranged for receiving an input from the at least two input ports and for providing an output to the at least one output port; and
      circuitry that couples the at least two input ports and the at least one output port to the configurable interconnect.

2. The Field Programmable Gate Array integrated circuit according to claim 1, wherein the each of the at least one of the cells has at least two input registers that are at least 4-bit wide.

3. The Field Programmable Gate Array integrated circuit according to any one of claims 1 and 2, wherein the each of the at least one of the cells has at least one output register that is at least 4-bit wide.

4. The Field Programmable Gate Array integrated circuit according to any one of claims 1 and 2, wherein the at least one of the cells comprises at least one floating point unit.

5. The Field Programmable Gate Array integrated circuit according to claim 1, wherein the each of the at least one of the cells has at least 3 inputs, each of which is at least 4-bit wide.

6. The Field Programmable Gate Array integrated circuit according to claim 5, wherein the each of the at least one of the cells has at least one adder and at least one multiplier.

7. The Field Programmable Gate Array integrated circuit according to claim 6, wherein the each of the at least one of the cells has at least one multiplexer located between at least one output of the at least one multiplier and at least one input of the at least one adder.

8. The Field Programmable Gate Array integrated circuit according to claim 7, wherein the multiplexer allows selection of input data for the at least one adder from at least (a) the multiplier and (b) at least one of an input of the respective cell and another cell.

9. The Field Programmable Gate Array integrated circuit according to claim 7, wherein the each of the at least one of the cells has at least one output register and at least one path for feeding back at least one of the output registers to at least one adder input via a multiplexer.

10. The Field Programmable Gate Array integrated circuit according to any one of claims 6 and 7, wherein the each of the at least one of the cells has at least one path for feeding back processing results of the cell as operands back to the cell, the path including at least one register that is at least 4-bit wide.

11. The Field Programmable Gate Array integrated circuit according to any one of claims 6 and 7, wherein the each of the at least one of the cells has at least one path for feeding back an output of the at least one adder as at least one operand back to the cell, the path including at least one register that is at least 4-bit wide.

12. The Field Programmable Gate Array integrated circuit according to any one of claims 6 and 7, wherein the each of the at least one of the cells has at least one output register and at least one path for feeding back an output from at least one of the output registers as operands back into the respective cell.

13. The Field Programmable Gate Array integrated circuit according to claim 6, wherein the each of the at least one of the cells has at least one of (a) at least two input registers, each of which is 4-bit wide and (b) at least one output register that is 4-bit wide.

14. The Field Programmable Gate Array integrated circuit according to any one of claims 6, 9, and 13, wherein at least some of the cells comprise a shift function.

15. The Field Programmable Gate Array integrated circuit according to any one of claims 6, 9, and 13, wherein at least some of the cells comprise a comparator.

16. The Field Programmable Gate Array integrated circuit according to any one of claims 6, 7, 9, and 13, wherein the each of at least one of the cells has at least one input for defining the cell operation independently from other cells at runtime.

17. The Field Programmable Gate Array integrated circuit according to claim 16, wherein the independent definition of the cell operation of the respective cell is performed without disturbing said other cells in their operations.

18. The Field Programmable Gate Array integrated circuit according to claim 16, wherein the each of the at least one of the cells supports selection of one of a set of multiple configurations at runtime.

19. The Field Programmable Gate Array integrated circuit according to any one of claims 6, 7, 9, and 13, wherein the each of the at least one of the cells has at least one status output.

20. The Field Programmable Gate Array integrated circuit according to claim 6, wherein the each of the at least one of the cells includes circuitry for performing a floating point operation.

21. The Field Programmable Gate Array integrated circuit according to claim 1, wherein at least some of the cells comprise a divider.

22. The Field Programmable Gate Array integrated circuit according to claim 3, wherein the at least one of the cells comprises at least one floating point unit.

23. The Field Programmable Gate Array integrated circuit according to claim 1, wherein, for each of at least some of the configurable cells:
   the configurable cell performs at least one of arithmetic and logic data processing, and has at least one register; and
   a clock supply of the at least one register is suppressible within the configurable cell.

24. The Field Programmable Gate Array integrated circuit according to claim 1, wherein, for each of at least some of the configurable cells:
   the configurable cell performs at least one of arithmetic and logic data processing, and has at least one register; and
   a clock supply of the at least one register is suppressible within the configurable cell for power saving.

25. The Field Programmable Gate Array integrated circuit according to claim 1, wherein, for each of at least some of the configurable cells:
   the configurable cell performs at least one of arithmetic and logic data processing, and has at least one register; and
   a clock supply of the at least one register is suppressible (a) within the configurable cell and (b) depending on availability of input data to the configurable cell.

26. The Field Programmable Gate Array integrated circuit according to claim 1, wherein, for each of at least some of the configurable cells:
   the configurable cell performs at least one of arithmetic and logic data processing, and has at least one register; and
   a clock supply of the at least one register is suppressible (a) within the configurable cell and (b) depending on acceptability, by a receiver, of output data of the configurable cell.

27. The Field Programmable Gate Array integrated circuit according to claim 1, wherein at least some of the configurable cells perform at least one of arithmetic and logic data processing, and have at least one register, a clock supply to the at least one register being configurably suppressible.

28. The Field Programmable Gate Array integrated circuit according to claim 1, wherein at least some of the configurable cells perform at least one of arithmetic and logic data processing, and have at least one register, a clock supply to the at least one register being configurably suppressible for power saving.

29. The Field Programmable Gate Array integrated circuit according to claim 1, wherein at least some of the configurable cells perform at least one of arithmetic and logic data processing, and have at least one register, an arrangement being provided with the at least one register for disabling a clock supply of the at least one register.

30. The Field Programmable Gate Array integrated circuit according to claim 1, wherein at least some of the configurable cells perform at least one of arithmetic and logic data processing, and have at least one register, an arrangement being provided with the at least one register for disabling a clock supply of the at least one register for power saving.

31. A Field Programmable Gate Array integrated circuit comprising:
   a two-dimensional configurable cell structure including a plurality of configurable cells; and
   a configurable interconnect connecting the configurable cells;
   wherein each of at least one of the cells is a hard-wired implemented logic circuit arranged for implementing a runtime configurable function and includes:
      an at least 4-bit wide processing unit configurable in function, each of at least two input ports of the at least 4-bit wide processing unit being at least 4-bit wide and having a respective at least 4-bit wide input register, and each of at least one output port of the at least 4-bit wide processing unit being at least 4-bit wide and having a respective at least one at least 4-bit wide output register; and
      circuitry that couples the at least two input ports and the at least one output port to the configurable interconnect.

32. The Field Programmable Gate Array Integrated Circuit according to claim 31, wherein a function unit of the at least one of the cells comprises at least one multiplier.

33. The Field Programmable Gate Array Integrated Circuit according to any one of claims 31 and 32, wherein the at least one of the cells comprises at least one floating point unit.

34. The Field Programmable Gate Array Integrated Circuit according to claim 31, wherein the each of the at least one of the cells has at least three input ports that are each at least 4-bit wide.

35. The Field Programmable Gate Array Integrated Circuit according to claim 34, wherein a function unit of the at least one of the cells comprises at least one adder and at least one multiplier.

36. The Field Programmable Gate Array Integrated Circuit according to claim 35, wherein the each of the at least one of the cells has at least one multiplexer located between at least one output of the at least one multiplier and at least one input of the at least one adder.

37. The Field Programmable Gate Array Integrated Circuit according to claim 35, wherein the multiplexer allows selection of input data for the at least one adder from at least (a) the multiplier and (b) at least one of an input of the respective cell and another cell.

38. The Field Programmable Gate Array Integrated Circuit according to any one of claims 35, 36, and 37, wherein the each of the at least one of the cells has at least one path for feeding back processing results of the respective cell as operands back into the respective cell, the path including at least one register that is at least 4-bit wide.

39. The Field Programmable Gate Array Integrated Circuit according to any one of claims 35, 36, and 27, wherein the each of the at least one of the cells has at least one path for feeding back output of the at least one adder as at least one operand back to the respective cell, the path including at least one register that is at least 4-bit wide.

40. The Field Programmable Gate Array Integrated Circuit according to any one of claims 35 and 36, wherein the each of the at least one of the cells has at least one path for feeding back output from at least one of the output registers as operands back into the respective cell.

41. The Field Programmable Gate Array Integrated Circuit according to claim 35, wherein the at least one of the cells has at least one path for feeding back at least one output register to at least one adder input via a multiplexer.

42. The Field Programmable Gate Array Integrated Circuit according to any one of claims 31, 32, 35, and 41, wherein at least some of the cells comprise a shift function.

43. The Field Programmable Gate Array Integrated Circuit according to any one of claims 31, 32, 35, and 41, wherein at least some of the cells comprise a comparator.

44. The Field Programmable Gate Array Integrated Circuit according to any one of claims 31, 35, 36, and 41, wherein each of the at least one of the cells has at least one input for defining a function of the respective cell independently from other cells at runtime.

45. The Field Programmable Gate Array Integrated Circuit according to claim 44, wherein the independent definition of the function of the respective cell is performed without disturbing said other cells in their operations.

46. The Field Programmable Gate Array Integrated Circuit according to any one of claims 31, 35, 36, and 41, wherein the at least one of the cells has at least one status output.

47. The Field Programmable Gate Array Integrated Circuit according to any one of claims 31 and 35, wherein the at least one of the cells supports a selection of one of a set of multiple configurations at runtime.

48. The Field Programmable Gate Array Integrated Circuit according to any one of claims 31 and 35, wherein the at least one of the cells includes circuitry for performing a floating point operation.

49. The Field Programmable Gate Array Integrated Circuit according to claim 31, wherein at least some of the cells comprise a divider.

50. The Field Programmable Gate Array integrated circuit according to claim 31, wherein each of at least some of the configurable cells performs at least one of arithmetic and logic data processing, and has at least one register, a clock supply of the at least one register being suppressible within the configurable cell.

51. The Field Programmable Gate Array integrated circuit according to claim 31, wherein each of at least some of the configurable cells performs at least one of arithmetic and logic data processing, and has at least one register, a clock supply of the at least one register being suppressible within the configurable cell depending on availability of input data to the configurable cell.

52. The Field Programmable Gate Array integrated circuit according to claim 31, wherein each of at least some of the configurable cells performs at least one of arithmetic and logic data processing, and has at least one register, a clock supply of the at least one register being suppressible within the configurable cell depending on acceptability, by a receiver, of output data of the configurable cell.

53. The Field Programmable Gate Array integrated circuit according to claim 31, wherein each of at least some of the configurable cells performs at least one of arithmetic and logic data processing, and has at least one register, a clock supply of the at least one register being suppressible within the configurable cell for power saving.

54. The Field Programmable Gate Array integrated circuit according to claim 31, wherein at least some of the configurable cells perform at least one of arithmetic and logic data processing, and have at least one register, a clock supply to the at least one register being configurably suppressible.

55. The Field Programmable Gate Array integrated circuit according to claim 31, wherein at least some of the configurable cells perform at least one of arithmetic and logic data processing, and have at least one register, a clock supply to the at least one register being configurably suppressible for power saving.

56. The Field Programmable Gate Array integrated circuit according to claim 31, wherein at least some of the configurable cells perform at least one of arithmetic and logic data processing, and have at least one register, an arrangement being provided with the at least one register for disabling a clock supply of the at least one register.

57. The Field Programmable Gate Array integrated circuit according to claim 31, wherein at least some of the configurable cells perform at least one of arithmetic and logic data processing, and have at least one register, an arrangement being provided with the at least one register for disabling a clock supply of the at least one register for power saving.

58. A configurable data processing cell implemented in an integrated circuit, the integrated circuit being configurable in function at runtime and having (a) a multi-dimensionally arranged configurable cell structure and (b) a configurable interconnect connecting configurable cells of the configurable cell structure, wherein the data processing cell is hard-wired implemented in the cell structure, the data processing cell comprising:
  at least one adder hardware unit;
  at least one multiplier hardware unit;
  at least two input ports, each being at least 4-bit wide, the at least two input ports being arranged for providing input to the at least one adder and at least one multiplier;
  at least one output port being at least 4-bit wide, the at least one multiplier being arranged for providing an output to the at least one output port; and
  circuitry that couples the at least two input ports and the at least one output port to the configurable interconnect;
  wherein at least one of the input ports is arranged such that a function of the data processing cell is definable by the at least one of the input ports independently from other cells at runtime.

59. The configurable data processing cell according to claim 58, wherein the independent definition of the function of the data processing cell is performed without disturbing said other cells in their operations.

60. The configurable data processing cell according to claim 58, further comprising at least two at least 4-bit wide input registers.

61. The configurable data processing cell according to claim 58, further comprising at least one at least 4-bit wide output register.

62. The configurable data processing cell according to any one of claims 58, 59, and 61, further comprising at least one floating point unit.

63. The configurable data processing cell according to claim 58, further comprising at least three input ports that are each at least 4-bit wide.

64. The configurable data processing cell according to claim 58, further comprising at least one multiplexer located between the at least one multiplier and the at least one adder.

65. The configurable data processing cell according to claim 64, wherein the multiplexer allows selection of input data for the at least one adder from at least (a) the multiplier and (b) at least one of another cell and an input of the configurable processing cell.

66. The configurable data processing cell according to claim 64, further comprising at least one path for feeding back processing results of the cell as operands back into the cell, the path including at least one register that is at least 4-bit wide.

67. The configurable data processing cell according to claim 64, further comprising at least one path for feeding back output of the at least one adder as at least one operand back to the cell, the path including at least one register that is at least 4-bit wide.

68. The configurable data processing cell according to claim 64, further comprising at least one output register and at least one path for feeding back output from at least one of output registers as operands back into the cell.

69. The configurable data processing cell according to claim 64, further comprising at least one output register and at least one path for feeding back at least one output register to at least one adder input via a multiplexer.

70. The configurable data processing cell according to claim 58, further comprising at least one of (a) at least two at least 4-bit wide input registers and (b) at least one at least 4-bit wide output register.

71. The configurable data processing cell according to any one of claims 59, 61, 68, 69, and 70, wherein the integrated circuit is a Field Programmable Gate Array (FPGA).

72. The configurable data processing cell according to any one of claims 58, 64, 68, and 70, further comprising a shift function.

73. The configurable data processing cell according to any one of claims 58, 64, 68, and 70, further comprising a comparator.

74. The configurable data processing cell according to any one of claims 58, 64, 68, and 70, wherein the cell supports selection of one of a set of multiple configurations at runtime.

75. The configurable data processing cell according to claim 58, further comprising a divider.

76. The configurable data processing cell according to claim 58, further comprising at least one status output.

77. The configurable data processing cell according to claim 58, wherein the cell includes circuitry for performing a floating point operation.

78. The configurable data processing cell according to claim 58, wherein the configurable data processing cell has at least one register, and an arrangement is provided with the at least one register for disabling a clock supply of the at least one register.

79. The configurable data processing cell according to claim 58, wherein the configurable data processing cell has at least one register, and an arrangement is provided with the at least one register for disabling a clock supply of the at least one register for power saving.

80. The configurable data processing cell according to claim 58, wherein the configurable data processing cell has at least one register, and a clock supply for the at least one register is suppressible.

81. The configurable data processing cell according to claim 58, wherein the configurable data processing cell has at least one register, and a clock supply for the at least one register is suppressible depending on availability of input data to the configurable data processing cell.

82. The configurable data processing cell according to claim 58, wherein the configurable data processing cell has at least one register, and a clock supply for the at least one register is suppressible depending on acceptability, by a receiver, of output data of the configurable data processing cell.

83. The configurable data processing cell according to claim 58, wherein the configurable data processing cell has at least one register, and a clock supply for the at least one register is suppressible for power saving.

84. A configurable data processing cell implemented in an integrated circuit, the integrated circuit being configurable in function at runtime and having (a) a multi-dimensionally arranged configurable cell structure and (b) a configurable interconnect connecting the configurable cells, wherein the configurable data processing cell is hard-wired implemented in the cell structure, the configurable data processing cell comprising:
    at least three inputs, each being at least 4-bit wide;
    at least one output being at least 4-bit wide;
    at least one adder function unit;
    at least one multiplier function unit; and
    at least one of (a) at least one arithmetic function unit and (b) at least one logic function unit;
wherein individual ones of the function units are selectively interconnectable such that an output of at least one of the at least one adder function unit, the at least one multiplier function unit, and the at least one of (a) at least one arithmetic function unit and (b) at least one logic function unit is selectively used as an input to another of the at least one adder function unit, the at least one multiplier function unit, and the at least one of (a) at least one arithmetic function unit and (b) at least one logic function unit.

85. The configurable data processing cell according to claim 84, wherein at least one of the at least three inputs comprises a 4-bit wide input register.

86. The configurable data processing cell according to claim 84, wherein at least one of the at least one output comprises a 4-bit wide output register.

87. The configurable data processing cell according to claim 86, further comprising at least one path for feeding an output from at least one of the output registers as operands back into the cell.

88. The configurable data processing cell according to claim 86, further comprising at least one path for feeding back at least one output register to at least one adder input via a multiplexer.

89. The configurable data processing cell according to claim 84, further comprising at least one path for feeding processing results of the cell as operands back into the cell, the path including at least one register, the register being at least 4-bit wide.

90. The configurable data processing cell according to claim 89, further comprising a shift function.

91. The configurable data processing cell according to any one of claims 84, 87, 89, and 90, further comprising at least one input for defining the cell's function independently from other cells at runtime.

92. The configurable data processing cell according to claims 91, wherein the integrated circuit is a Field Programmable Gate Array (FPGA).

93. The configurable data processing cell according to claim 91, wherein the independent definition of the cell's function is performed without disturbing said other cells in their operations.

94. The configurable data processing cell according to claim 91, wherein the cell supports selection of one of a set of multiple configurations at runtime.

95. The configurable data processing cell according to claim 89, further comprising a comparator.

96. The configurable data processing cell according to any one of claims 84 and 89, further comprising at least one status output.

97. The configurable data processing cell according to any one of claims 84, 86, 87, 90, and 95, wherein the integrated circuit is a Field Programmable Gate Array (FPGA).

98. The configurable data processing cell according to any one of claims 84 and 89, wherein the cell includes circuitry for performing a floating point operation.

99. The configurable data processing cell according to claim 84, further comprising at least one path for feeding back output of the at least one adder as at least one operand back to the cell, the path including at least one register that is at least 4-bit wide.

100. The configurable data processing cell according to claim 84, further comprising a divider.

101. The configurable data processing cell according to claim 84, further comprising at least one floating point unit.

102. The configurable data processing cell according to claim 96, wherein the integrated circuit is a Field Programmable Gate Array (FPGA).

103. The configurable data processing cell according to claim 84, wherein the configurable data processing cell performs at least one of arithmetic and logic data processing, and has at least one register, an arrangement being provided with the at least one register for disabling a clock supply of the at least one register.

104. The configurable data processing cell according to claim 84, wherein the configurable data processing cell performs at least one of arithmetic and logic data processing, and has at least one register, an arrangement being provided with the at least one register for disabling a clock supply of the at least one register for power saving.

105. The configurable data processing cell according to claim 84, wherein the configurable data processing cell has at least one register, and a clock supply for the register is suppressible.

106. The configurable data processing cell according to claim 84, wherein the configurable data processing cell has at least one register, and a clock supply for the register is suppressible depending on availability of input data to the configurable data processing cell.

107. The configurable data processing cell according to claim 84, wherein the configurable data processing cell has at least one register, and a clock supply for the register is suppressible depending on acceptability, by a receiver, of output data of the configurable data processing cell.

108. The configurable data processing cell according to claim 84, wherein the configurable data processing cell has at least one register, and a clock supply for the register is suppressible for power saving.

109. The configurable data processing cell according to claim 84, wherein at least some of the configurable cells perform at least one of arithmetic and logic data processing, and have at least one register, an arrangement being provided with the at least one register for disabling a clock supply of the at least one register.

110. The configurable data processing cell according to claim 84, wherein at least some of the configurable cells perform at least one of arithmetic and logic data processing, and have at least one register, an arrangement being provided with the at least one register for disabling a clock supply of the at least one register for power saving.

111. A configurable data processing cell implemented in an integrated circuit, the integrated circuit being configurable in function and interconnection at runtime and having (a) a multi-dimensionally arranged configurable cell structure and (b) a configurable interconnect connecting the configurable cells, wherein the data processing cell is hard-wired implemented in the cell structure, the data processing cell comprising:
 at least two input registers;
 at least one output register; and
 at least one hard-wired floating point unit arranged for receiving an input from the at least two input registers and providing an output to the at least one output register.

112. The configurable data processing cell according to claim 111, wherein the at least two input registers include at least two at least 4-bit wide input registers.

113. The configurable data processing cell according to claim 111, wherein the at least one output register includes at least one at least 4-bit wide output register.

114. The configurable data processing cell according to claim 111, further comprising at least one path for feeding processing results of the cell as operands back into the cell, the path including at least one register that is at least 4-bit wide.

115. The configurable data processing cell according to any one of claims 111, 112, 113, and 114, further comprising at least one input for defining the cell's function independently from other cells at runtime without disturbing or influencing other cells in their operation.

116. The configurable data processing cell according to claim 115, wherein the cell supports selection of one of a set of multiple configurations at runtime.

117. The configurable data processing cell according to any one of claims 111 and 114, further comprising at least one status output.

118. The configurable data processing cell according to any one of claims 111, 112, 113, and 114, wherein the Integrated Circuit is a Field Programmable Gate Array (FPGA).

119. The configurable data processing cell according to claim 117, wherein the Integrated Circuit is a Field Programmable Gate Array (FPGA).

120. The configurable data processing cell according to claim 115, wherein the Integrated Circuit is a Field Programmable Gate Array (FPGA).

121. The configurable data processing cell according to claim 111, wherein the configurable processing cell has at least one register for which a clock supply is suppressible.

122. The configurable data processing cell according to claim 111, wherein the configurable processing cell has at least one register for which a clock supply is suppressible depending on availability of input data to the configurable data processing cell.

123. The configurable data processing cell according to claim 111, wherein the configurable processing cell has at least one register for which a clock supply is suppressible depending on acceptability, by a receiver, of output data of the configurable data processing cell.

124. The configurable data processing cell according to claim 111, wherein the configurable processing cell has at least one register for which a clock supply is suppressible for power saving.

125. A data processor integrated circuit that is configurable in function at runtime, comprising:
 configurable elements arranged in a two-dimensional manner; and
 a configurable interconnect for connecting the configurable elements in a configurable manner;
 wherein each of at least some of the configurable elements comprises:
  at least one ALU (a) being at least 4-bit wide, (b) having a set of predefined, non-alterable instructions, and (c) and including circuitry via which to execute arithmetic logic operations in accordance with said set of predefined, non-alterable instructions;
  at least two input registers, each being at least 4-bit wide and including circuitry in which operands received over the configurable interconnect are storable;
  at least one at least 4-bit wide output register for storing result data produced by the at least one ALU in accordance with the configuration information;
  at least one at least 4-bit wide multiplexer located between at least one of the input registers and at least one input of the at least one ALU, at least one of the at least two input registers being connected to at least a first input of the at least one multiplexer.

126. The data processor integrated circuit according to claim 125, wherein the each of the at least some of the configurable elements further comprises at least one at least 4-bit wide feedback from the at least one output register to at least one input of the at least one multiplexer, for feeding result data back to the at least one ALU.

127. The data processor integrated circuit according to any one of claims 125 and 126, wherein the each of the at least some of the configurable elements is arranged receiving configuration information defining a cell operation independently of other cells at runtime without disturbing or influencing other cells in their operation, the at least one ALU being arranged for executing an arithmetic logic operation in accordance with the configuration information.

128. The data processor integrated circuit according to claim 125, wherein at least some of the configurable elements have at least one register, a clock supply for the at least one register being suppressible.

129. The data processor integrated circuit according to claim 128, wherein the integrated circuit is a Field Programmable Gate Array integrated circuit (FPGA).

130. The data processor integrated circuit according to claim 125, wherein each of at least some of the configurable elements has at least one register, a clock supply for the register being suppressible depending on availability of input data to the configurable element.

131. The data processor integrated circuit according to claim 125, wherein each of at least some of the configurable elements has at least one register, a clock supply for the register being suppressible depending on acceptability, by a receiver, of output data of the configurable element.

132. The data processor integrated circuit according to claim 125, wherein at least some of the configurable elements have at least one register, a clock supply for the at least one register being suppressible for power saving.

133. The data processor integrated circuit according to claim 125, wherein at least some of the configurable elements perform at least one of arithmetic and logic data processing, and have at least one register, a clock supply to the at least one register being configurably suppressible.

134. The data processor integrated circuit according to claim 132, wherein the integrated circuit is a Field Programmable Gate Array (FPGA) integrated circuit.

135. The data processor integrated circuit according to claim 125, wherein at least some of the configurable elements perform at least one of arithmetic and logic data processing, and have at least one register, a clock supply to the at least one register being configurably suppressible for power saving.

136. The data processor integrated circuit according to claim 125, wherein at least some of the configurable elements perform at least one of arithmetic and logic data processing, and have at least one register, an arrangement provided with the at least one register for disabling a clock supply of the at least one register.

137. The data processor integrated circuit according to claim 136, wherein the integrated circuit is a Field Programmable Gate Array (FPGA) integrated circuit.

138. The data processor integrated circuit according to claim 125, wherein at least some of the configurable elements perform at least one of arithmetic and logic data processing, and have at least one register, an arrangement being provided with the at least one register for disabling a clock supply of the at least one register for power saving.

* * * * *